United States Patent [19]
Kawade et al.

[11] Patent Number: 5,788,326
[45] Date of Patent: Aug. 4, 1998

[54] MULTI-FUNCTIONAL SEAT FOR VEHICLE

[75] Inventors: Tateo Kawade; Osamu Shirose; Hiroshi Tokuyama, all of Wako, Japan

[73] Assignee: Honda Giken Kogyo Kabushiki Kaisha, Tokyo, Japan

[21] Appl. No.: 683,316

[22] Filed: Jul. 18, 1996

[30] Foreign Application Priority Data

| Jul. 19, 1995 | [JP] | Japan | 7-182935 |
| Jul. 19, 1995 | [JP] | Japan | 7-182936 |
| Jul. 19, 1995 | [JP] | Japan | 7-182937 |
| Jul. 19, 1995 | [JP] | Japan | 7-182938 |
| Jul. 19, 1995 | [JP] | Japan | 7-182940 |

[51] Int. Cl.$^6$ ............................................. B60N 2/30
[52] U.S. Cl. .................. 297/236; 297/237; 297/238; 297/250.1; 248/419
[58] Field of Search ......................... 297/234, 236, 297/237, 238, 250.1; 248/419

[56] References Cited

U.S. PATENT DOCUMENTS

| 5,265,934 | 11/1993 | Forget | 297/237 |
| 5,282,666 | 2/1994 | Demick et al. | 297/237 |
| 5,553,918 | 9/1996 | Baret et al. | 297/237 |

FOREIGN PATENT DOCUMENTS

| 3800896 | 9/1988 | Germany | 297/237 |
| 3267011 | 11/1991 | Japan | 297/237 |

*Primary Examiner*—Peter R. Brown
*Assistant Examiner*—Anthony D. Barfield
*Attorney, Agent, or Firm*—Nikaido, Marmelstein, Murray & Oram LLP

[57] ABSTRACT

A seat cushion is bisected into a front seat cushion and a rear seat cushion. The front seat cushion is liftably and lowerably supported through a lifting mechanism which includes a front link and a rear link. When the seat back is reclined rearwards, a locking pin of a locking bar is separated from a locking claw and slid forwards by a biasing force provided by the front link intended to be tilted down rearwards by a resilient force of a spring. As a result, the front seat cushion is moved rearwards in a manner to follow the reclining of the seat back. The lifted seat cushion does not hinder the reclining of the seat back, and no gap is created between the seat cushion and the seat back. The front seat cushion is lifted to constitute a child seat, and a front seat back and a rear seat back of a seat back are opened longitudinally to constitute a baby basket. Thus, a central seat can be utilized for a baby, a child and an adult.

28 Claims, 54 Drawing Sheets

FIG.6

(Most rearward tilted position)

(Most forward tilted position)

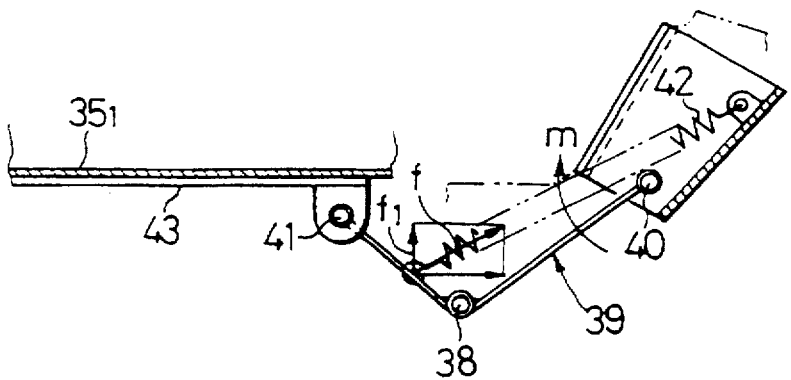
FIG.18A
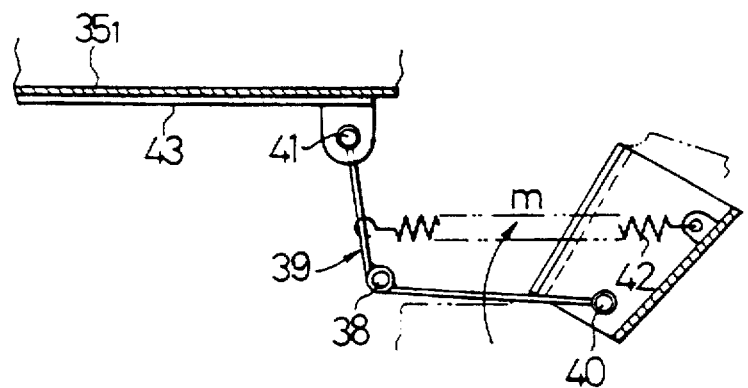
FIG.18B
FIG.18C
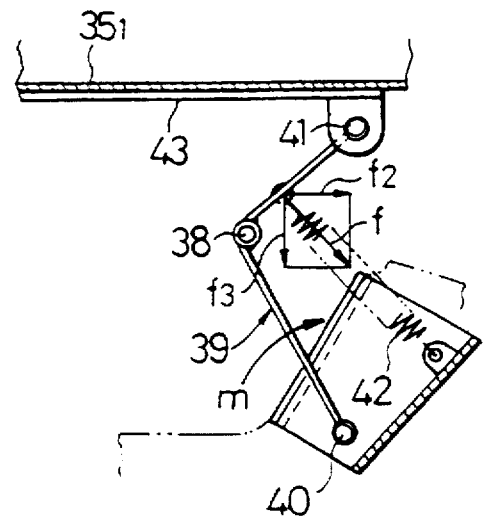

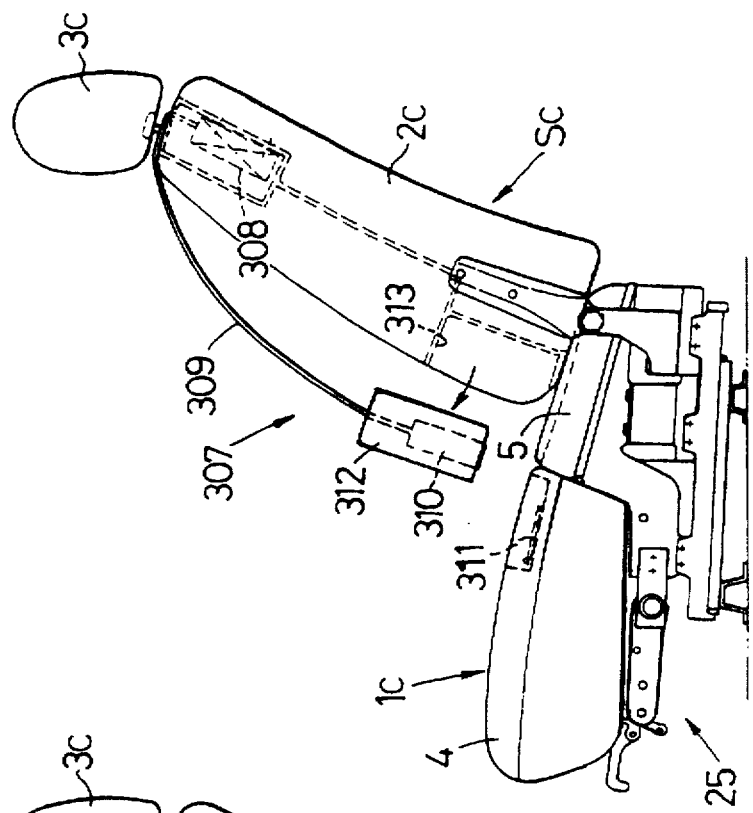
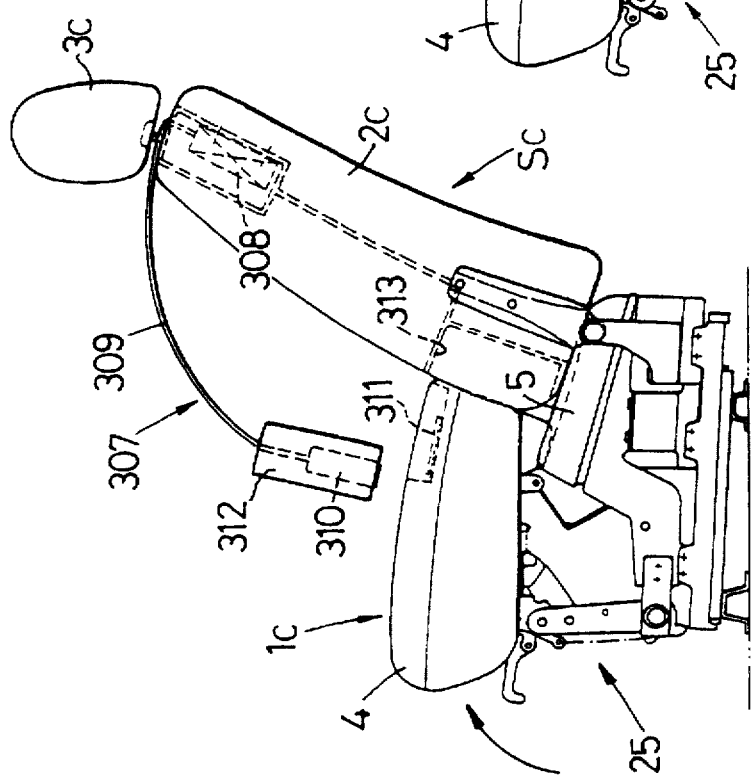

MULTI-FUNCTIONAL SEAT FOR VEHICLE

BACKGROUND OF THE INVENTION

1. Field of the Invention

The present invention relates to a multi-functional seat for a vehicle, in which a central seat in the vehicle can be deformed into various modes, or deformed according to various physical features of babies, children and adults.

2. Description of the Related Art

Multi-functional seat arrangements are conventionally known from Japanese Utility Model Application Laid-open Nos. 58-68153 and 57-5055, in which a front half of a seat cushion of a central seat disposed between a left seat and a right seat is vertically movably supported, and the seat cushion is utilized as an arm rest.

It is considered that the vertically movable seat cushion described in Japanese Utility Model Application Laid-open Nos. 58-68153 and 57-5055 are used not only as the arm rest, but also used as a child seat and an arm rest.

In such a case, there is a problem that if a seat back is intended to be reclined, a front surface of the seat back at its lower portion interferes with a rear end of the seat cushion which is in a lifted position, and the seat back cannot be freely reclined, or a gap is created between the seat cushion and the seat back, resulting in a degraded outer appearance.

A multi-functional seat arrangement is also known from Japanese Utility Model Application Laid-open No. 6-12170, which is designed so that a baby basket for holding back a baby in a backward-turned attitude is formed by tilting down, forwards, a front surface portion of the seat back located substantially centrally of a vehicle to develop it.

The seat arrangement described in Japanese Utility Model Application Laid-open No. 6-12170 provides a multi-functionality to the seat by utilizing the front surface portion of the seat back as the baby basket. However, such seat cannot be utilized as the child seat, and it is desired that a further high-degree multi-functionality is provided.

SUMMARY OF THE INVENTION

Accordingly, it is a first object of the present invention to provide a multi-functional seat arrangement for a vehicle including a liftable and lowerable seat cushion, wherein a free reclining of seat back can be achieved.

It is a second object of the present invention to provide a multi-functional seat arrangement for a vehicle, wherein a central seat can be deformed according to various physical features of babies, children and adults and can be used especially as a baby basket or as a child seat.

To achieve the above first object, according to the present invention, there is provided a multi-functional seat arrangement for a vehicle, comprising a seat cushion bisected into a front seat cushion and a rear seat cushion, and a seat back pivotally supported at a rear end of the seat cushion for reclining movement about a fulcrum, the front seat cushion being liftably and lowerably supported through a lifting mechanism, wherein the lifting mechanism comprises a forward and rearward movement permitting means for forward and rearward movements of the front seat cushion which is in a lifted position, and a biasing means for biasing the rear end of the front seat cushion into abutment against a front surface of the seat back at its lower portion, in order to move the front seat cushion forwards and rearwards in a manner to follow a variation in reclining angle of the seat back.

With such arrangement, the seat back can be freely reclined without interfering with the front seat cushion which is in the lifted position, thereby preventing a gap from being created between the front seat cushion and the seat back to avoid a degradation in seating comfort and in outer appearance.

To achieve the second object, according to the present invention, there is provided a multi-functional seat arrangement for a vehicle, comprising a seat disposed substantially centrally in the vehicle and used for the multiple purpose, the seat including a seat cushion divided into a front seat cushion and a rear seat cushion, and a seat back divided into a front seat back and a rear seat back, the front seat cushion being liftable and lowerable with respect to the rear seat cushion and including a body portion and a lid which is turnable forwards about a fulcrum provided at a front end of the body portion, the front seat back being turnable about a fulcrum provided at a lower end thereof to a position in which it is superposed on an upper surface of the body portion of the front seat cushion which is in the lifted position, the rear seat back being turnable about the fulcrum, wherein a baby basket for supporting a baby in a sleeping attitude is formed by the lid turned forwards, the front seat back turned forwards and the rear seat back turned rearwards, and a child seat being formed by lifting the front seat cushion.

With the above arrangement, the baby basket for supporting the baby in the sleeping attitude is constituted by the lid, the front seat back and the rear seat back. Therefore, the three members can be connected together not only to sufficiently insure the longitudinal dimension of the baby basket, but also to superpose the front seat back to which the weight of the baby is most largely applied, onto the upper surface of the body portion of the front seat cushion, thereby enhancing the rigidity to reliably support even a baby having a large height and a large weight. In addition, since the front seat cushion is lifted to constitute the child seat, it is possible to permit the position of eyes of a child having a lower seating height as compared with an adult to be put at a raised level, thereby providing a widened field of view.

The above and other objects, features and advantages of the invention will become apparent from the following description of preferred embodiments taken in conjunction with the accompanying drawings.

BRIEF DESCRIPTION OF THE DRAWINGS

FIG. 6 is a view showing the seat cushion in a lifted state;

FIGS. 18A, 18B and 18C are views for explaining the operation of a spring of a rear link;

FIGS. 40A and 40B are views for explaining the operation;

DETAILED DESCRIPTION OF THE PREFERRED EMBODIMENTS

A first embodiment of the present invention will now be described with reference to FIGS. 1 to 24.

Figure 1:
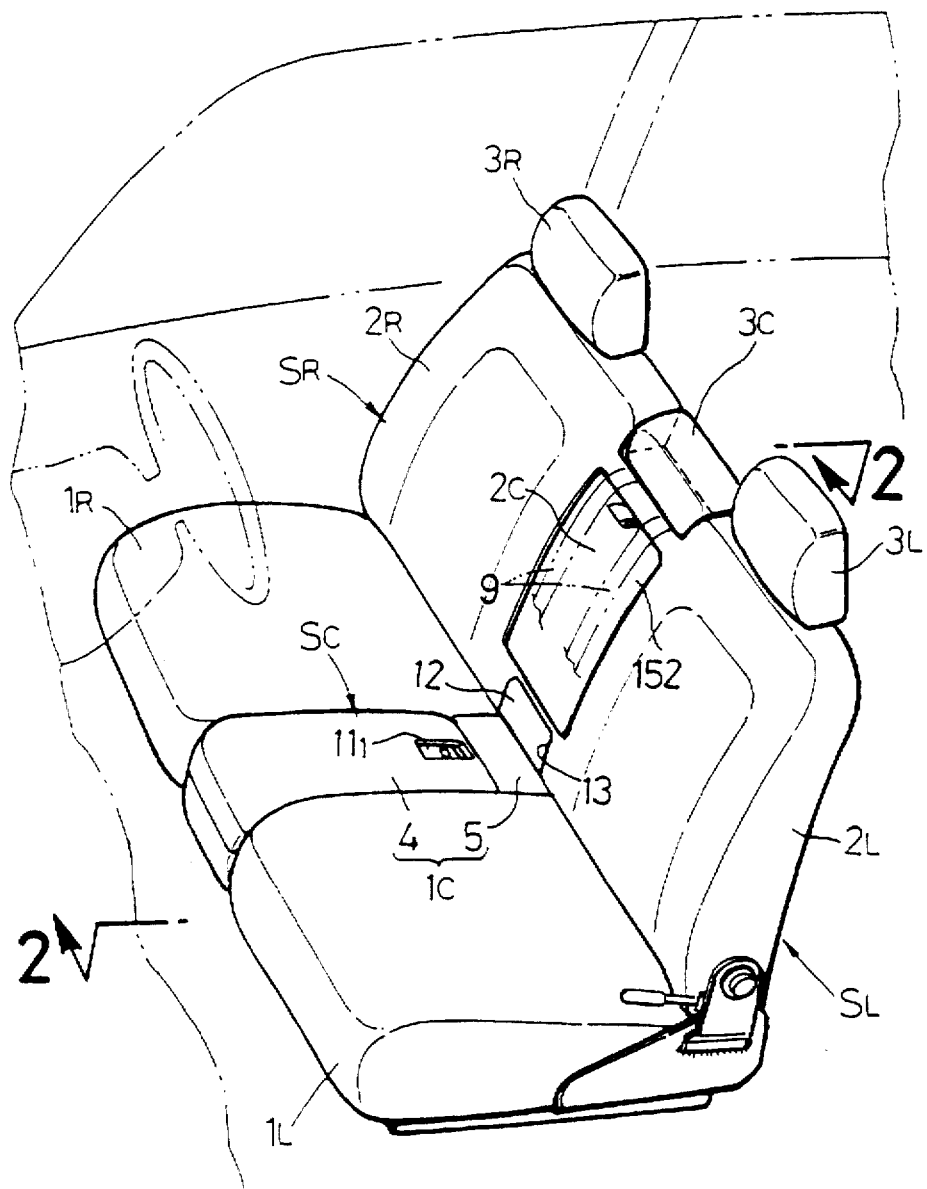
FIG. 1 is a perspective view of a front seat in a vehicle including a multi-functional seat arrangement according to a first embodiment of the present invention.
Figure 2:
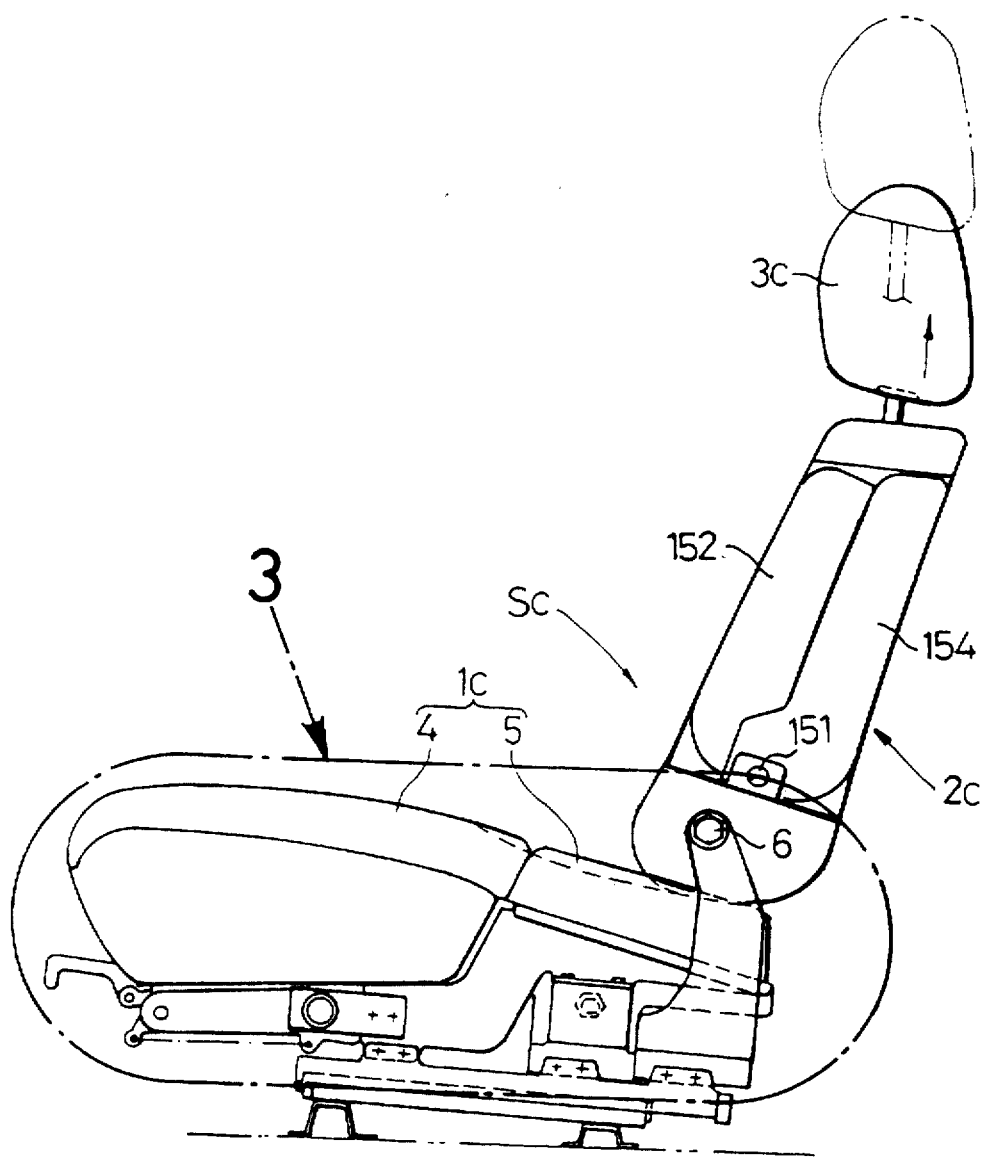
FIG. 2 is a view taken along a line 2—2 in FIG. 2.

Referring to FIGS. 1 and 2, a right sheet $S_R$ as a driver's seat, a left seat $S_L$ as an assistant driver's seat, and a central seat $S_C$ interposed between both the seats $S_L$ and $S_R$ are arranged laterally side by side in a front portion of a compartment in a vehicle. Each of the left seat $S_L$ and the right seat $S_R$ is comprised of a seat cushion $1_L$, $1_R$, a seat back $2_L$, $2_R$ and a head rest $3_L$, $3_R$, respectively. The central seat $S_C$ is comprised of a seat cushion $1_C$, a seat back $2_C$ and a head rest $3_C$. The seat cushion $1_C$ is bisected into a fore-side front seat cushion 4 and a back-side rear seat cushion 5.

The seat back $2_C$ of the central seat $S_C$ is tiltable down forwards and can be used as a baby basket, as described hereinafter. The front seat cushion 4 of the seat cushion $1_C$ of the central seat $S_C$ is liftable and lowerable between a lowered position connected to a front side of the rear seat cushion 5, and a lifted position in which its rear end is superposed on a front end of the rear seat cushion 5. If the front seat cushion 4 of the central seat $S_C$ is lowered, the front seat cushion 4 can be used as an adult seat. If the front seat cushion 4 is lifted, it can be used as an arm rest or a child seat.

The structure of a lifting mechanism 25 for lifting and lowering the front seat cushion 4 of the seat cushion $1_C$ of the central seat $S_C$ will be described below with reference to FIGS. 3 to 19.

As shown in FIGS. 3, 4, 5, 8 and 9, a seat base 27 is fixedly mounted on a slider 26 which is longitudinally slidably mounted on a floor surface in the vehicle compartment, and the rear seat cushion 5 is fixed to a rear portion of the seat base 27, while the front seat cushion 4 is liftably supported to a front portion of the seat base 27 through the lifting mechanism 25. An inner pipe 28 is fixed at its right end to a right front end of the seat base 27 by a bolt 29, and a bracket 30 welded to a left end of the inner pipe 28 is fixed to a left front end of the seat base 27 by bolts 31, 31. A pair of left and right front links 33, 33 are welded to an outer pipe 32 which is rotatably fitted over an outer periphery of the inner pipe 28. A J-shaped stopper arm 34 is fixed to the seat base 27, and stopper portions $33_1$, $33_1$ are formed at rear ends of the pair of front links 33, 33 and are abutable against the stopper arm 34.

A lock bracket 43 is fixed to a lower surface of a hollow box-like body portion $4_3$ of the front seat cushion 4 by a plurality of bolts 44. Longitudinally extending elongated bores $43_1$, $43_1$ are defined in left and right opposite sides of the lock bracket 43, and pins 45 are laid between tip ends of the left and right front links 33, 33 and fitted into the elongated bores $43_1$, $43_1$, respectively. A pair of springs 46, 46 are mounted in an tensioned manner between base ends of the left and right front links 33, 33 and a front end of the lock bracket 43, so that the front links 33, 33 are biased in a rising direction by resilient forces of the springs 46, 46.

Figure 17:
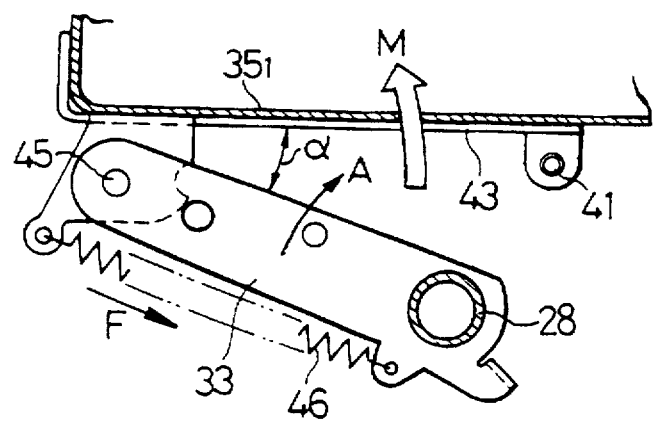
FIG. 17 is a view for explaining the operation of a spring of a front link.

More specifically, as can be seen from FIG. 17 showing a state in which the front link 33 has been slightly righted, a moment M about the pin 45 is applied to the lock bracket 43 by the resilient force F of the tension spring 46, so that the angle α formed by the front link 33 and the lock bracket 43 is intended to be increased by the moment M. However, the lock bracket 43 having its rear end restrained by the rear link 39 is only lifted and lowered while maintaining a horizontal attitude and hence, with an increase in the angle α, the front link 33 is righted in a direction of an arrow A about the inner pipe 28. In this manner, the front link 33 is biased in a rising direction by the resilient force of the spring 46.

A rear link 39 comprised of two plates interconnected at their substantially central portions by a pin 38 is pivotally supported at its front end to the seat based 27 by a pin 40, and at its front end to a rear end of the lock bracket 43 by a pin 41. The rear link 39 is biased in a rising direction by the resilient force of the spring 42. More specifically, the rear link 39 is bendable at its substantially central portion. When the front seat cushion 4 is in its lowered position, one end of the spring 42 is locked to the rear link 38 in front of a bent point (the pin 38), and when the front seat cushion 4 is in a rear portion-righted state, the other end of the spring 42 is locked to the seat base 27.

Therefore, as shown in FIG. 18A, when the lock bracket 43 (i.e., the front seat cushion 4) is in the lowered position, the resilient force f of the tension spring 42 generates a moment m for biasing the rear link 39 in a clockwise direction, wherein a component $f_1$ of the resilient force f biases the rear end of the lock bracket 43 upwards. When the lock bracket 43 is in a middle position as shown in FIG. 18B, the resilient force f of the tension spring 42 generates the moment m for biasing the rear link 39 in the clockwise direction. When the lock bracket 43 is in its lifted position as shown in FIG. 18C, the resilient force f of the tension spring 42 generates the moment f for biasing the rear link 39 in the clockwise direction, wherein a component $f_2$ of the resilient force f biases the rear end of the lock bracket 43, and a component force $f_3$ biases the rear end of the lock bracket 43 downwards.

Therefore, in the course of lifting of the front seat cushion 4, the spring 42 biases the rear portion of the front seat cushion 4, so that such rear portion is lifted by the component force $f_1$. At a final stage of the lifting, the rear end of the front seat cushion 4 is put into abutment against the front surface of the seat back $2_C$ by the component force $f_2$ and against the upper surface of the rear seat cushion 5 by the component force $f_3$.

Figure 19:
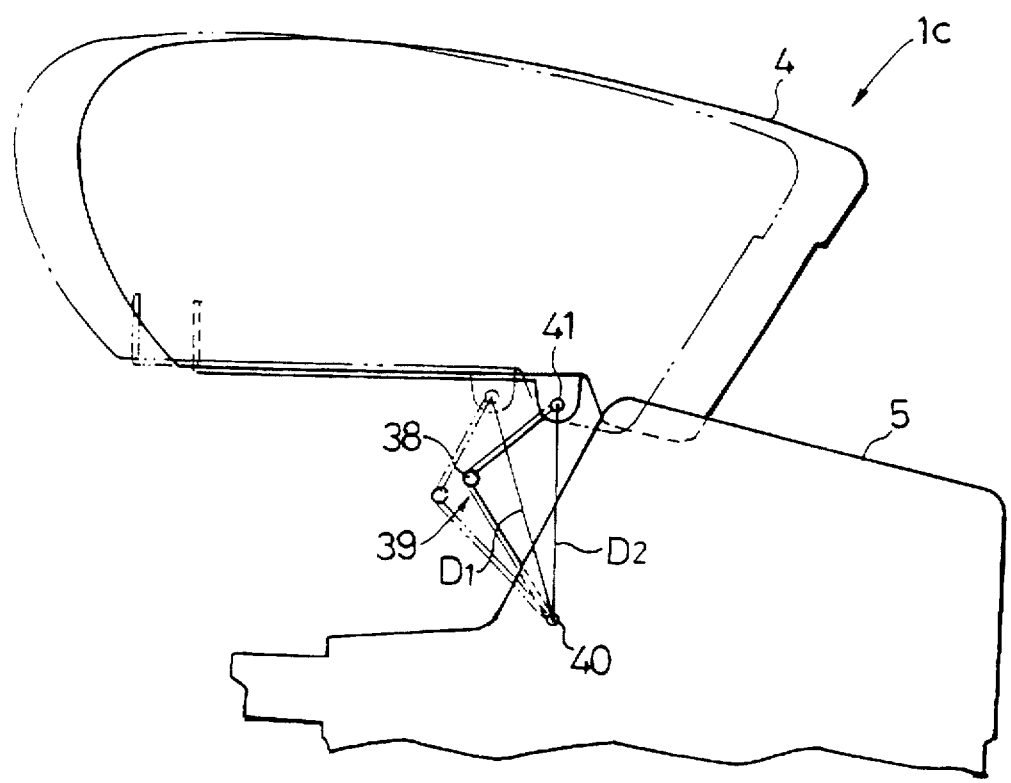
FIG. 19 is a view for explaining the operation of the rear link.

In the present embodiment, the front seat cushion 4 is moved forwards and backwards along the rear seat cushion 5 with the reclining of the seat back $2_C$, as will be described hereinafter. At this time, the distance (see $D_1$ and $D_2$) between the pins 40 and 41 is varied as shown in FIG. 19, but the varied amount of the distance is absorbed and hence, a gap cannot be produced between the front and rear seat cushions 4 and 5, because the rear link 39 is bendable.

The front seat cushion 4 is comprised of a body portion $4_3$ having a vessel $35_1$ accommodated therein and used as an article compartment, and a lid $4_1$ pivotally supported at the front end of the cushion base 35 for opening and closing movements.

A slide piece 47 is longitudinally slidably supported on the lower surface of the lock bracket 43. More specifically, a pair of left and right longitudinally extending elongated bores $47_1$, $47_1$ are defined in the slide piece 47, and guide pins 48, 48 passed through the elongated bores $47_1$, $47_1$ are threadedly inserted into the body portion $4_3$ through the lock bracket 43. The slide piece 47 is biased rearwards by a spring 49 mounted in the tensioned manner between the slide piece 47 and the lock bracket 43, so that front ends of the elongated bores $47_1$, $47_1$ are put into abutment against the guide pins 48, 48.

A lever 50 is pivotally supported at a front end of the slide piece 47 by a pin 51. The lever 50 is pulled by the slide piece 47 and biased rearwards, and a fulcrum portion $50_2$ formed in rear of and above the pin 51 abuts against a front end face of the lock bracket 43. Thus, if the lever 50 is pulled by a finger applied thereon, the pin 51 is pulled forwards about the fulcrum portion $50_2$, whereby the slide piece 47 is slid forwards relative to the lock bracket 43 while stretching the spring 49 within a range of the elongated bores $47_1$, $47_1$.

Locking claws $47_2$, $47_2$ are formed at left and right rear ends of the slide piece 47, and locking pins 52, 52 for use in the lowered position are provided on the left and right front links 33, 33 and are capable of being engaged by the locking claws $47_2$, $47_2$. A locking bar 54 is pivotally supported on a pin 53 which is laid between the left and right front link 33, 33 and biased in a direction of an arrow a in FIG. 10B by a spring 55. A locking claw $43_3$ is projectingly provided on a lower surface of the lock bracket 43 and capable of being engaged by a locking pin 56 for use in the lifted position and provided on the locking bar 54, and angle cams $47_3$, $47_3$ are formed in a downward turned manner at left and right rear ends of the slide piece 47 and capable of abutting against the locking pin 56 for use in the lifted position.

Figure 3:
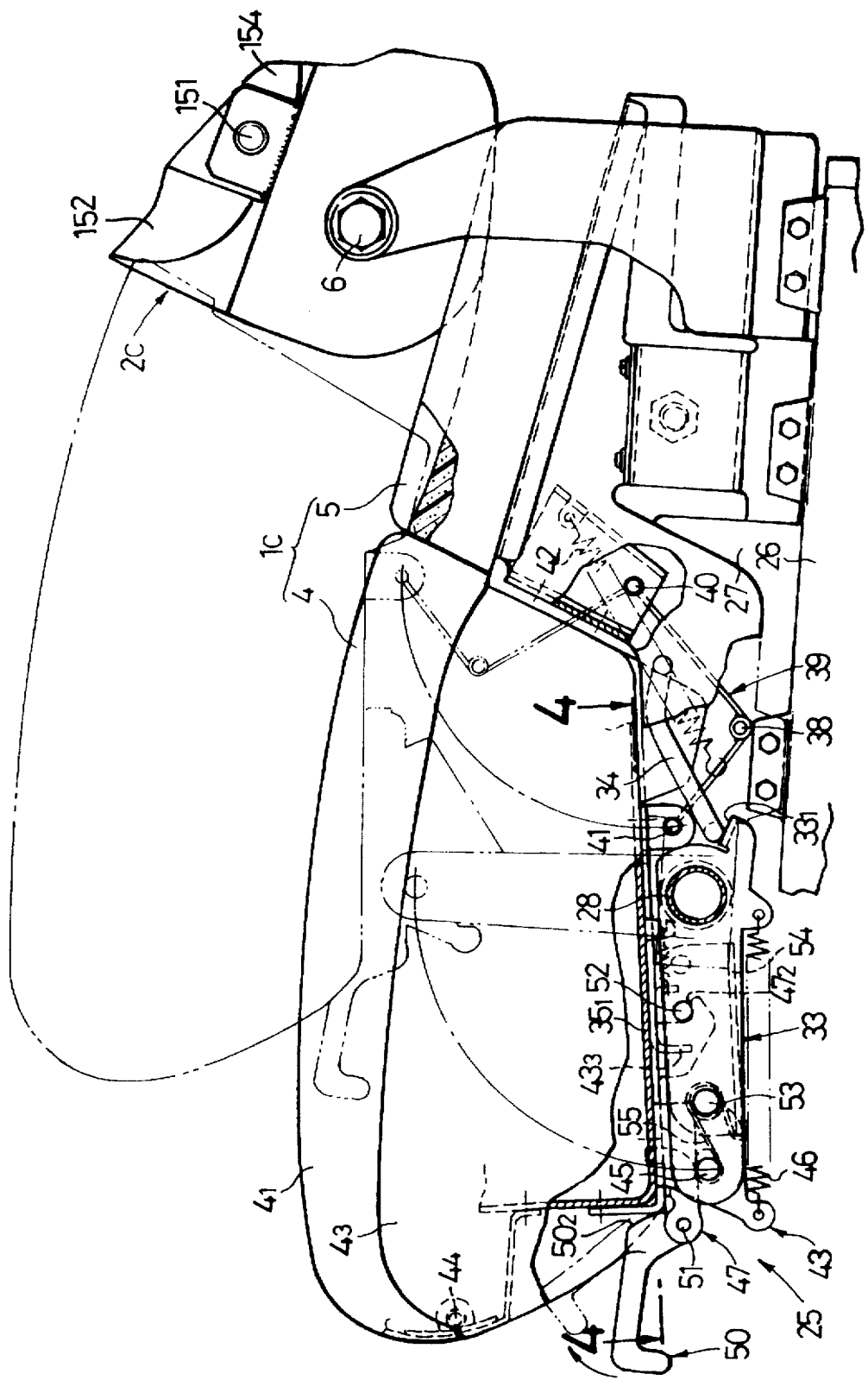
FIG. 3 is an enlarged view of a portion shown by 3 in FIG. 2 (in a lowered state of a seat cushion)
Figure 4:
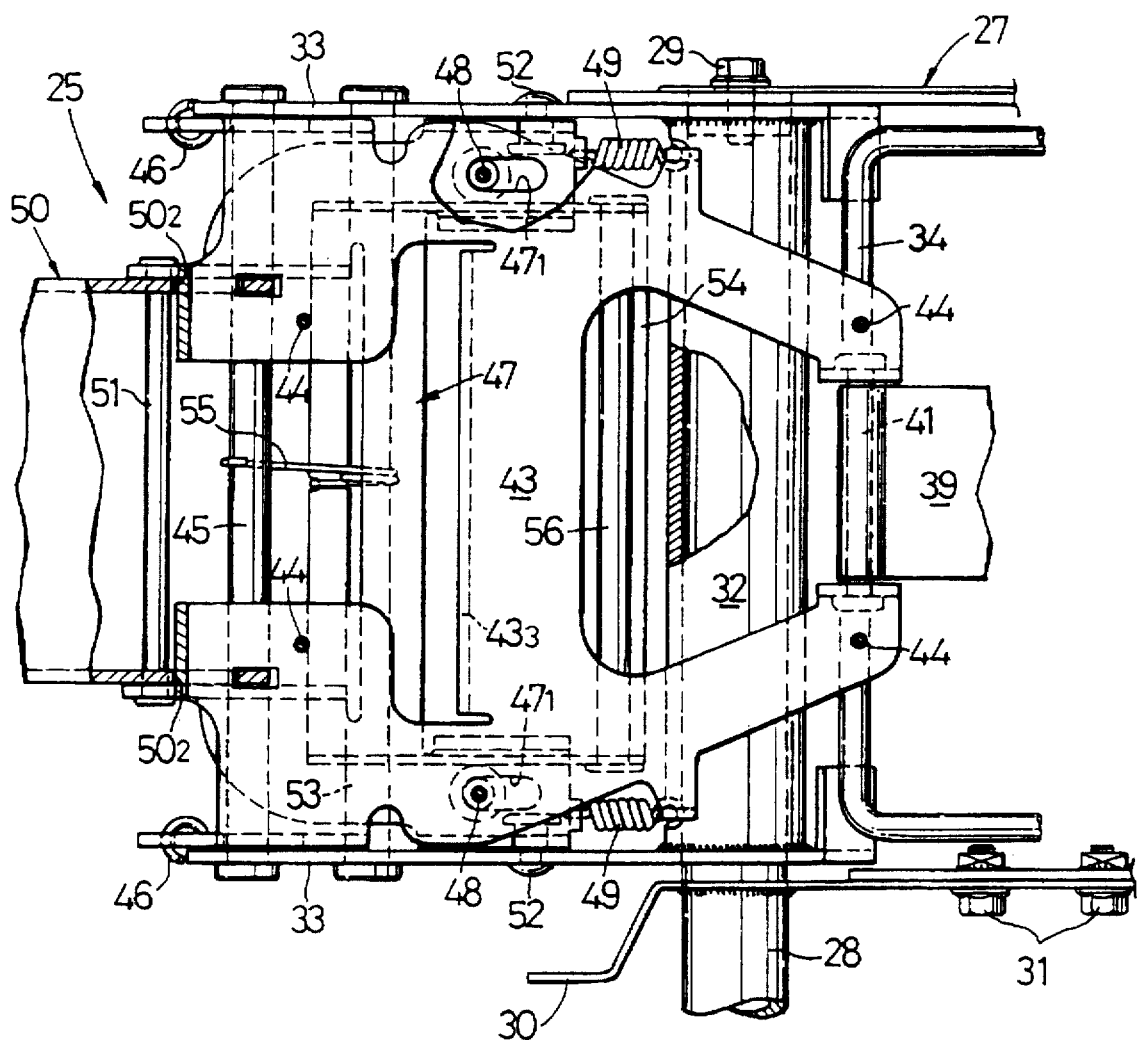
FIG. 4 is a view taken along a line 4—4 in FIG. 3.
Figure 5:
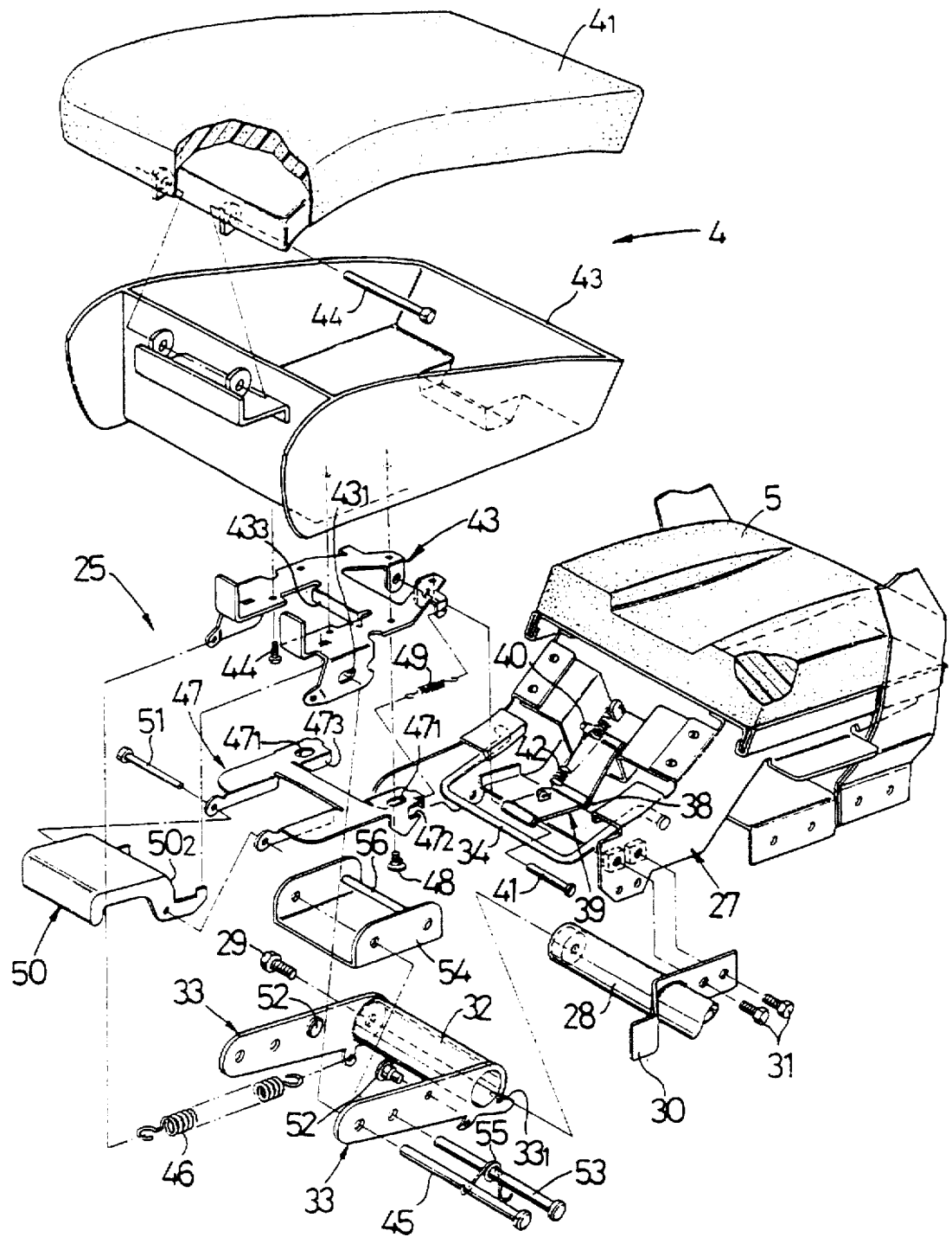
FIG. 5 is an exploded perspective view of a lifting mechanism.
Figure 7:
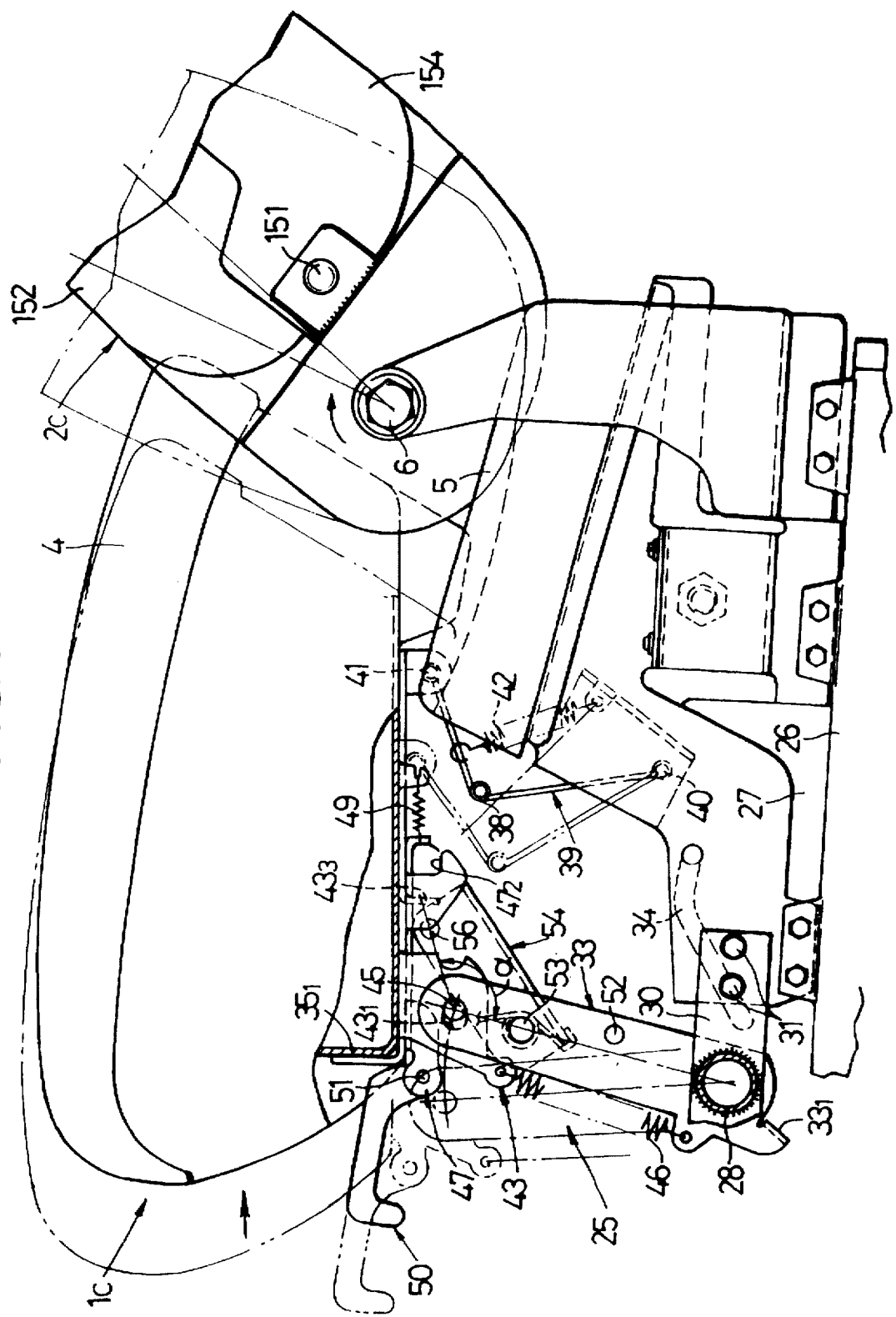
FIG. 7 is a view showing the seat cushion in a retreated state.
Figure 8:
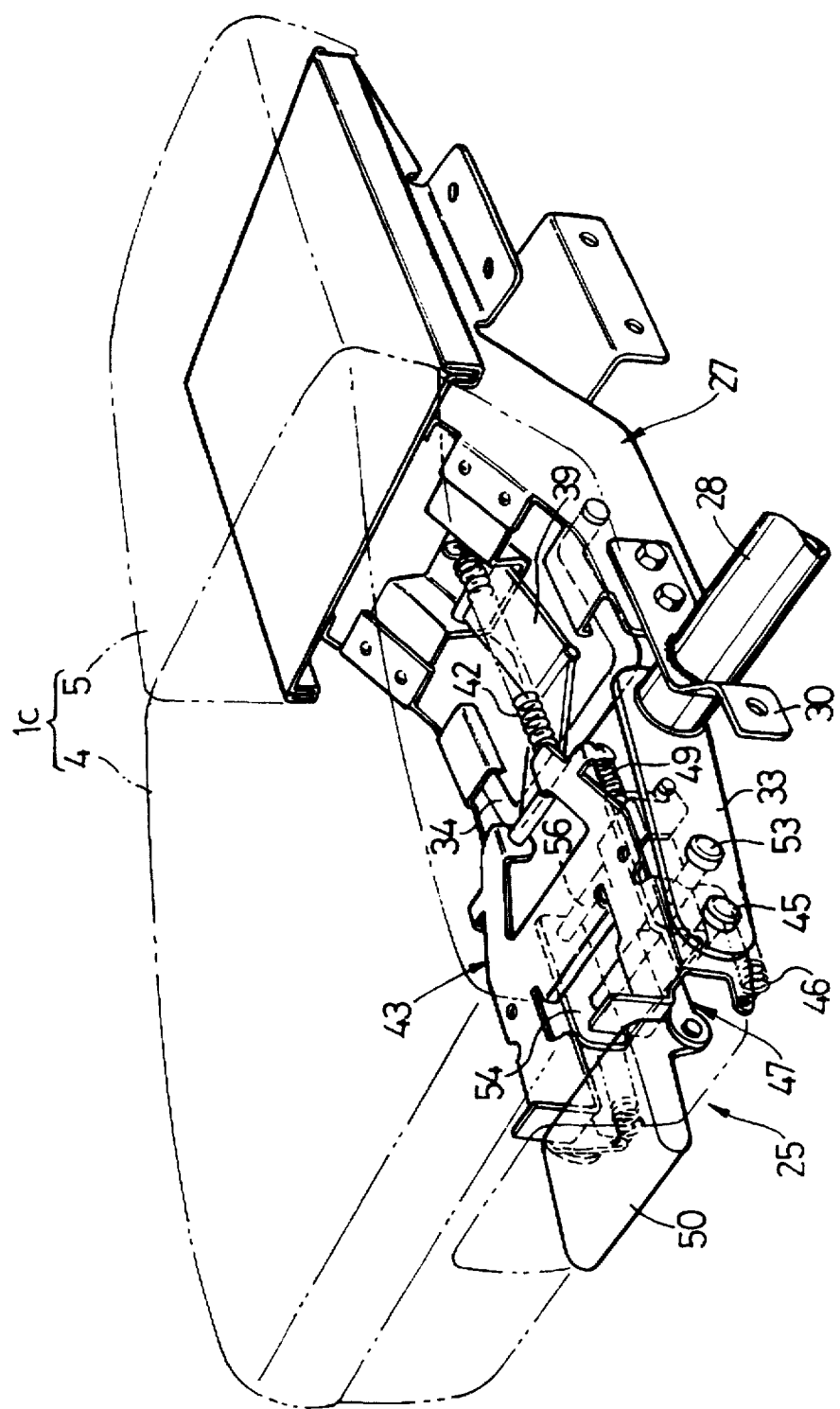
FIG. 8 is a perspective view of the lifting mechanism (in the lowered state of the seat cushion)
Figure 9:
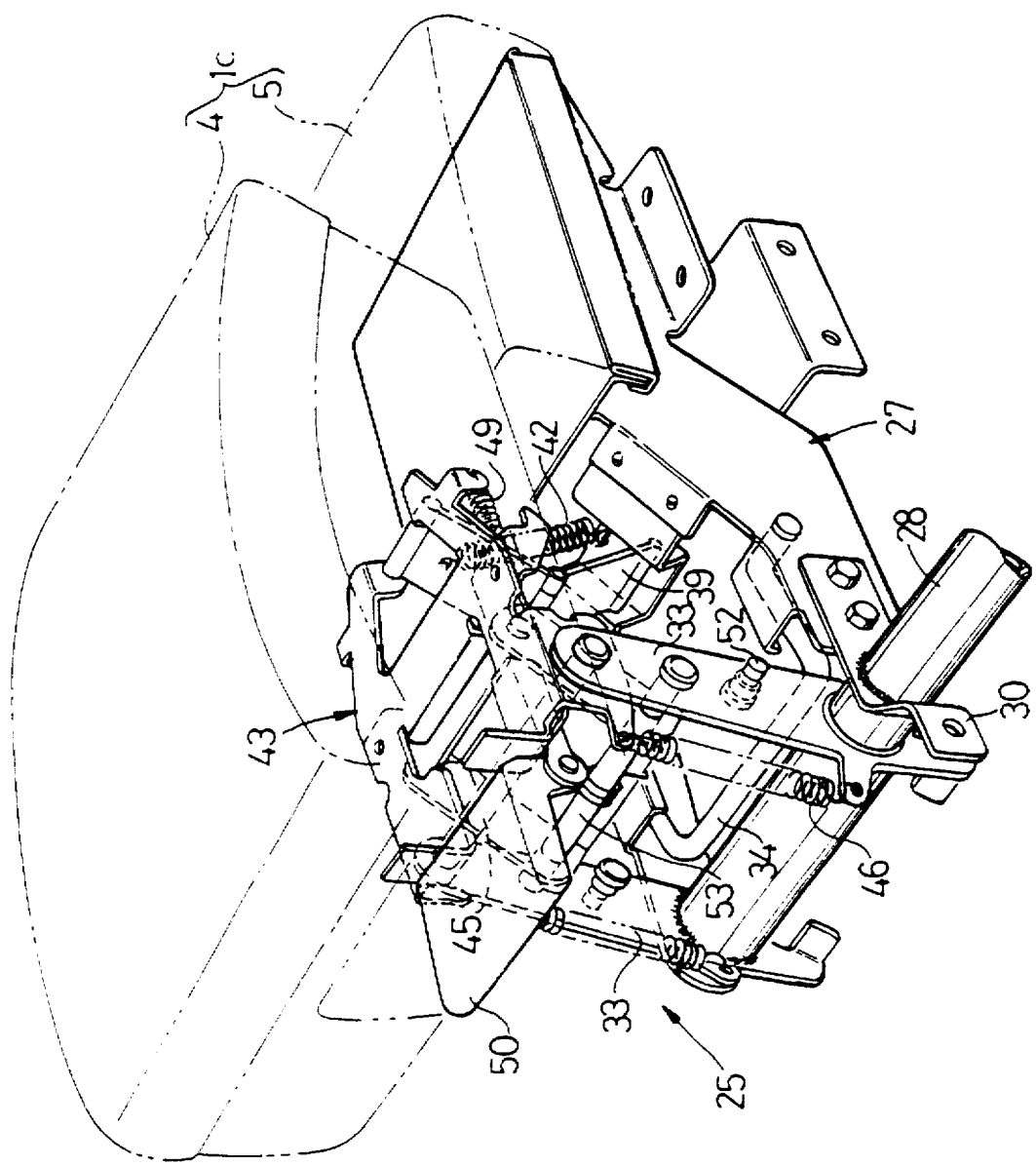
FIG. 9 is a perspective view of the lifting mechanism (in a lifted state of the seat cushion)

Thus, when the front seat cushion 4 is in the lowered position shown in FIG. 3, the locking claws $47_2$, $47_2$ formed on the slide piece 47 are brought into engagement with the undersides of the locking pins 52, 52 for use in the lowered position which are provided on the front links 33, 33, thereby limiting the rising of front links 33, 33 by the resilient force of the springs 46, 46. At this time, the weight of an occupant seated on the seat cushion $1_C$ is supported by the engagement of the stopper portions $33_1$, $33_1$ formed at the rear ends of the front links 33, 33 with the stopper arm 34.

Figure 10A:
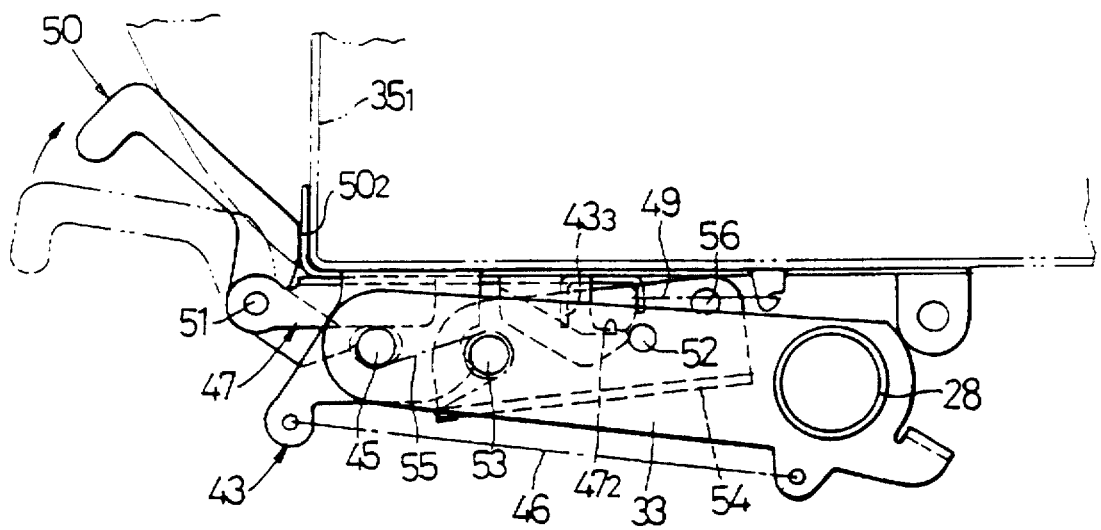
FIGS. 10A and 10B are views for explaining the operation when the seat cushion is lifted.
Figure 10B:
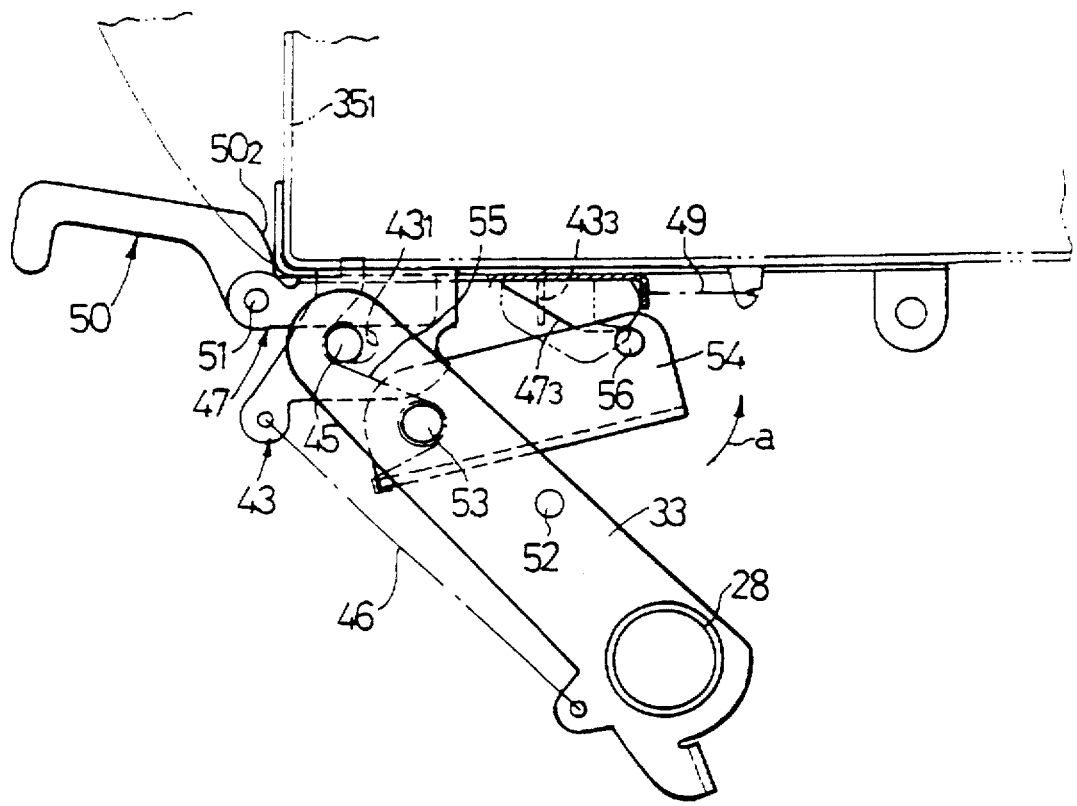

When the front end of the lever 50 is pulled upwards from this state, the slide piece 47 is slid forwards relative to the lock bracket 43 against the force of the spring 49, as shown in FIG. 10A, so that the locking claws $47_2$, $47_2$ are moved over the lower surface of the locking pin 52 for use in the lowered position and thus disengaged. As a result, as shown in FIG. 10B, the front links 33, 33 biased by the spring 46, 46 and the rear link 39 biased by the spring 42 are righted to lift the front seat cushion 4. In the course of the rising of the front seat cushion 4, the locking bar 54 biased in the direction of the arrow a by the spring 55 is righted, so that the locking pin 56 for use in the lifted position is moved forwards over the cams $47_3$, $47_3$ of the slide piece 47 to come into engagement with the front surface of the locking claw $43_3$ provided on the lower surface of the lock bracket 43.

Figure 6:
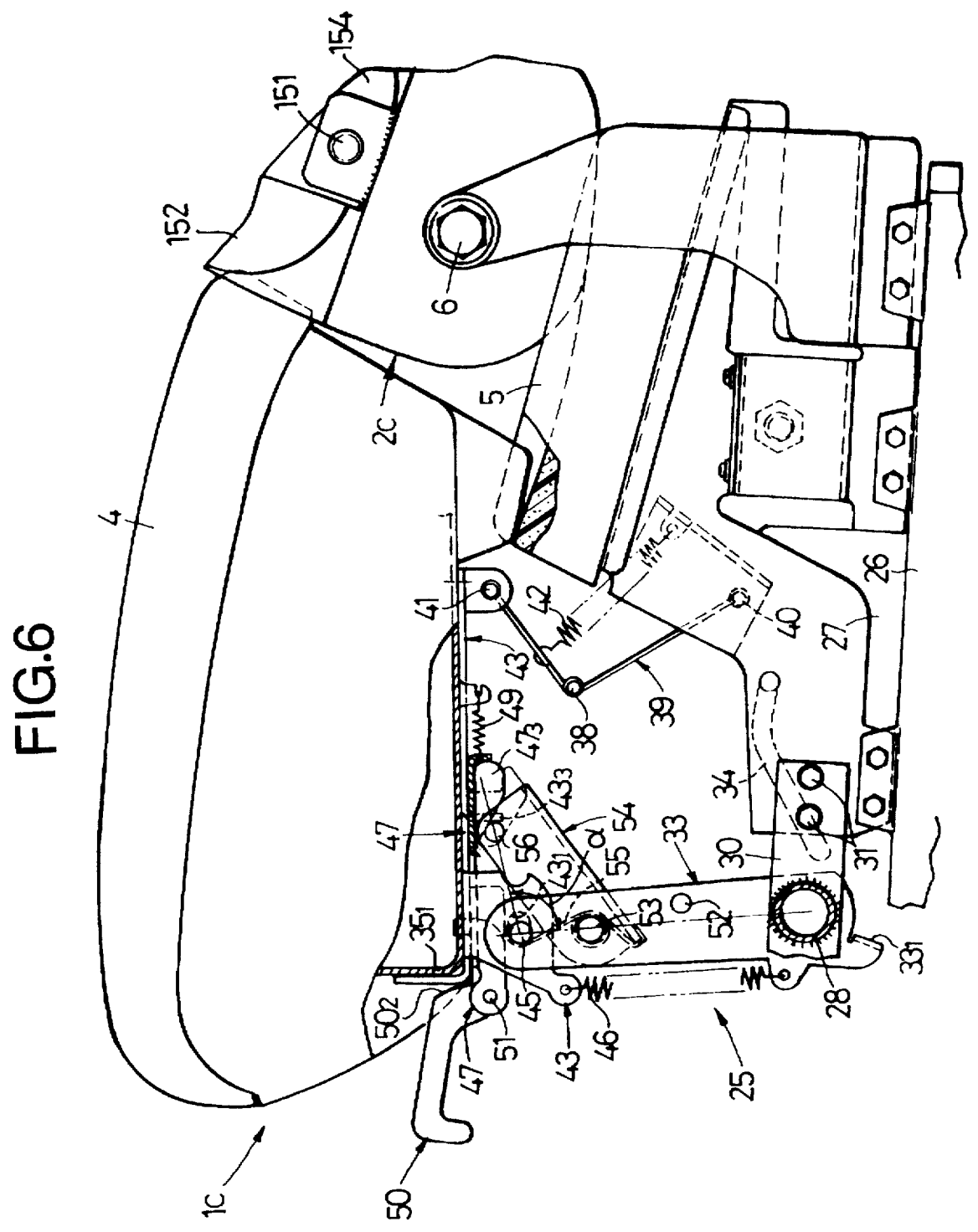
Figure 16:
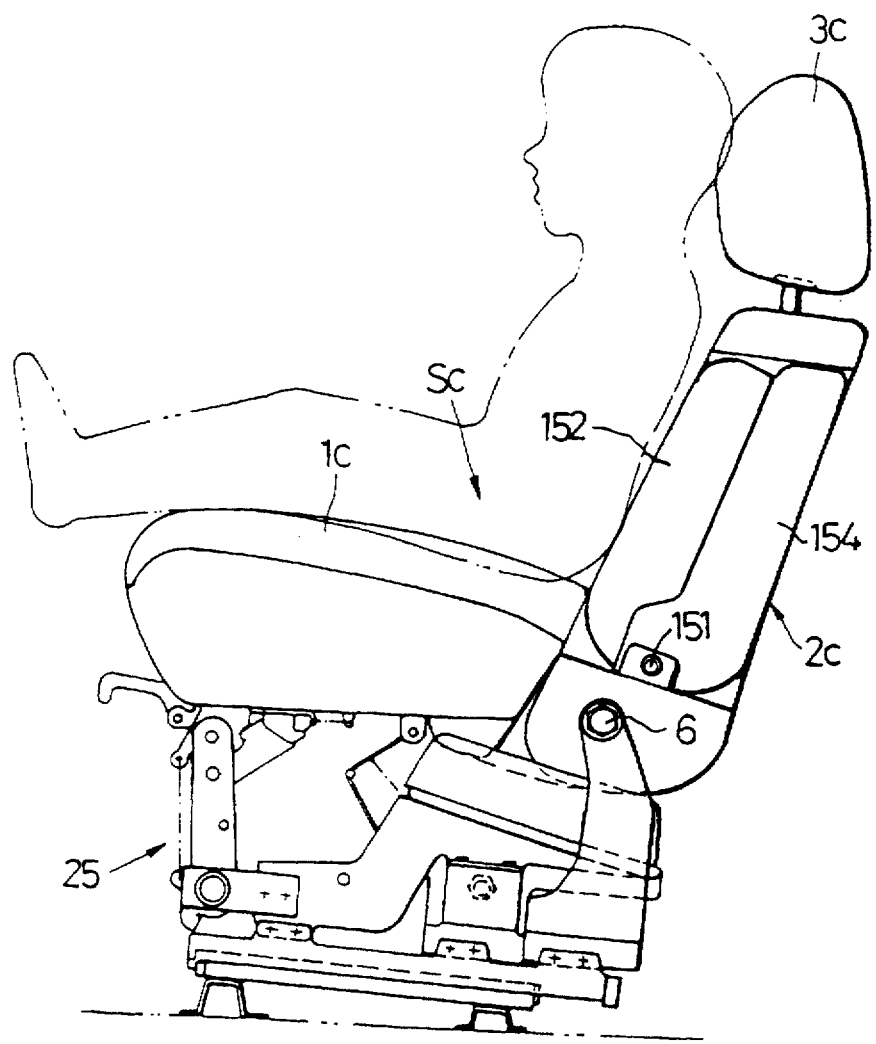
FIG. 16 is a view showing a state in which the seat cushion is used as a child seat.

When the front seat cushion 4 is in the lifted position shown in FIG. 6, the rear end of the front seat cushion 4 rides onto the front end of the rear seat cushion 5, whereby a downward load applied to the rear portion of the front seat cushion 4 is supported. In addition, a downward load applied to the front portion of the front seat cushion 4 is supported by the front link 33 righted to a substantially vertical attitude. Further, a load intended to move the front seat cushion 4 forwards is supported by the lock bracket 43, the front links 33, 33 and the locking bar 54 forming a triangle. When the front seat cushion 4 is in the lifted position, it can be used as a child seat for a child seated on an upper surface thereof, as shown in FIG. 16.

The operation with the reclining angle of the seat back $2_C$ changed with the front seat cushion 4 lifted will be described below.

Figure 12:
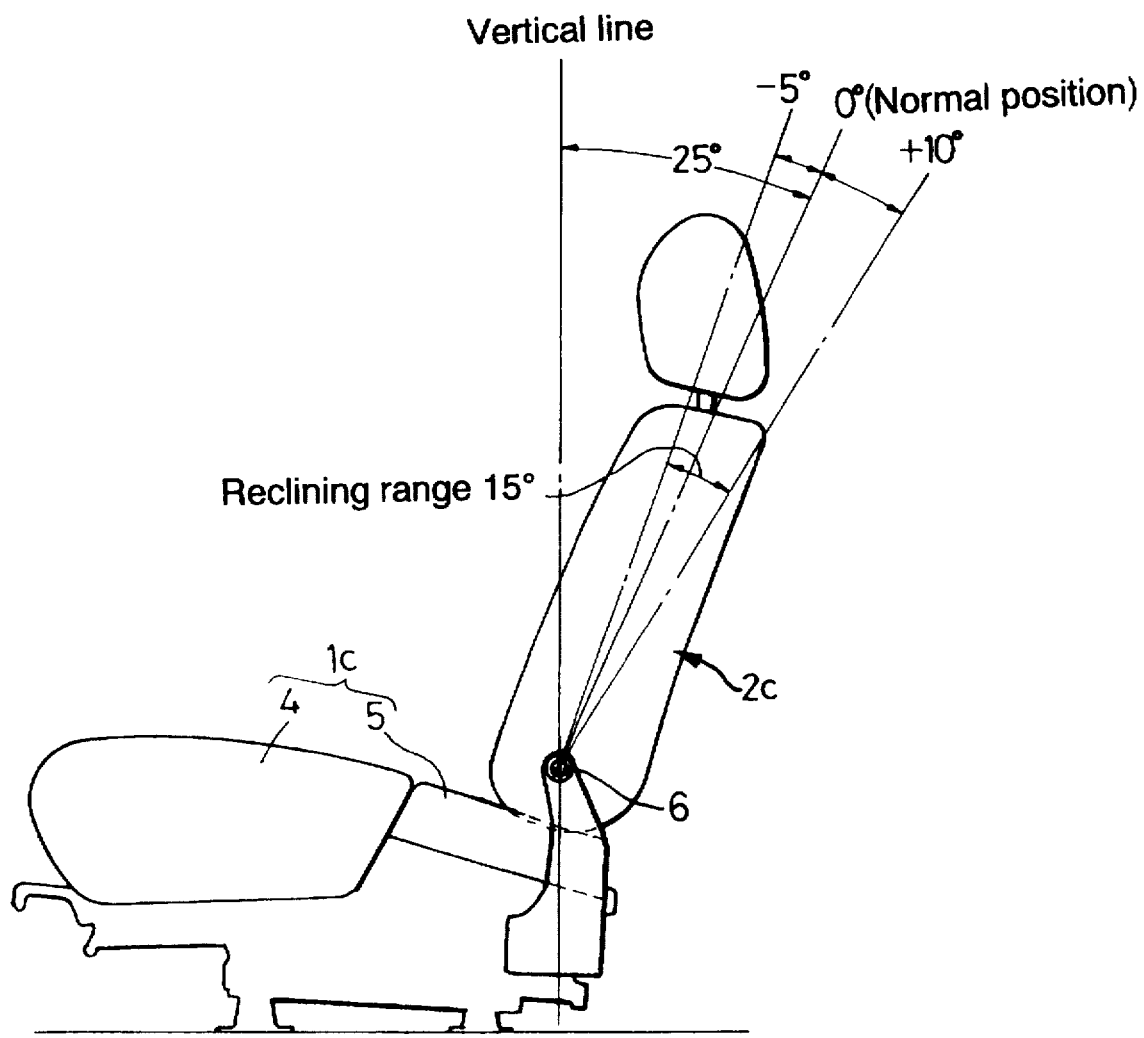
FIG. 12 is a view showing a reclining angle of the seat back.

As shown in FIG. 12, the position of the seat back $2_C$ inclined rearwards through 2° from a vertical line is a normal position, and when the seat back $2_C$ is inclined rearwards through 10° from the normal position, it reaches a most rearward-inclined position, and when the seat back $2_C$ is inclined forwards through 5° from the normal position, it reaches a most forward-inclined position. Therefore, the seat back $2_C$ is swingable forwards and rearwards over a range of 15°.

Figure 13:
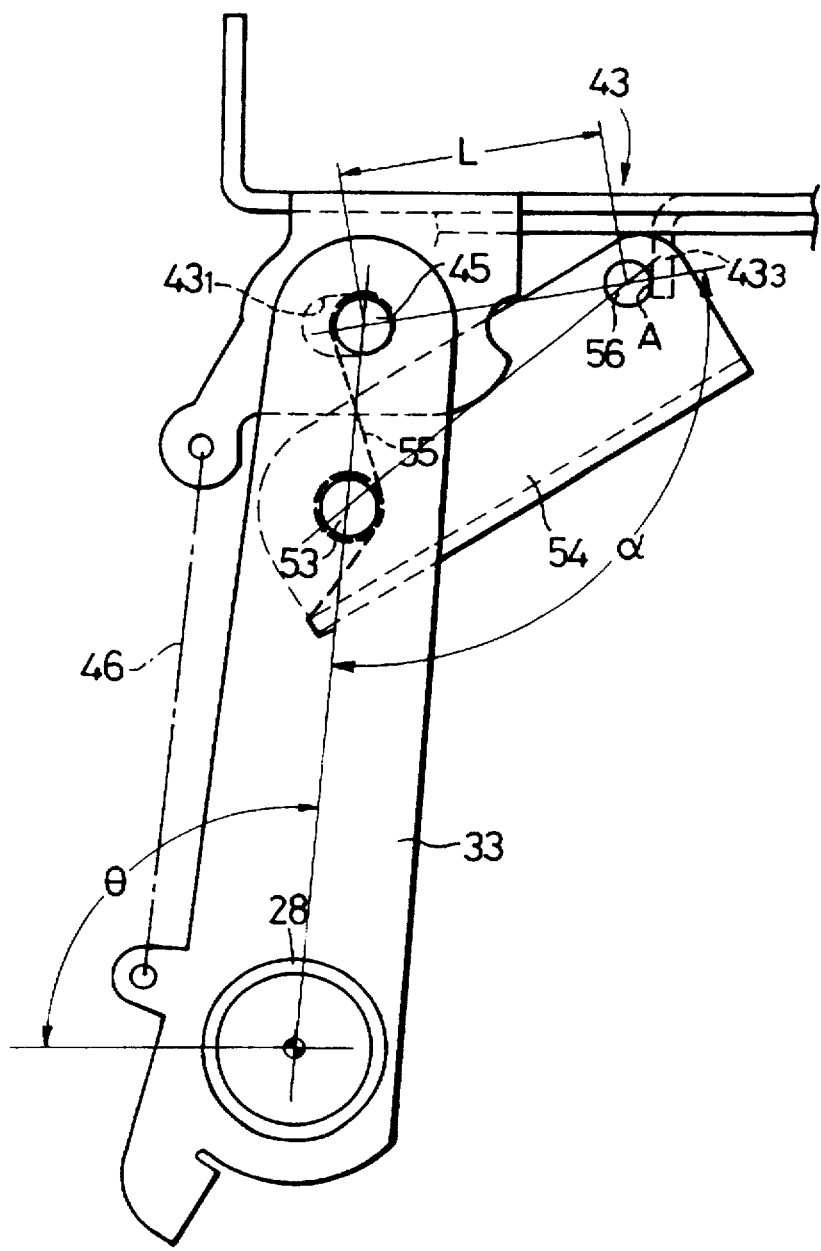
FIG. 13 is a view for explaining the operation (in a state with a reclining angle of 0°.

When the seat back $2_C$ is in the normal position, the front links 33, 33 are slightly inclined rearwards, as shown in FIG. 13, so that the pins 45 provided on the front links 33, 33 abut against the rear ends of the elongated bores $43_1$, $43_1$ provided in the lock bracket 43, and the pin 56 provided on the locking bar 54 engages the front surface of the locking claw $43_3$ of the lock bracket 43 at a point A.

Figure 14:
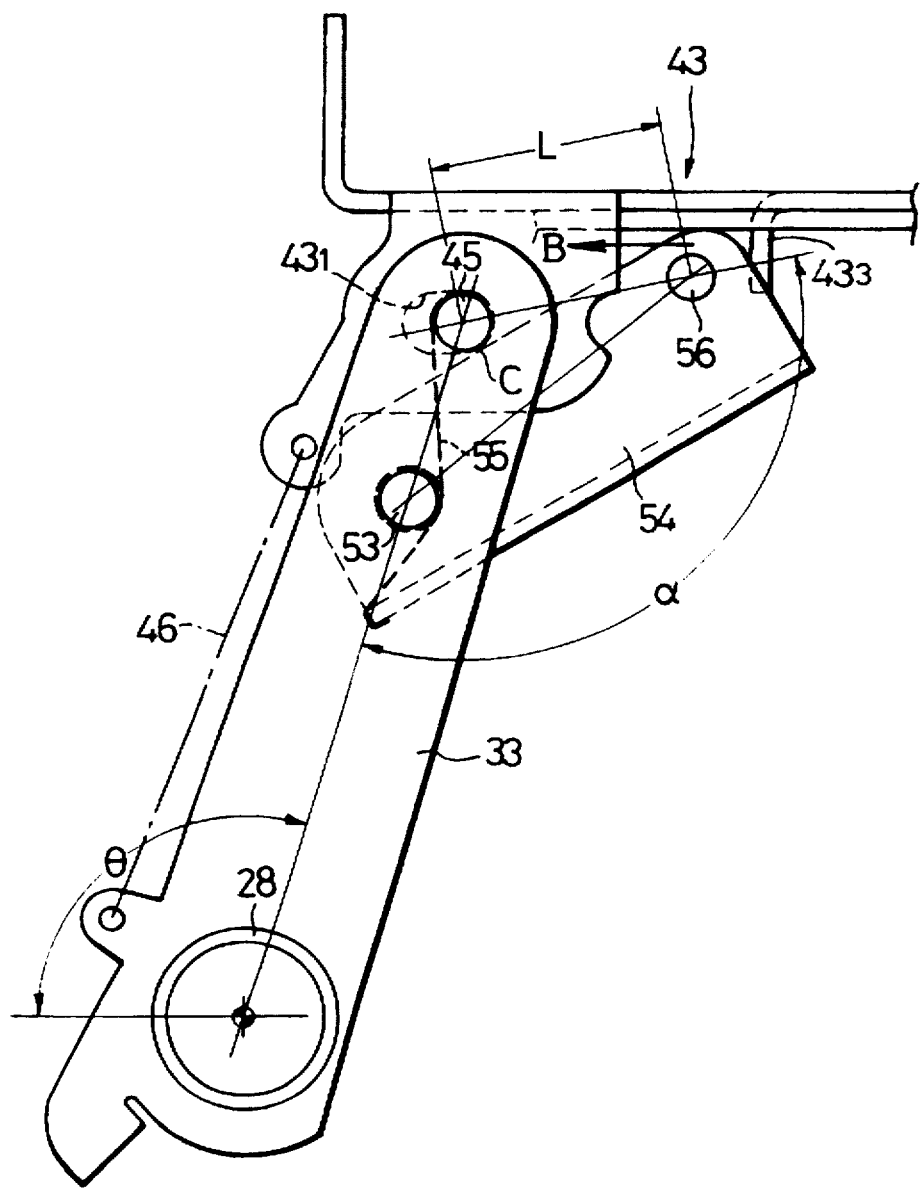
FIG. 14 is a view for explaining the operation (in a state with a reclining angle of 10°.

When the seat back $2_C$ is tilted rearwards from the normal position toward the most rearward-inclined position shown in FIG. 14, the front links 33, 33 is swung rearwards by the resilient forces of the springs 46, 46, whereby the front seat cushion 4 is moved rearwards following the seat back $2_C$. At this time, the pin 56 of the locking bar 54 abutting against the front surface of the locking claw $43_3$ of the lock bracket 43 is separated from the locking claw $43_3$ and moved forwards, i.e., the rear end of the locking bar 54 provided with the pin 56 is slid in a direction of an arrow B along the lower surface of the lock bracket 43, whereby the shape of the triangle formed by the pin 45, the pin 53 and the locking pin 56 for use in the lifted position is changed to permit the rearward swinging movement of the front links 33, 33 (see FIG. 7). When the seat back $2_C$ reaches the most rearward-inclined position shown in FIG. 14, the pins 45 abut against the locking bar 54 at a point C and hence, the front links 33, 33 cannot be further moved rearwards. Such a position is a rearmost position of the front seat cushion 4.

Figure 15:
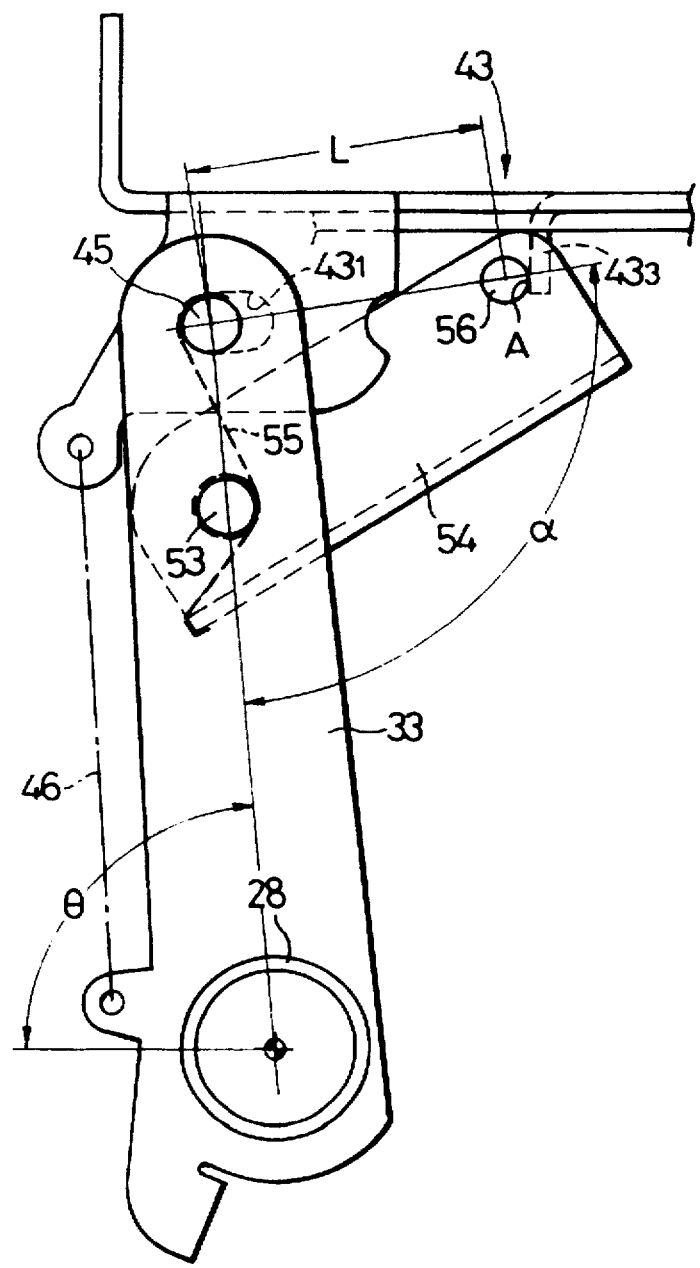
FIG. 15 is a view for explaining the operation (in a state with a reclining angle of 5°.

On the other hand, when the seat back $2_C$ is tilted forwards from the normal position toward the most forward-inclined position, the front seat cushion 4 urged to the seat back $2_C$ is moved forwards along with the seat back $2_C$ while swinging the front links 33, 33 forwards against the resilient forces of the springs 46, 46. At this time, the pins 45 of the front links 33, 33 are slid from the rear ends of the elongated bores $43_1$, $43_1$ toward the front ends of the elongated bores $43_1$, $43_1$, whereby the shape of the triangle formed by the pin 45, the pin 53 and the locking pin 56 for use in the lifted position is changed to permit the forward swinging movements of the front links 33, 33. When the seat back $2_C$ reaches the most forward-inclined position, the pins 45 abut against the front ends of the elongated bores $43_1$, $43_1$, as shown in FIG. 15 and hence, the front links 33, 33 cannot be further swung. Such a position is a foremost position of the front seat cushion 4.

As can be seen from FIGS. 13 to 15, when the front seat cushion 4 is in the lifted position, the amount of front seat cushion 4 displaced rearwards is increased in proportion to the angle θ which is a righted angle of the front link 33. This angle θ is proportional to the angle α formed by the front link 33 and the lock bracket 43. If the distance between the pins 45 and 56 is represented by L, the distance L is varied with the backward and forward movements of the pin 56 along the lower surface of the lock bracket 43.

More specifically, when the seat back $2_C$ is locked at the most rearward-inclined position shown in FIG. 14, the pin 56 is slid forwards, whereby the angles α and θ are fixed at the maximum and the distance L is fixed at the minimum. On the other hand, when the seat back $2_C$ is locked at the most forward-inclined position shown in FIG. 15, the pin 56 is slid rearwards, whereby the angles α and θ are fixed at the minimum and the distance L is fixed at the maximum. When the front seat cushion 4 is ion the lifted position, the locking lever 54 is connected to the front link 33 above the central portion and hence, whether the length of the locking lever 54 is larger or short, the angle α is an obtuse angle and the angle θ which is the righted angle of the front link 33 is near 90°. Thus, with the lock bracket 54 and the front link 33 of minimum lengths, a sufficient lifted amount can be obtained, and a reduction in size of the mechanism can be achieved.

The rear link 39 supporting the rear portion of the front seat cushion 4 is formed of the two plates bendable at substantially central portions and does not constitute a parallel link mechanism together with the front link 33. Therefore, even if the shape of the rear seat cushion 5 and the structure of the lifting mechanism are not taken into a special consideration, the front seat cushion 4 can be smoothly lifted and lowered while avoiding the interference of the rear end of the front seat cushion 4 with the front end of the rear seat cushion 5, and during lifting of the front seat cushion 4, the forward and rearward movements of the front seat cushion 4 can be performed without leaving of a gap between the front seat cushion 4 and the rear seat cushion 5.

The front seat cushion 4 which is in the lifted position is movable forwards and rearwards within a range of reclining of the seat back $2_C$ and hence, not only the reclining angle of the seat back $2_C$ can be freely changed without interfering with the front seat cushion 4, but also a gap can be prevented from being produced between the front seat cushion 4 and the seat back $2_C$ to enhance the seating comfort and the outer appearance. In addition, the rear link 39 is bendable at the substantially central portion and hence, when the weight of a child is applied to the front seat cushion 4 which is in the lifted position, the lower surface of the front seat cushion 4 at its rear end can be put into abutment against the upper surface of the rear seat cushion 5 at its front end, whereby the a portion of the load applied to the front seat cushion 4 can be supported on the rear seat cushion 5 to alleviate the load of the lifting mechanism 25.

Figure 11A:
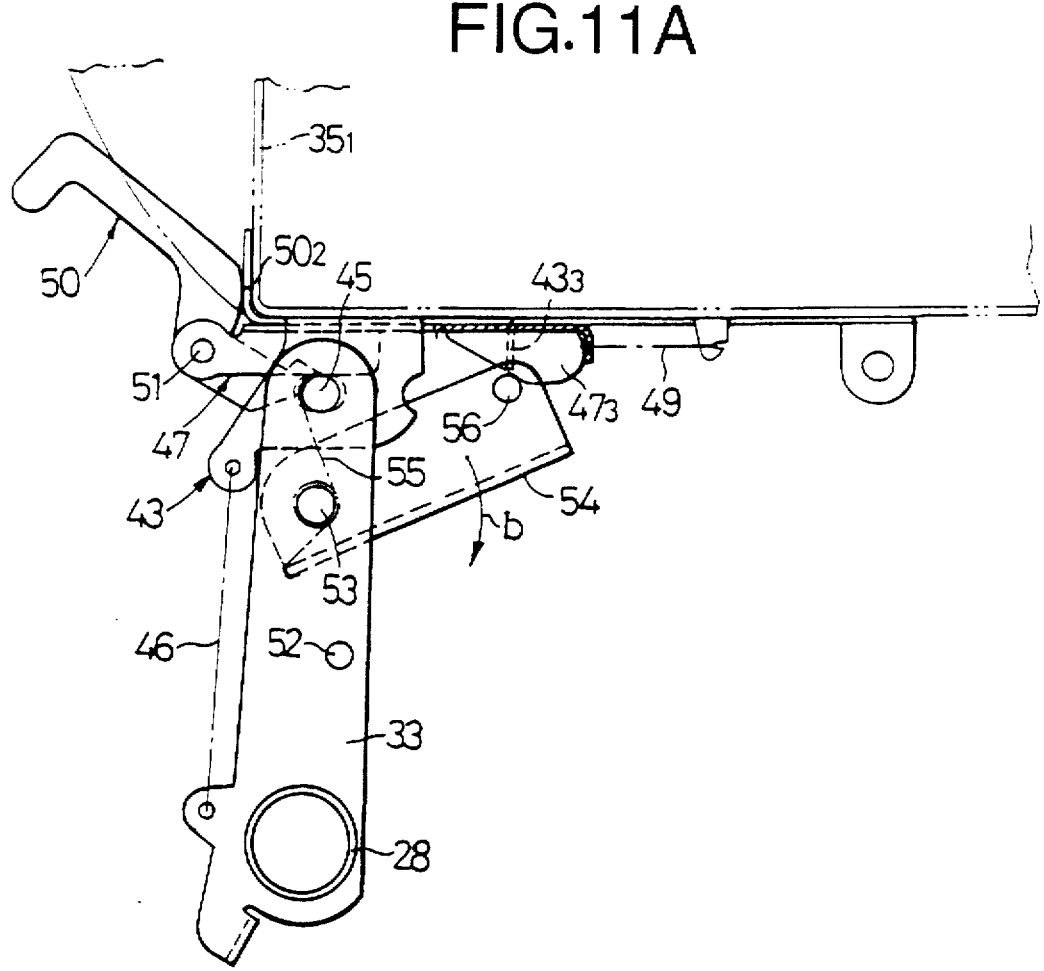
FIGS. 11A and 11B are views for explaining the operation when the seat cushion is lowered.
Figure 11B:
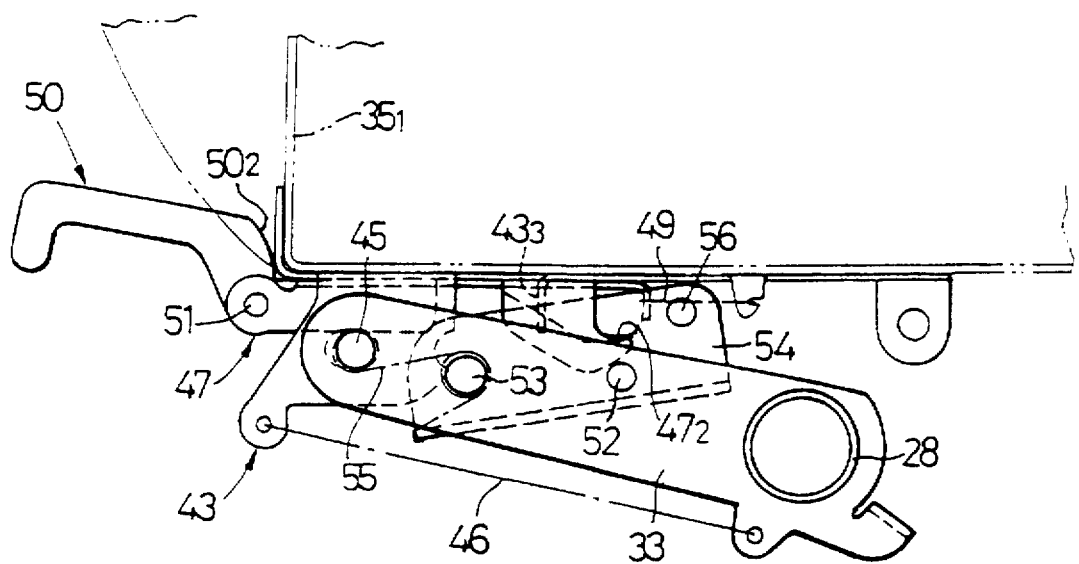

Now, when the front end of the lever 50 is pulled upwards to slide the slide piece 47 forwards in order to lower the front seat cushion 4 which is in the lifted position, the locking pin 56 for use in the lifted position is urged against the cams $47_3$, $47_3$ of the slide piece 47 to swing the locking bar 54 in the direction of the arrow b, as shown in FIG. 11C, thereby releasing the engagement of the locking pin 56 for use in the lifted position with the locking claw $43_3$ provided on the lock bracket 43. When the front seat cushion 4 is urged downwards in this state, the front links 33, 33 and the rear link 39 are tilted down to permit the lowering of the front seat cushion 4.

When the front seat cushion 4 is further pushed up, as shown in FIG. 11D, the locking claws $47_2$, $47_2$ of the slide piece 47 is soon brought into engagement with the lower surfaces of the locking pins 52, 52 of the front links 33, 33 for use in the lowered position, whereby the front seat cushion 4 is locked in the lowered position (see FIG. 3).

As described above, the seat cushion $1_C$ of the central seat $S_C$ usually used as an adult seat can be used as an arm rest or a child seat, thereby enhancing general-purpose properties of the central seat $S_C$.

Figure 20:
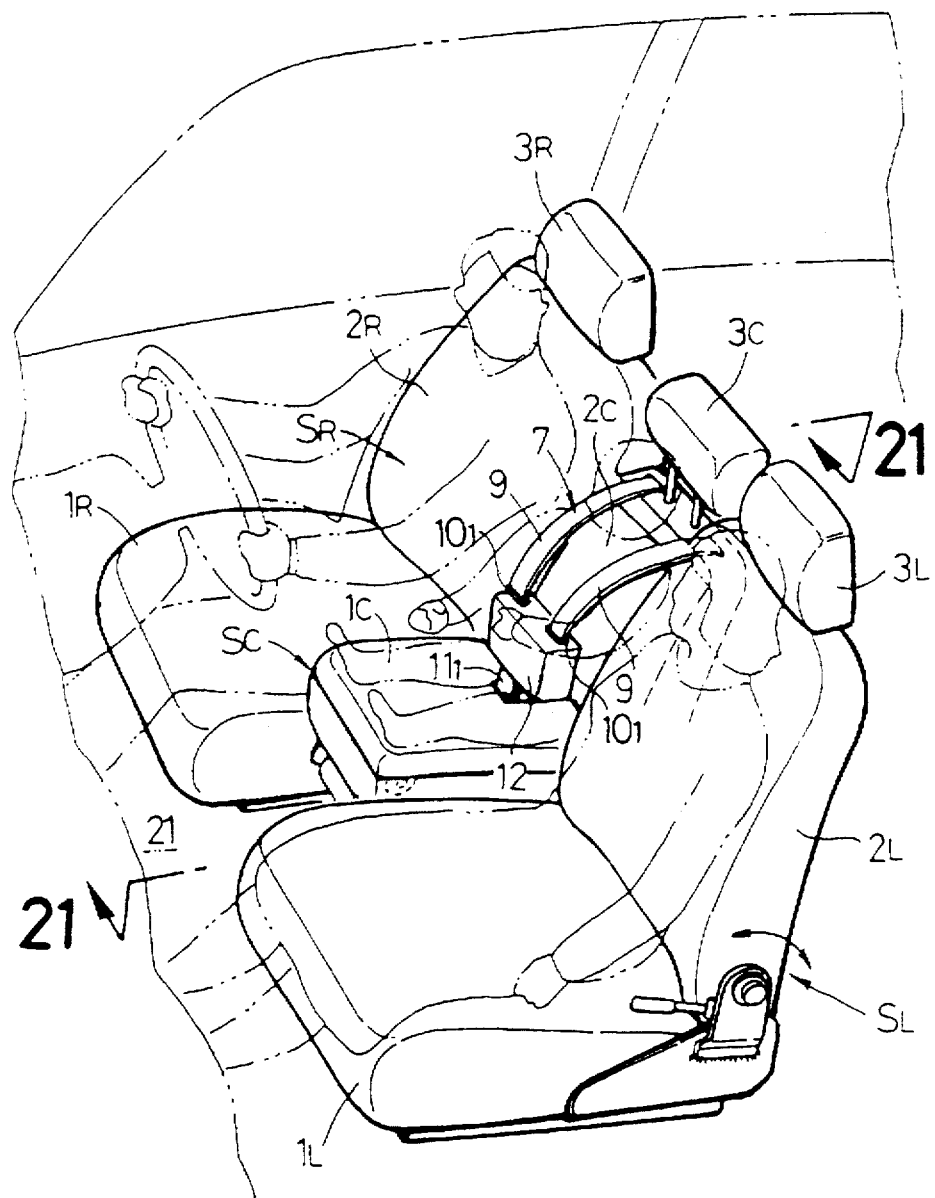
FIG. 20 is a perspective view showing the child seat in a service state.
Figure 21:
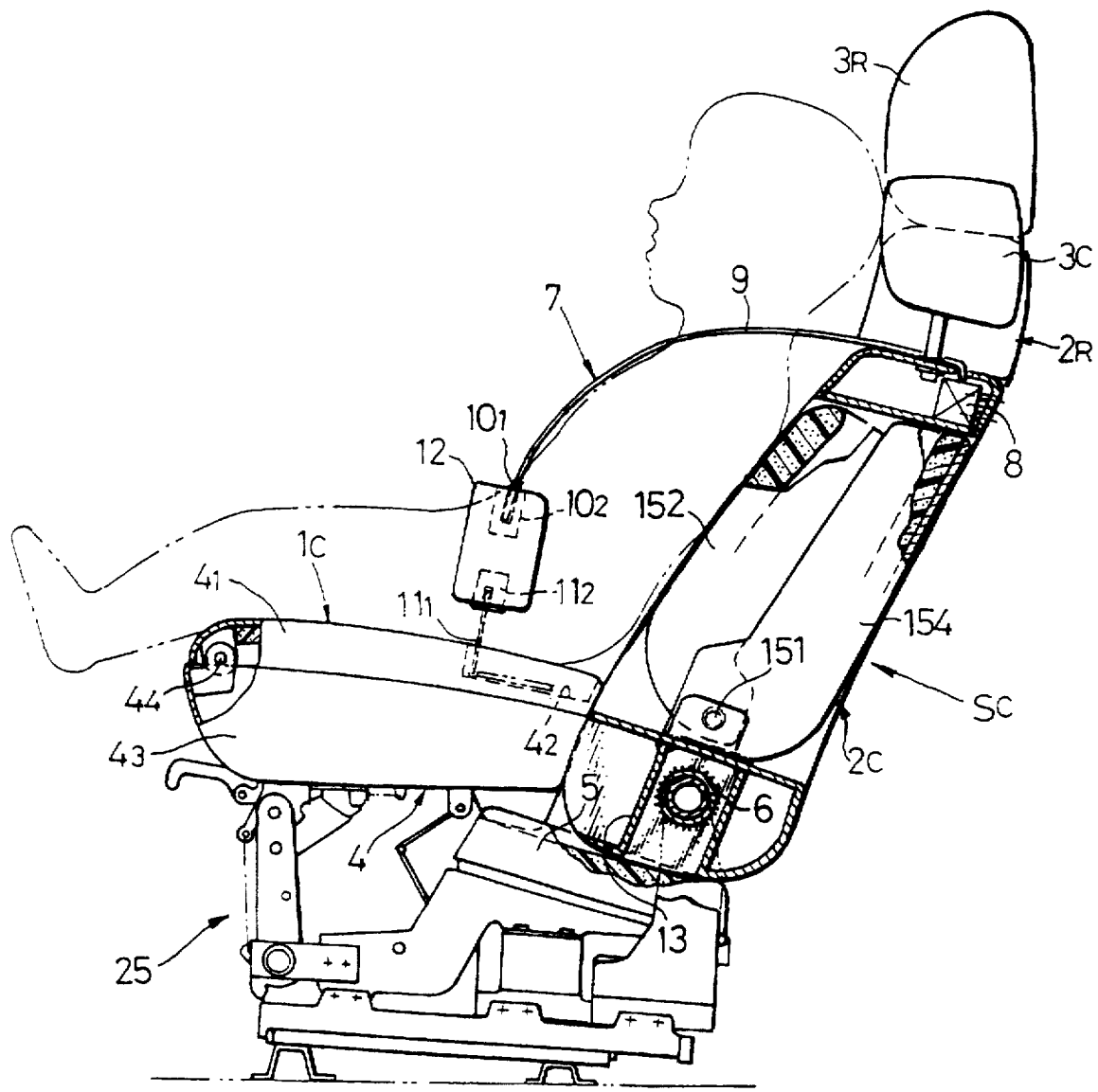
FIG. 21 is an enlarged view taken along a line 21—21 in FIG. 20.

The structure of the seat back $2_C$ of the central seat $S_C$ will be described with reference to FIGS. 20 to 24. As shown in FIGS. 20 and 21, the central seat $S_C$ is comprised of the seat cushion $1_C$, the seat back $2_C$ pivotally supported at the rear end of the seat cushion $1_C$ through the reclining shaft 6, and the head rest $3_C$. The seat cushion $1_C$ is bisected into the fore-side front seat cushion 4 and the back-side rear seat cushion 5. A soft pad $4_5$ is affixed to an inner surface of the lid $4_1$ of the front seat cushion 4. The front seat cushion 4 is liftable and lowerable between the lowered position connected to the front side of the rear seat cushion 5, and the lifted position in which the rear end of the front seat cushion 4 is superposed on the front end of the rear seat cushion 5. If the front seat cushion 4 of the central seat $S_C$ is lowered, an adult can seat on the front seat cushion 4. If the front seat cushion 4 of the central seat $S_C$ is lifted, a child can seat on the front seat cushion 4.

A child seat belt device 7 provided on the central seat $S_C$ includes a pair of left and right belts 9, 9 capable of being drawn out from retractors 8, 8 mounted within the seat back $2_C$ onto the upper surface of the seat back $2_C$, two tongues $10_1$, $10_1$ provided at tip ends of the belts 9, 9, a tongue $11_1$ rightably accommodated in an tongue-accommodating recess $4_2$ defined in a central portion of the upper surface of the front seat cushion 4, and a protecting pad 12 made of a soft material and including three buckles $10_2$, $10_2$ and $11_2$ capable of being coupled to the three tongues $10_1$, $10_1$ and $11_1$. A protecting-pad accommodating recess 13 is defined in a lower portion of the front surface of the seat back $2_C$, so that the protecting pad can be fitted into the recess 13. Alternatively, the protecting-pad accommodating recess 13 may be provided in the rear surface of the seat back $2_C$.

Figure 22:
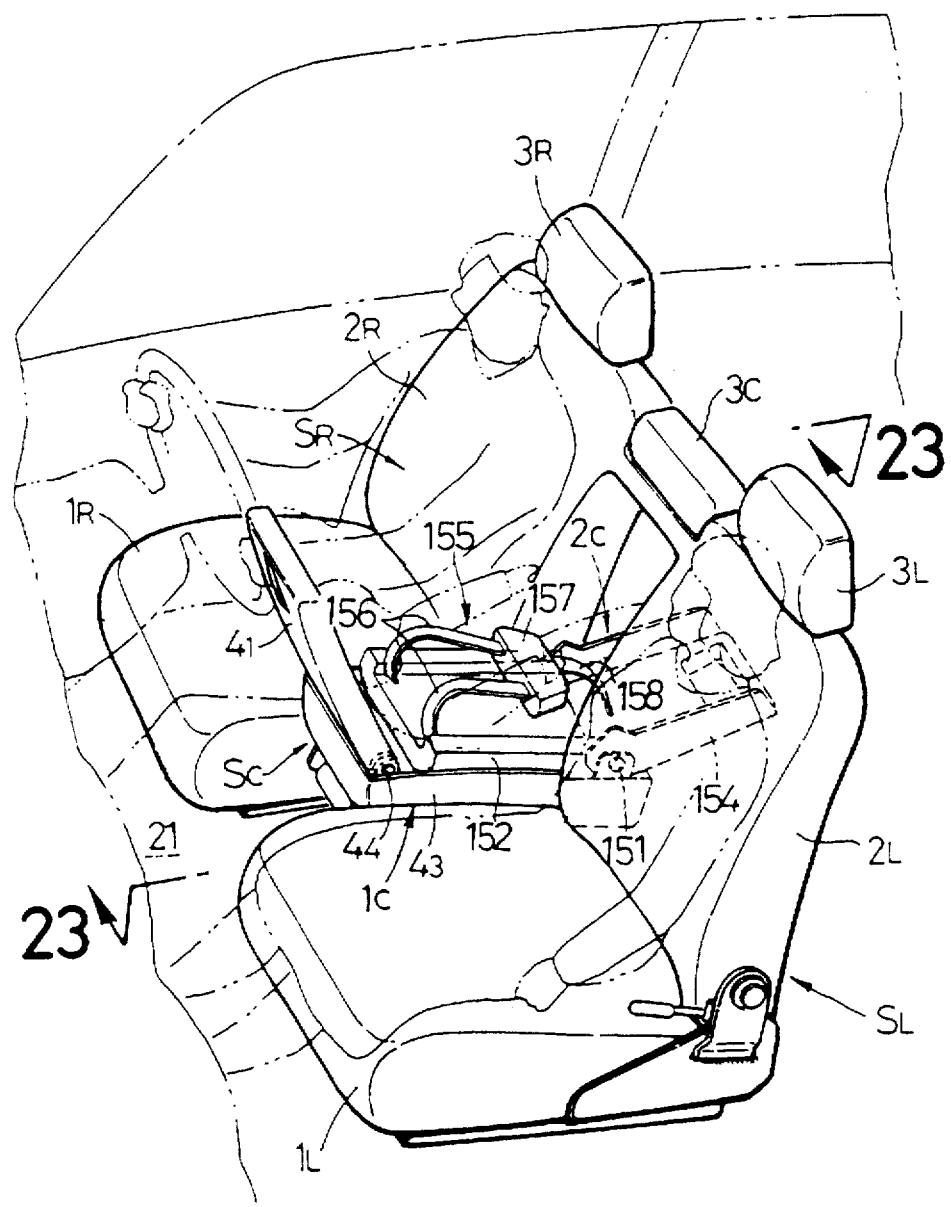
FIG. 22 is a perspective view showing a baby basket in a service state.
Figure 23:
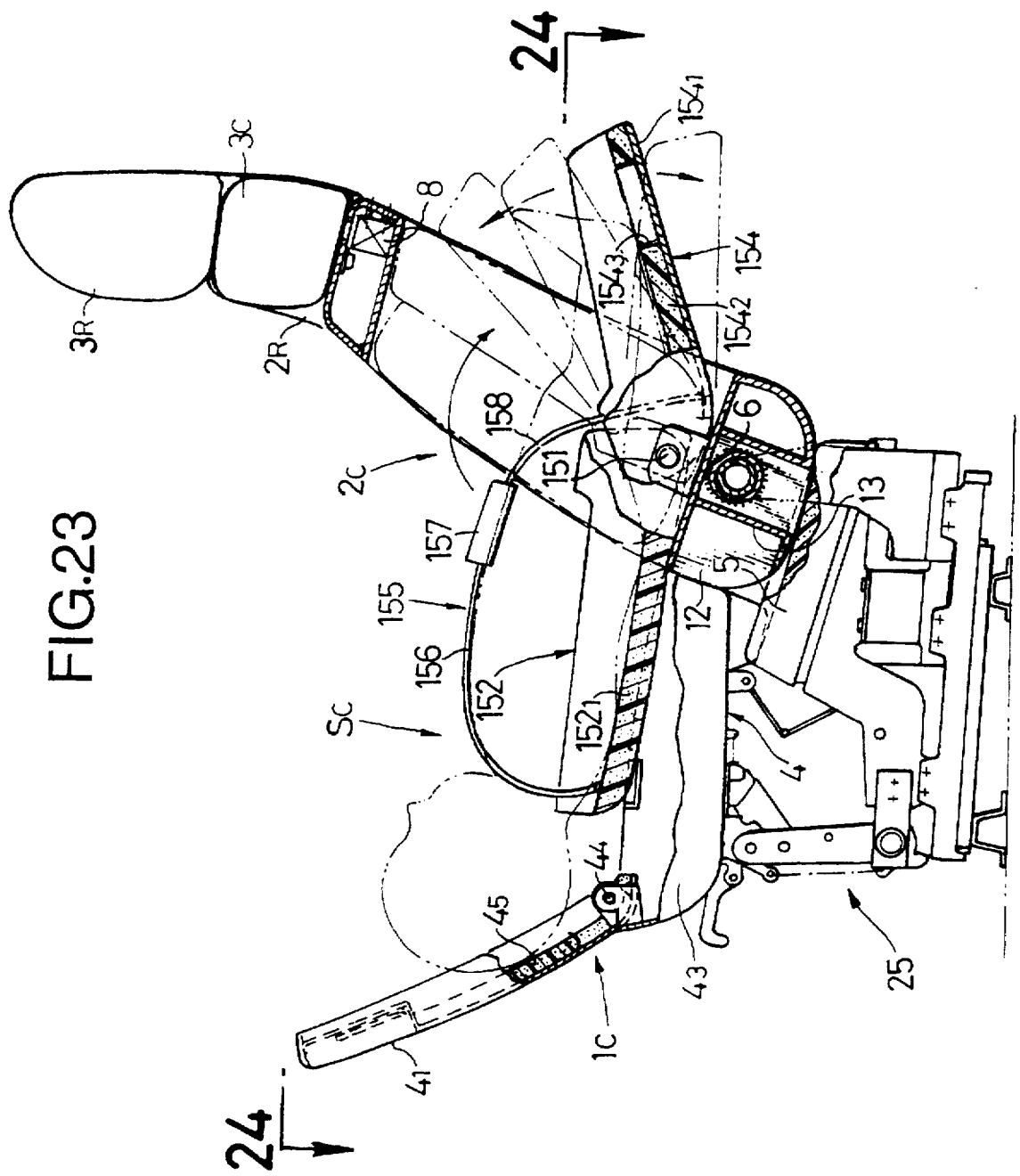
FIG. 23 is an enlarged view taken along a line 23—23 in FIG. 22.
Figure 24:
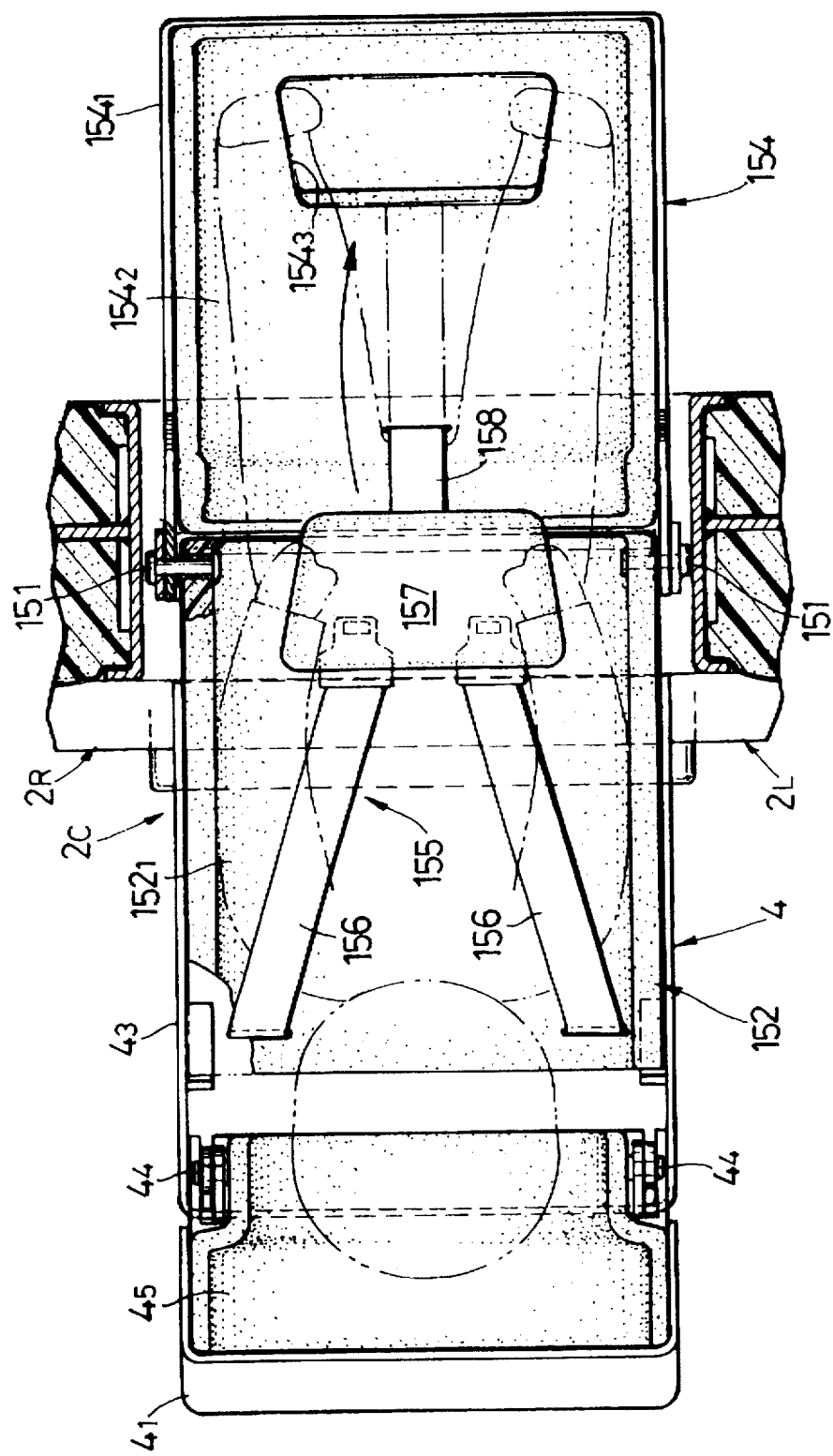
FIG. 24 is a view taken along a line 24—24 in FIG. 24.
Figure 25:
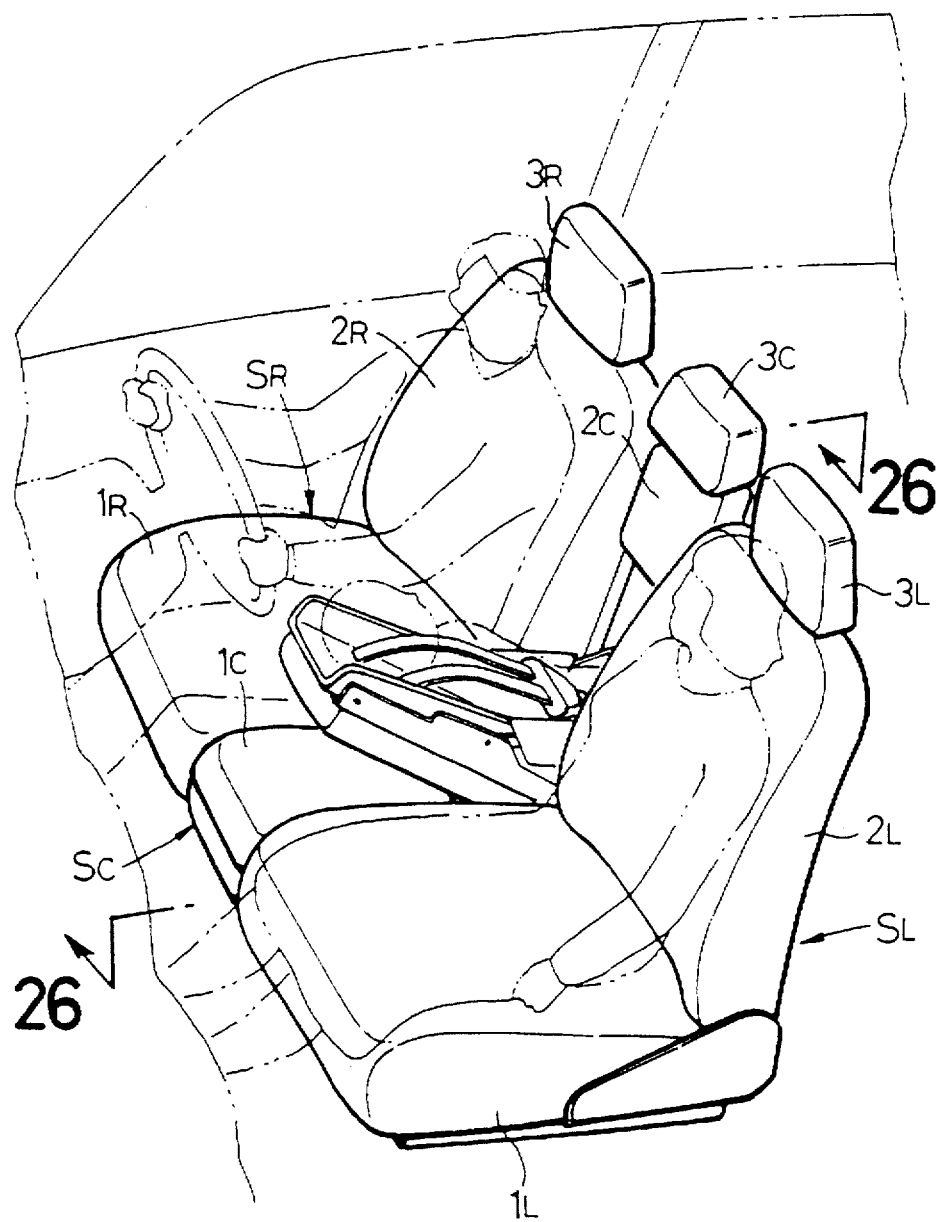
FIG. 25 a perspective view of a front seat in a multifunctional seat arrangement according to a second embodiment of the present invention.
Figure 26:
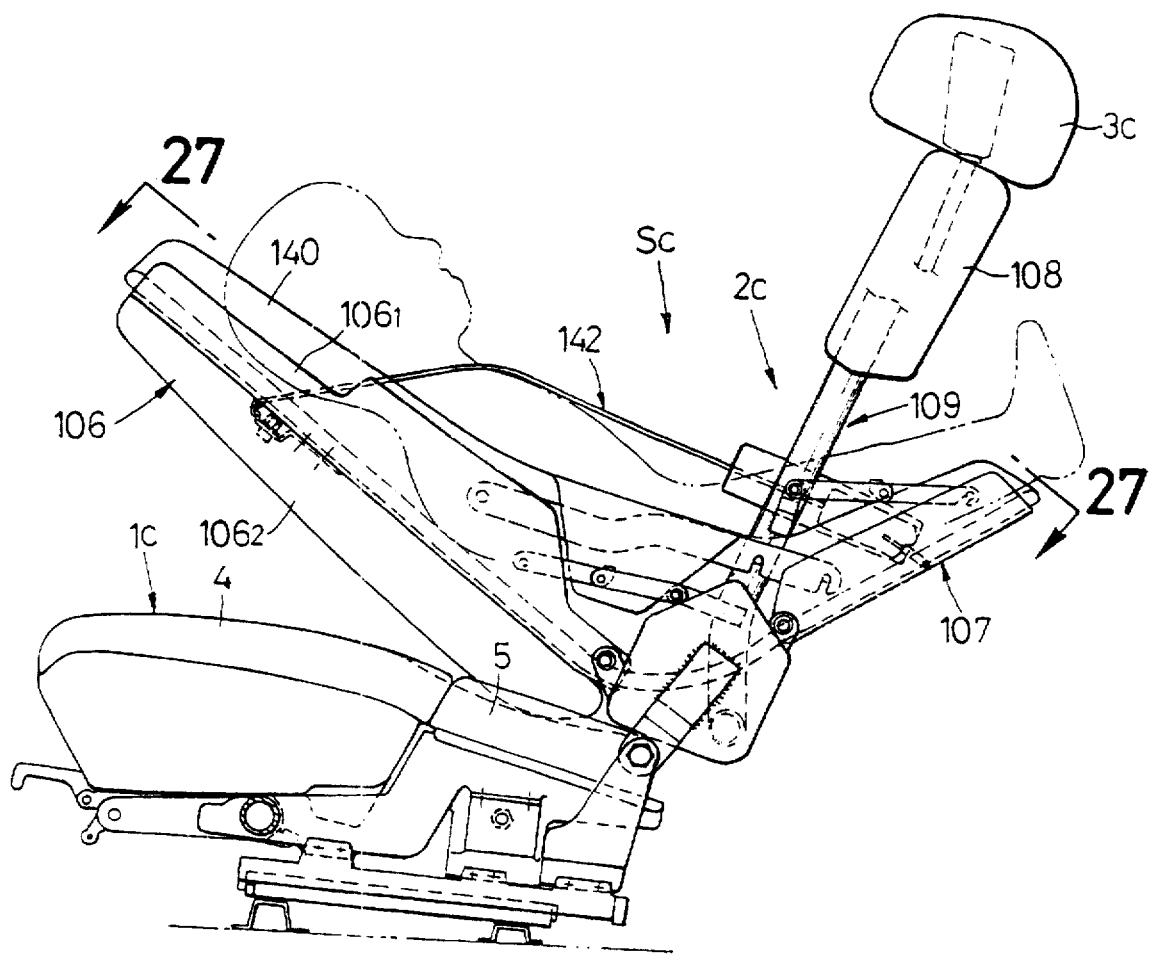
FIG. 26 is an enlarged view taken along a line 26—26 in FIG. 25.
Figure 27:
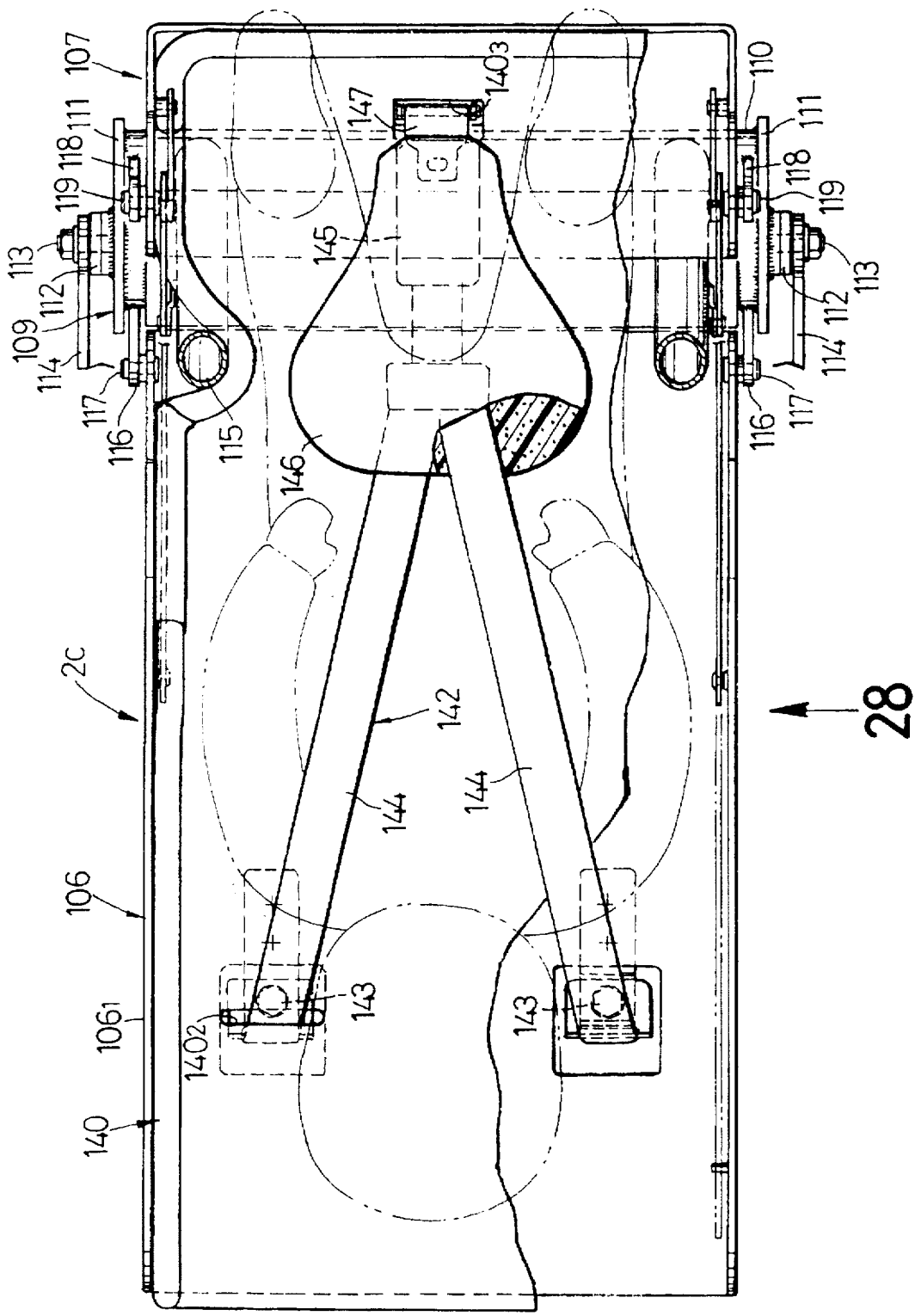
FIG. 27 is a view taken along a line 27—27 in FIG. 26.

As shown in FIGS. 22 to 24, the seat back $2_C$ of the central seat $S_C$ includes a front seat back 152 pivotally supported for longitudinally swinging movement by a pin 151, and a rear seat back 154 pivotally supported for longitudinally swinging movement by the pin 151. Most of the front seat back 152 excluding a portion pivotally supported by the pin 151 is formed of a soft pad, while an outer portion of the rear seat back 154 is formed of a relatively had resin $154_1$, and an inner portion of the rear seat back 154 is formed of a soft pad $154_2$. The rear seat back 154 includes a locking mechanism (which is not shown), and can be locked in a plurality of positions shown by a solid line and dashed lines in FIG. 23. If the front seat back 152 is tilted down forwards in a state in which the front seat cushion 4 of the central seat $S_C$ has been lifted to open the lid $4_1$, the front seat back 152 is supported on the upper surface of the body portion $4_3$ of the front seat cushion 4.

The baby seat belt device 155 includes two belts 156, 156 fixed at one ends to the front seat back 152, a protecting pad 157 to which the other ends of the belts 156, 156 are releasably coupled, and a belt 158 which connects the protecting pad 157 to the rear seat back 154. In order to accommodate the protecting pad 157 when being not used, a protecting-pad accommodating recess $154_3$ is defined in the rear seat back 154. The baby seat belt device 155 may be detachable from the seat back $2_C$.

To use the central seat $S_C$ as the child seat, the front seat cushion 4 of the seat cushion $1_C$ is lifted; the protecting pad 12 is taken out of the pad accommodating recess 13 in the seat back $2_C$, and the tongue $11_1$ and the buckle $11_2$ are coupled to each other. In this state, a child is put to seat on the front seat cushion 4, as shown in FIG. 21. Then, the two belts 9, 9 are drawn along both shoulders and chest of the child, and the tongues $10_1$, $10_1$ are coupled to the buckles $10_2$, $10_2$. At this time, the protecting pad 12 prevents the buckles $10_2$, $10_2$ and $11_2$ from coming into direct contact with the child's belly. When the central seat $S_C$ is used as the child seat, the intrinsic front seat cushion 4 and seat back $2_C$ are utilized intact. Therefore, not only the seating comfort equivalent to that provided upon use of the central seat $S_C$ as the adult seat can be insured, but also the child's eyes can be put at a higher level, leading to a widened field of view.

When the child seat belt device 7 is not used, the accommodating of the protecting pad 12 in the pad accommodating recess 13 in the seat back $2_C$ eliminates disadvantages that the protecting pad 12 is a hindrance and that the seat back $2_C$ is thickened. Moreover, the protecting pad 12 fitted into the pad accommodating recess 13 constitutes a portion of the seat back 2 and hence, when an adult seats on the protecting pad 12, the pad accommodating recess 13 cannot injure the seating comfort. Additionally, when the front seat cushion 4 is lifted, the pad accommodating recess 13 in the seat back $2_C$ is covered with the front seat cushion 4 and hence, the back of the child seating on the front seat cushion 4 cannot touch the pad accommodating recess 13 to injure the seating comfort.

The baby basket is constituted by tilting down the front seat back 152 and the rear seat back 154 of the seat back $2_C$ forwards or rearwards, after forward turning of the lid $4_1$ in a state in which the front seat cushion 4 of the central seat $S_C$ has been lifted. At this time, the entire body of the baby can be softly supported by the abutment of the baby's belly against the pad $152_1$ which constitutes the body of the front seat back 152; the abutment of the baby's legs against the pad $154_2$ affixed to the inner surface of the rear seat back 154, and further the abutment of the baby's head against the pad $4_5$ affixed to the inner surface of the lid $4_1$ of the front seat cushion 4.

Since the baby basket is constituted using both the seat back $2_C$ and the front seat cushion 4, a sufficient longitudinal length of the baby's basket can be insured, and even a baby having a relatively large height can be sufficiently supported. In addition, the front seat back 152 to which the weight of the baby is applied chiefly is supported on the body portion $4_3$ of the front seat cushion 4 and hence, the load applied to the pin 151 can be decreased to enhance the rigidity of the front seat back 152, and the weight of the baby can be reliably supported. Further, the pad $152_1$ constituting the front seat back 152 is utilized intact as a main pad for the baby basket, leading to a decreased number of parts.

In addition, the front and rear seat backs 6 and 7 are provided at the seat back $2_2$ of the central seat $S_C$ and hence, even if they are swung back and forth, they cannot obstruct occupants on the left and right front seats and the left and right rear seats, and there is not a disadvantage that the resident property is injured. Moreover, it is possible for the baby lying centrally to talk impartially with the occupants lying on the left and right of the baby, leading to an increased pleasure. Further, the central seat $S_C$ located substantially centrally is deformable and hence, for example, in sedan-type four-seated vehicle, the getting of four persons on the vehicle can be insured without influencing the riding comfort and the resident property. Yet further, when the seat back $2_C$ of the front central seat $S_C$ is used as an article compartment or an article rest, four front and rear, left and right occupants can impartially use it. When the seat back $2_C$ of the rear central seat $S_C$ is used as an article compartment or an article rest, two rear left and right occupants can impartially use it.

A second embodiment of the present invention will now be described with reference to FIGS. 25 to 33.

The second embodiment has a feature in a seat back $2_C$ of a central seat $S_C$ capable of being utilized as a baby basket and a tray.

A seat back frame 109 as a skeleton for the seat back $2_C$ includes a pair of left and right side-plates 111, 111 coupled to each other by a base frame 110 cylindrical in section. Brackets 112, 112 are secured to the side plates 111, 111 and pivotally supported on brackets 114, 114 secured to a rear end of a seat cushion $1_C$ through reclining pins 113, 113, respectively. A frame 115 made of a pipe material is secured at its lower end to the base frame 110.

A front seat back 106 is pivotally supported at its lower end for longitudinally swinging movement on a pair of brackets 116, 116 secured to left and right opposite ends of the base frame 110, through pins 117, 117 as pivotally supporting means. A rear seat back 107 is pivotally supported at its lower end for longitudinally swinging movement on a pair of brackets 118, 118 also secured to the left and right opposite ends of the base frame 110, through pins 119, 119 as pivotally supporting means.

The front seat back 106 is comprised of a body portion $106_1$ made of a hard synthetic resin, and a soft cushion portion $106_2$ having a surface covered with a fabric. The body portion $106_1$ has a sectional shape which opens rearwards. The rear seat back 107 made of a hard synthetic resin has a length about half of that of the front seat back 106 and has a sectional shape which opens forwards.

The front seat back 106 is swingable from a closed position in which a rear surface of an upper portion thereof extends along a front surface of the upper seat back 108, toward a forward-swung position. At the forward-swung position, the front seat back 106 is fixed by first left and right fixing means 120, 120. The first fixing means 120 is comprised of a bracket 121 secured to a lower portion of the frame 115, a base end-side link 123 pivotally supported on a bracket 121 by a pin 122, and tip end-side link 126 pivotally supported on the base end-side link 123 and a sidewall of the body portion $106_1$ of the front seat back 106 by pins 124 and 125, respectively.

When the front seat back 106 is in the forward-swung position, the base end-side link 123 and the tip end-side link 126 of the first fixing means 120 extend rectilinearly to define a maximum swing angle of the front seat back 106. When the front seat back 106 is in the closed position, the base end-side link 123 and the tip end-side link 126 of the first fixing means 120 are folded as shown by a dashed line in FIG. 30.

The rear seat back 107 is swingable from a closed position in which an upper end thereof extends along a lower surface of the upper seat back 108 and a front surface thereof extends along the rear surface of the front seat back 106, toward a first rearward-swung position and a second rearward-swung position. At the first and second rearward-swung positions, the rear seat back is fixed by a pair of second left and right fixing means 127, 127. The second fixing means 127 is comprised of a bracket 128 secured to the lower portion of the frame 115, a base end-side link 130 pivotally supported on the bracket 128 by a pin 129, a tip end-side link 132 pivotally supported on the base end-side link 130 by a pin 131, and a first pin 133 and a second pin 134 which are provided on a sidewall of the rear seat back 107 to protrude therefrom.

Figure 28:
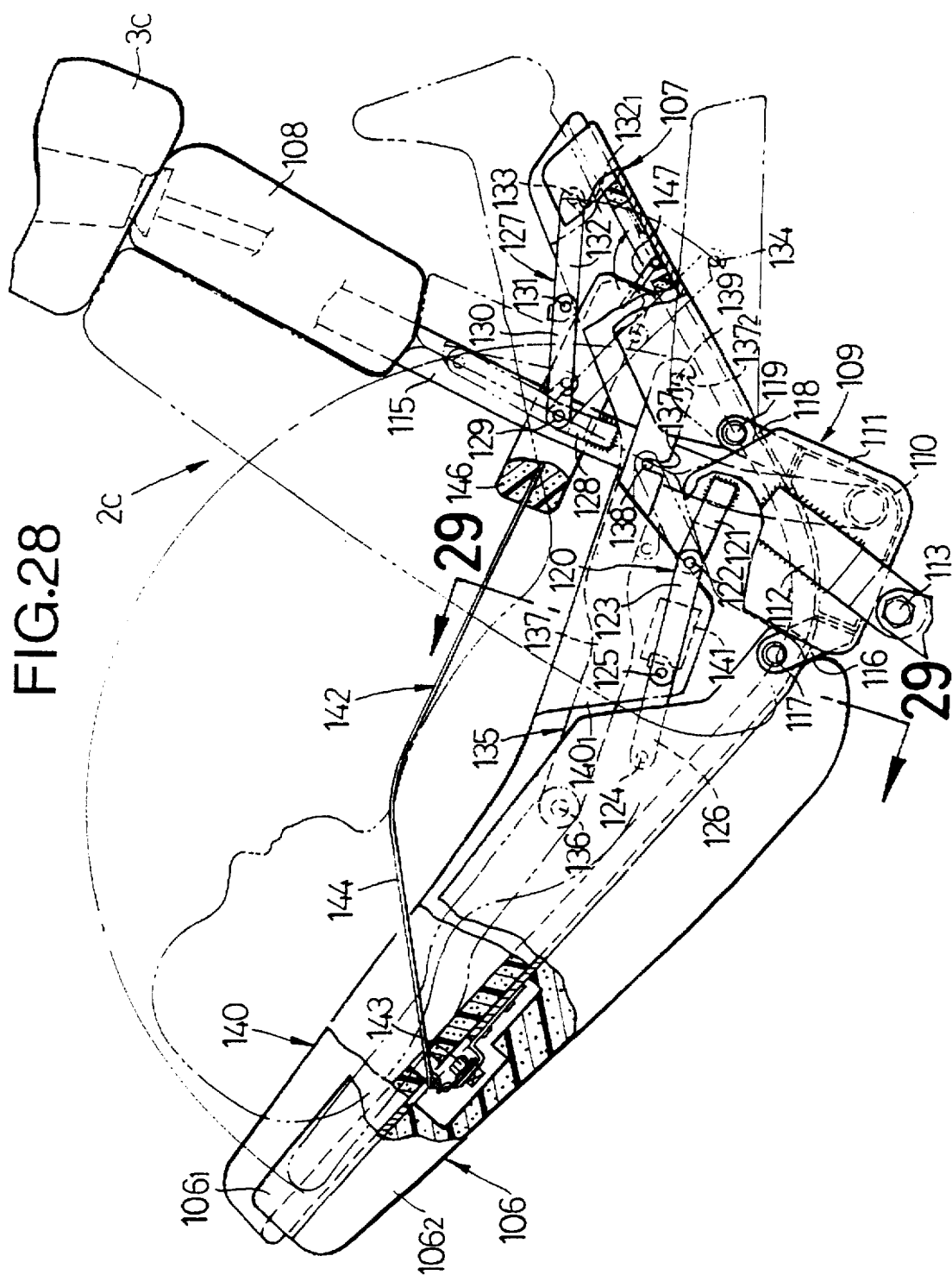
FIG. 28 is a view taken in a direction of an arrow 28 in FIG. 27.
Figure 29:
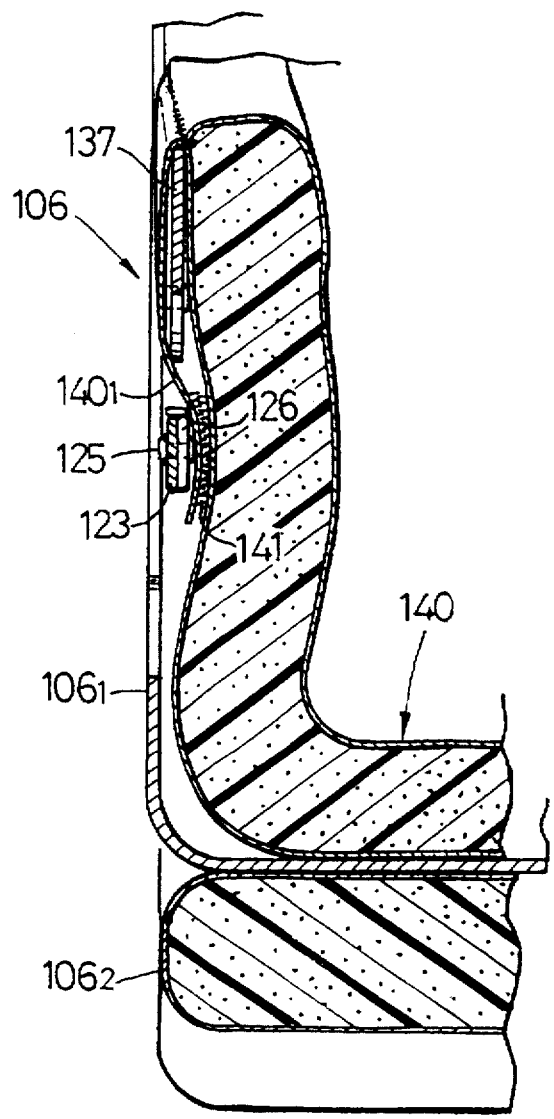
FIG. 29 is an enlarged sectional view taken along a line 29—29 in FIG. 28.
Figure 30:
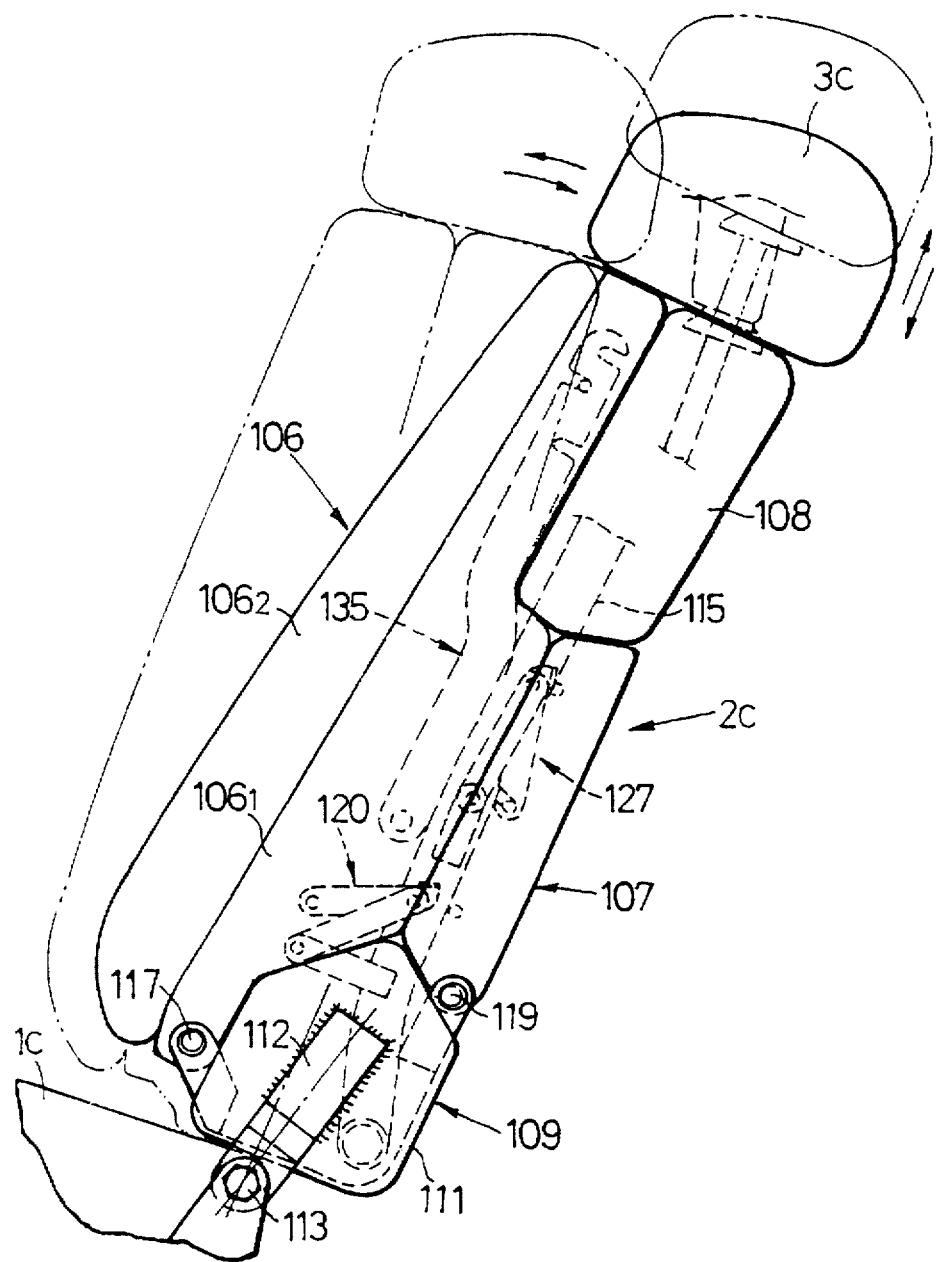
FIGS. 30, 31, 32, 33A, 33B, 33C and 33D are views for explaining the operation.

When the rear seat back 7 is in the first rearward-swung position shown by a solid line in FIG. 28, the base end-side link 130 and the tip end-side link 132 of the second fixing means 127 extend substantially rectilinearly, and a hook $132_1$ of the tip end-side link 132 engages the first pin 133. When the rear seat back 7 is in the second rearward-swung position shown by a solid line in FIG. 32, the base end-side link 130 and the tip end-side link 132 of the second fixing means 127 extend substantially rectilinearly, and the hook $132_1$ of the tip end-side link 132 engages the second pin 134. Further, when the rear seat back 107 is in the closed position, the base end-side link 130 and the tip end-side link 132 of the second fixing means 127 are folded as shown by a dashed line in FIG. 30.

A pair of third left and right fixing means 135, 135 are provided to reliably support the weight of a baby, when the front seat back 106 and the rear seat back 107 are swung respectively to the forward-swung position and the first rearward-swung position for use as a baby basket, as shown in FIG. 28. The third fixing means 135 is comprised of a link 137 pivotally supported on the sidewall of the body portion $106_1$ of the front seat back 106 by a pin 136, a first pin 138 provided on the frame 115 to protrude therefrom, and a second pin 139 provided on the sidewall of the rear seat back 107 to protrude therefrom.

By bringing the first hook $137_1$ and the second hook $137_2$ of the link 137 into engagement with the first pin 138 and the second pin 139, respectively, the front seat back 106 and the rear seat back 107 are firmly fixed at the forward-swung position and the first rearward-swung position, respectively. When the third fixing means 135 is not used, the link 137 is turned through approximately 180° and housed at a position shown by a dashed line in FIG. 28.

When the front and rear seat backs 106 and 107 are used as the baby basket, a detachable cushion 140 is laid on the upper surfaces of the front and rear seat backs 106 and 107. The cushion 140 has folded-back portions $140_1$, $140_1$ provided on left and right opposite sides thereof to protrude therefrom, so that the cushion 140 is fixed by folding back the folded-back portions $140_1$, $140_1$ to cover outer surfaces of the links 137, 137 of the third fixing means 135, 135 and affixing face fasteners 141, 141 to the folded back portions $140_1$, $140_1$.

A baby seat belt 142 for holding back a baby to the baby basket is comprised of a pair of belts 144, 144 secured at one ends thereof to a portion of the front seat back 106 in the vicinity of its upper ends by bolts 143, a protecting pad 146 covering a buckle 145, and a tongue 147 provided on the rear seat back 107 for righting and tilting-down movements. The belts 144, 144 are drawn through openings $140_2$, $140_2$ onto an upper surface of the cushion 140, and the tongue 147 is drawn through an opening $140_3$ onto the upper surface of the cushion 140.

Thus, by lowering the front seat cushion 4 of the seat cushion $1_C$ of the central seat $S_C$ down to the same level as the rear seat cushion 5 and bringing the front an rear seat backs 106 and 107 of the seat back $2_C$ to the closed position, the left seat $S_L$, the right seat $S_R$ and the central seat $S_C$ can be used as a bench seat for three adults. In addition, by lifting the front seat cushion 4 of the central seat $S_C$, as shown by a dashed line in FIG. 32, the central seat $S_C$ can be utilized as a child seat, or the front seat cushion 4 can be utilized as an arm rest for the right seat $S_R$ and the left seat $S_L$.

Additionally, if the front and rear seat backs 106 and 107 are swung to the forward-swung position and the first rearward-swung position respectively and fixed by the first fixing means 120, 120, the second fixing means 127, 127 and the third fixing means 135, 135, they can be used as the baby basket, as described above. At this time, the rear seat back 107 extends more rearwards of the vehicle body than the seat back frame 109 and hence, a sufficient distance between the front end of the front seat back and an instrument panel can be insured, and an operability of switches mounted on the instrument panel can be insured. Further, the baby lies face up with his face turned forwards of the vehicle body and hence, a baby's face can be confronted with adults seating on the left and right seats $S_L$ and $S_R$. Thus, it is possible for the adults not only to easily confirm the baby's state, but also to take with the baby.

Figure 31:
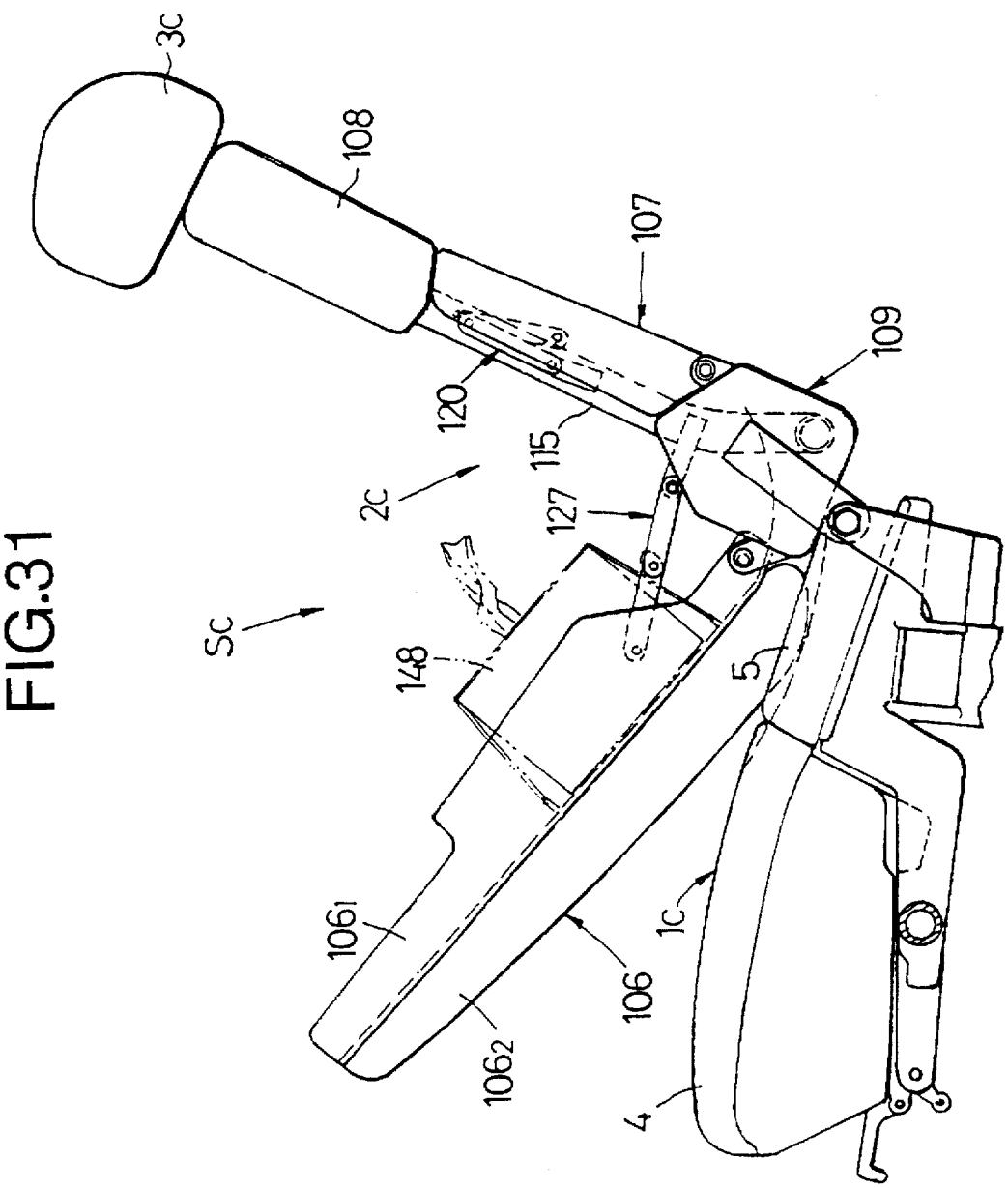
Figure 32:
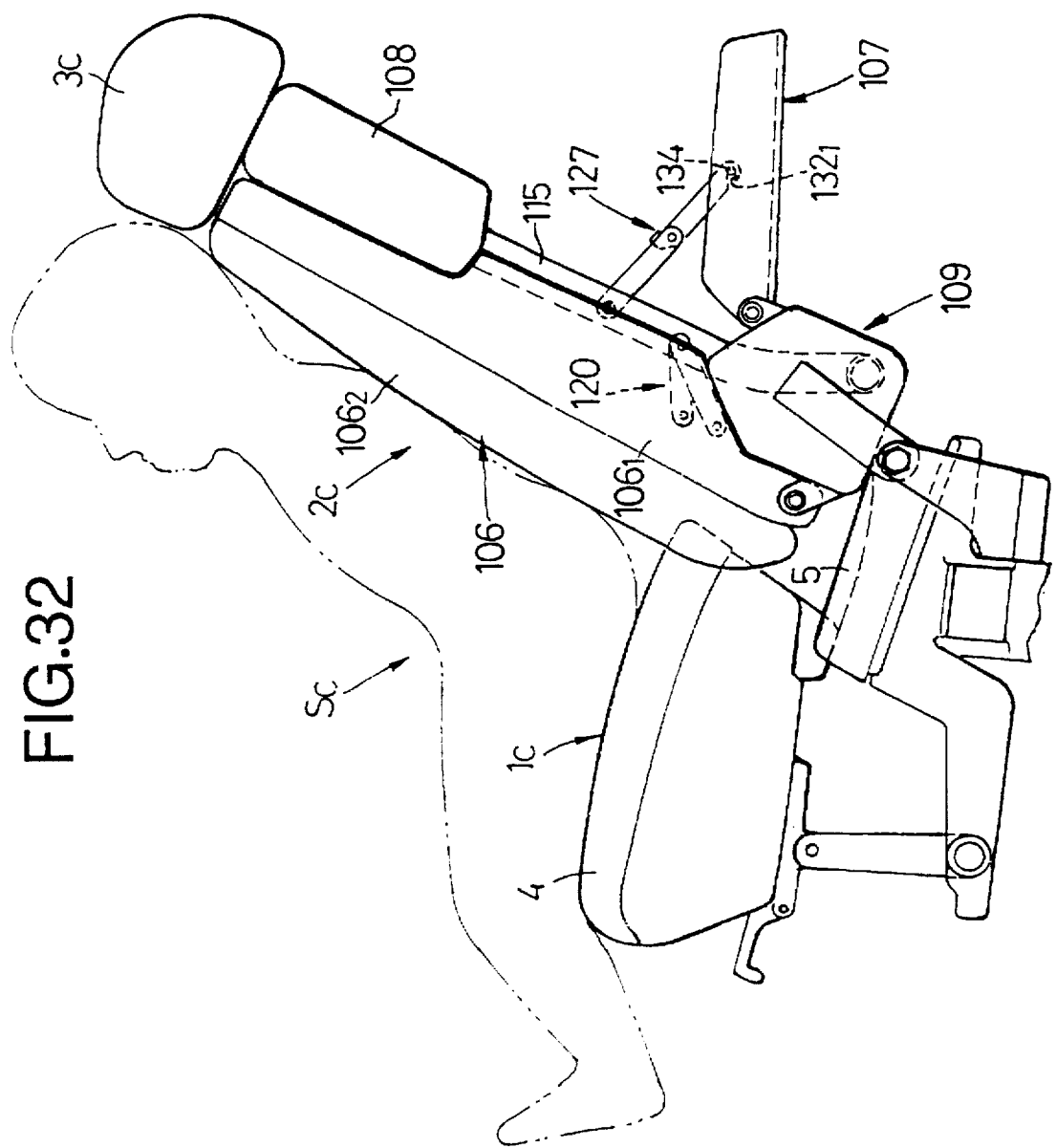
Figure 33A:
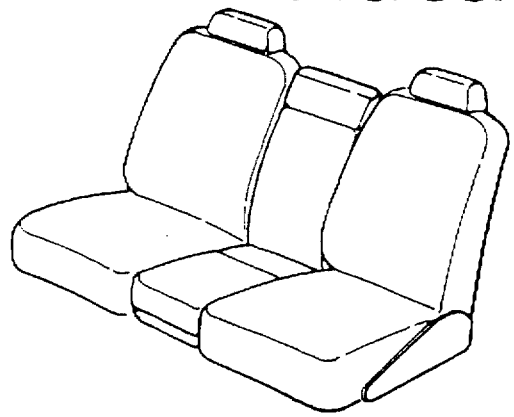
Figure 33C:
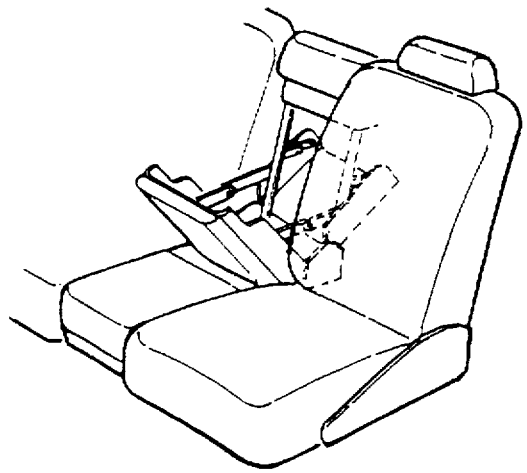
Figure 33B:
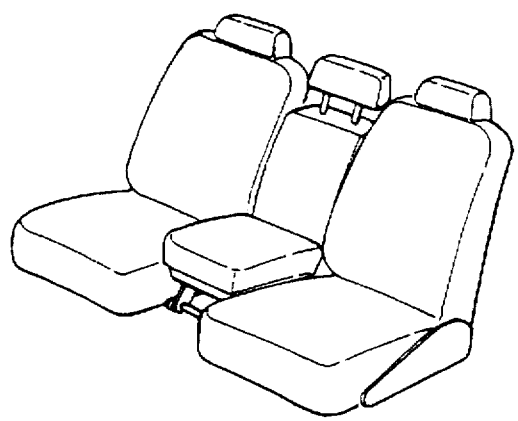
Figure 33D:
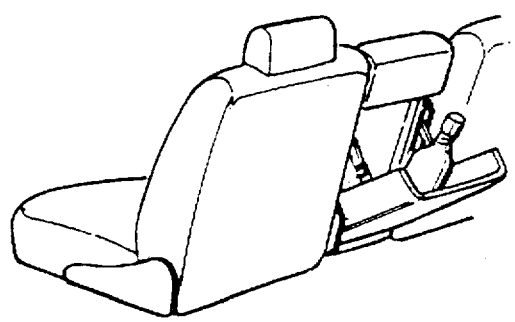

Further, if the front seat back 106 of the central seat $S_C$ is swung to the forward-swung position and fixed by the first fixing means, as shown in FIG. 31, the upper surface of the front seat back 106 can be used as a tray for placement of an article 148 such as a tissue paper and the like. If the rear seat back 107 of the central seat $S_C$ is swung to the second rearward-swung position and fixed by the second fixing means 127, 127, the upper surface of the rear seat back 107 can be used as a tray for placement of an article. Moreover, because both of the body portion $106_1$ of the front seat back 106 and the rear seat back 107 are formed into the J-shaped sectional shape, a box-like article compartment is defined between the front and rear seat backs 106 and 107 by bringing both of the front and rear seat backs 106 and 107 into the closed position.

As described above, the front and rear seat backs 106 and 107 are mounted in the seat back $2_C$ of the central seat $S_C$, and hence, even if they are swung back and forth, they cannot obstruct the occupants on the left and right front seat and the occupants on the left and right rear seat, and there is not a disadvantage that the resident property is injured. Moreover, it is possible for the baby lying centrally to impartially talk with the occupants lying on the left and the right of the baby, leading to an increased pleasure. Further, the central seat $S_C$ located substantially centrally is deformed and hence, for example, in a sedan-type four-seated vehicle, the getting of four persons on the vehicle can be insured without influencing the riding comfort and the resident property. Yet further, when the seat back $2_C$ of the front central seat $S_C$ is used as an article compartment or an article rest, four front and rear, left and right occupants can impartially use it. When the seat back $2_C$ of the rear central seat $S_C$ is used as an article compartment or an article rest, two rear left and right occupants can impartially use it.

A third embodiment of the present invention will now be described with reference to FIGS. 34 to 38.

The third embodiment has a feature in a seat back $2_C$ of a central seat $S_C$ capable of being utilized as a baby basket and an arm rest.

Figure 34:
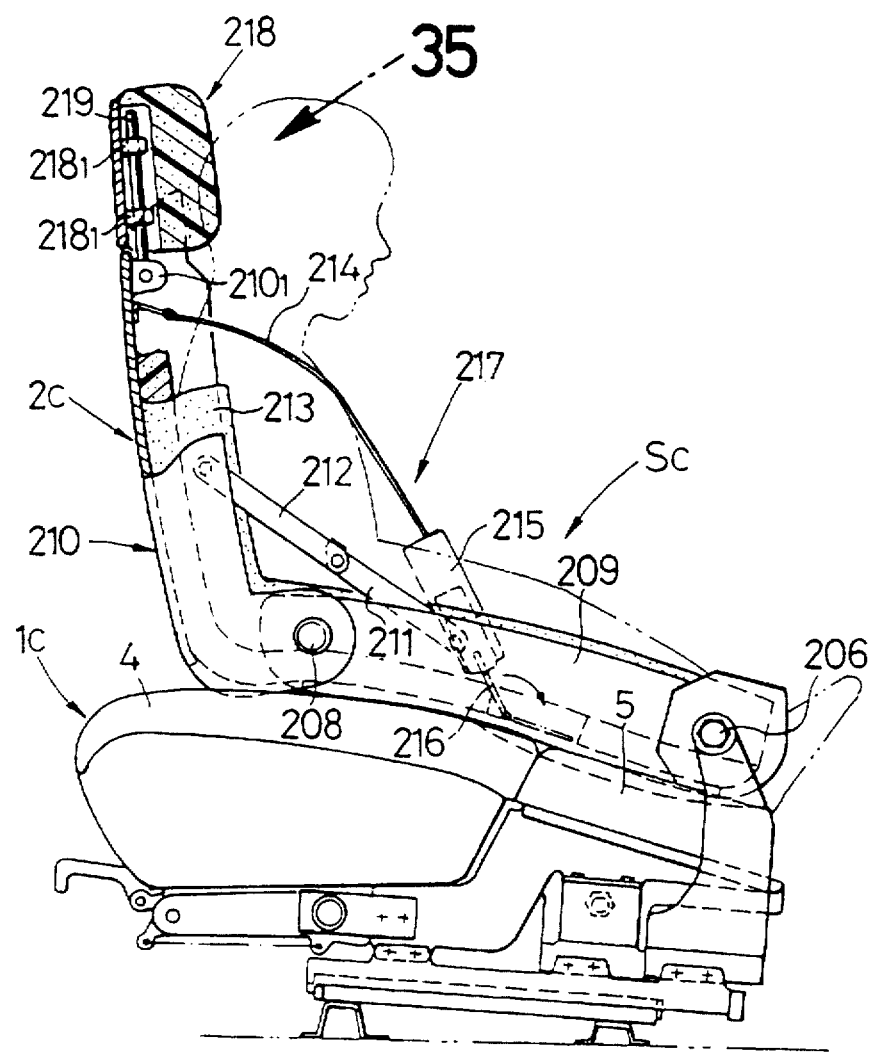
FIG. 34 is a view a multi-functional seat arrangement according to a third embodiment of the present invention with a seat back used as a baby basket.
Figure 35:
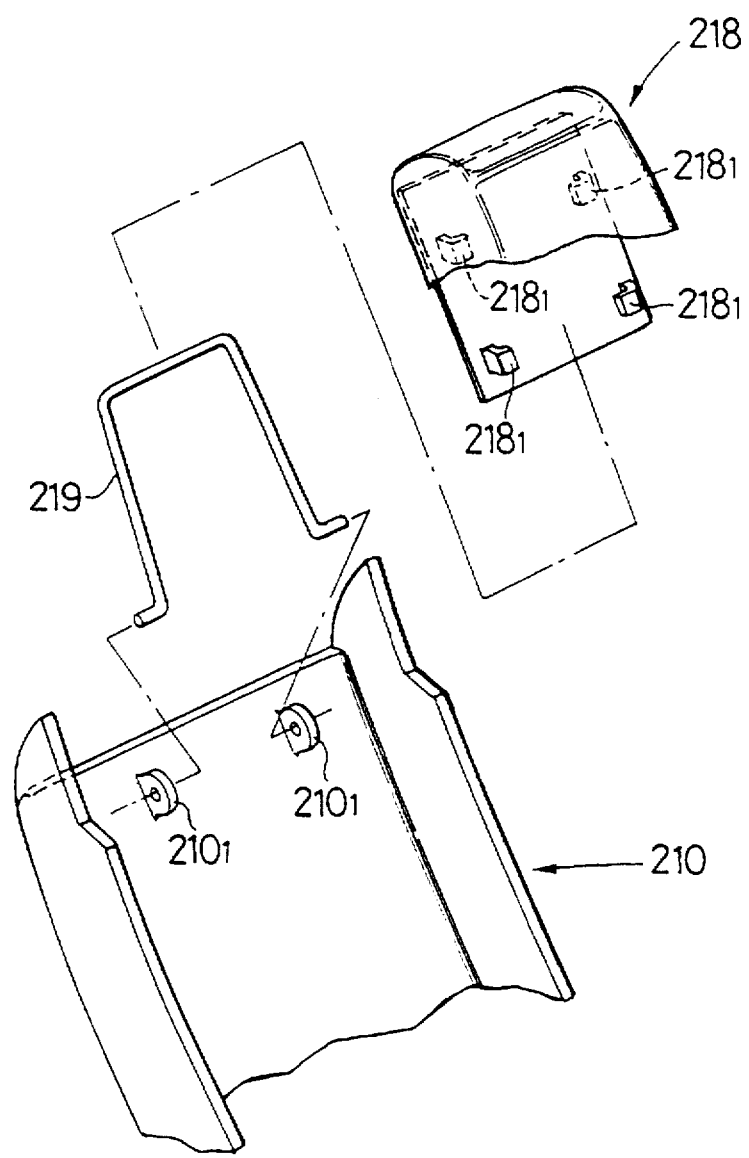
FIG. 35 is an exploded perspective view of a head rest.

As shown in FIG. 34, the seat back $2_C$ is comprised of a first half 209 and a second half 210 which are pivotally supported on each other by a pin 208. A baby basket can be constituted by turning the second half 210 forwards about the pin 208 and locking the turn angle of the second half 210 by links 211 and 212 which interconnect both the halves 209 and 210. Even if a baby's inertial force is applied forwards to the second half 210 during braking of the vehicle, the turn angle of the second half 210 is reliably locked by the links 211 and 212. A pad 213 for protecting a baby's body is provided on inner surface of the first half 209 and the second half 210. A seat belt device 217 is provided and comprised of a belt 214 supported at one end on the second half 210 to hold tank the baby's body, a buckle 215 secured to the other end of the belt 214, and a tongue 216 supported on the first half 209.

A detachable head rest 218 is mounted at an upper end of the righted second half 210. More specifically, as can be seen from FIG. 35 in combination with FIG. 35, a generally ⊐-shaped head rest supporting member 219 is turnably supported in the inner surface of the second half 210 through a pair of bosses $210_1$, $210_1$. The head rest 218 is mounted at the upper end of the second half 210 by turning the head rest supporting member 219 through approximately 180° from a housed position along the inner surface of the second half 210 and bringing four locking projections $218_1$ provided on an inner surface of the head rest 218 into engagement with the head rest supporting member 219.

Figure 38A:
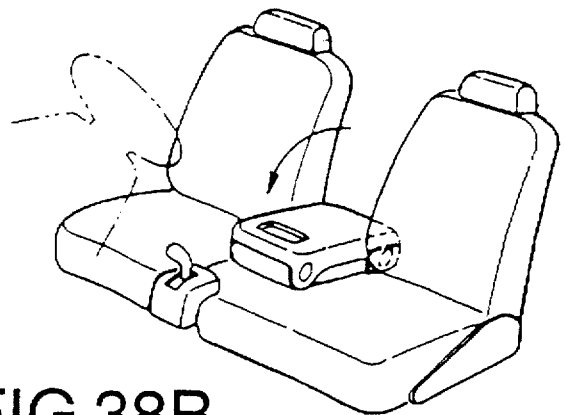
FIGS. 38A, 38B and 38C are views for explaining the operation.
Figure 38B:
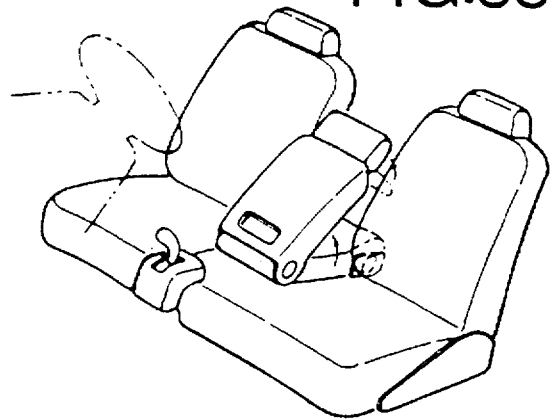
Figure 38C:
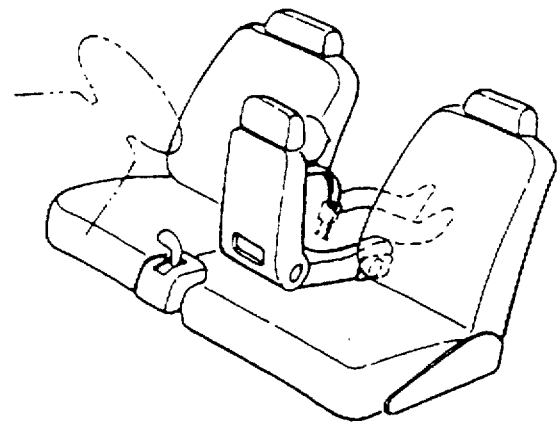

In the above manner, the seat back $2_C$ of the central seat $S_C$ usually used as an adult seat can be sued as an arm rest by tilting down the seat back $2_C$ forwards, and further, the second half 210 of the seat back $2_C$ can be sued as a baby basket by turning the second half 210 relative to the first half 209 (see FIG. 38). At this time, for example, in a sedan type automobile vehicle, the central seat $S_C$ located substantially centrally is deformed, and the right seat $S_R$ and the left seat $S_L$ are not deformed. Therefore, the comfortable riding of four persons in the vehicle can be insured without influencing the riding comfort and the resistant property of the front and rear, left and right persons. Yet further, when the seat back $2_C$ of the front central seat $S_C$ is used as an article rest or the like by tilting down the seat back $2_C$ of the central seat $S_C$, four front and rear, left and right occupants can impartially use it. When the seat back $2_C$ of the rear central seat $S_C$ is used as an article rest or the like by tilting down the seat back $2_C$ forwards, two rear left and right occupants can impartially use it. Further, the baby in the baby basket is turned backwards with respect to the vehicle body and hence, it is possible for the adult seating on the right seat $S_R$ or the left seat $S_L$ to talk with the baby and to easily confirm the baby's state.

Figure 36:
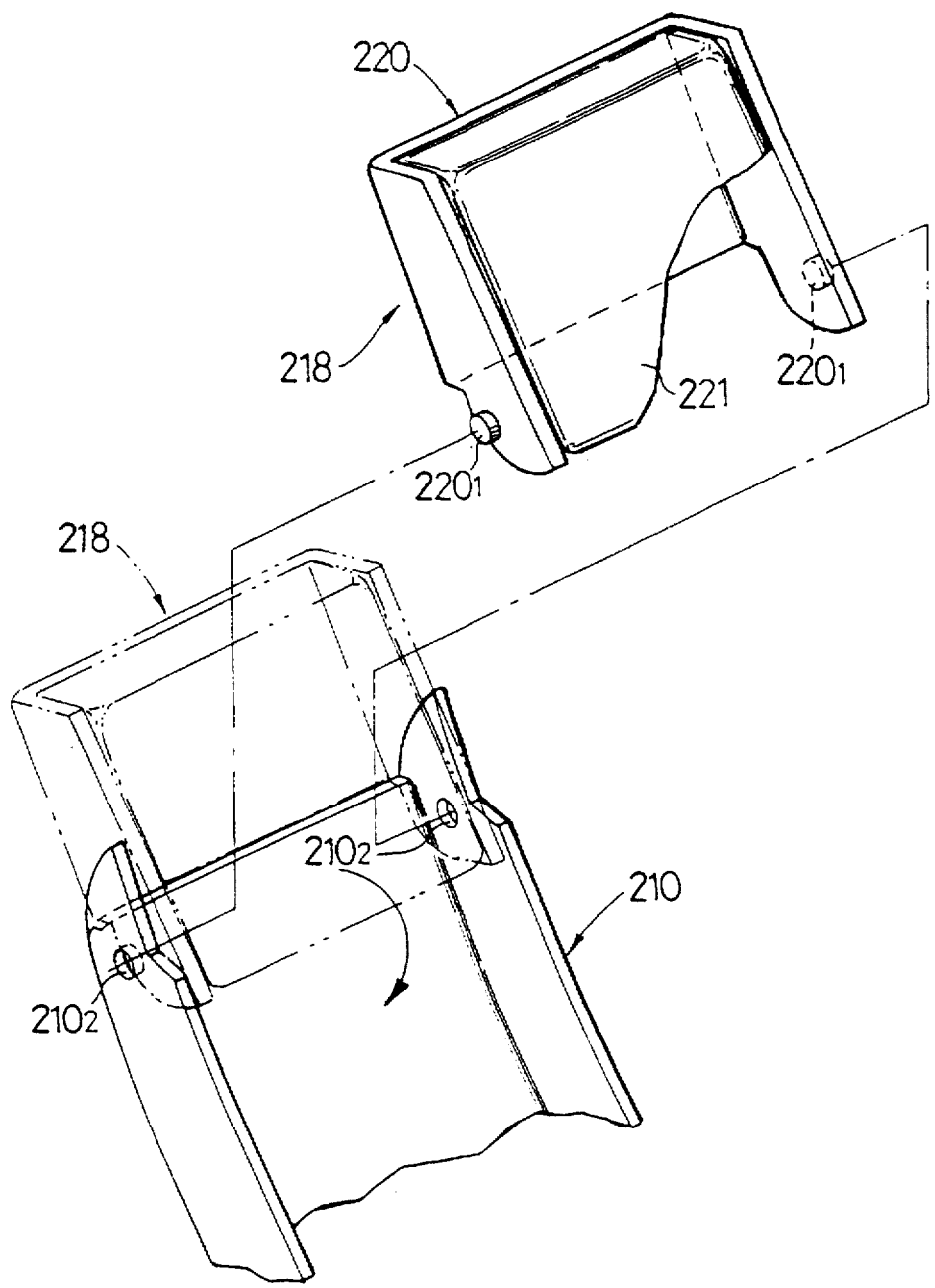
FIG. 36 is a view of a modification to the head rest.

FIG. 36 illustrates a modification to the head rest 218. The head rest 218 of this modification is comprised of a support frame 220 pivotally supported in a pair of left and right pin holes $210_2$, $210_2$ defined in an upper end of a second half 210 through pins $220_1$, $220_1$, and a pad 221 detachably mounted on the support frame 220. When the baby basket is not used, the support frame 220 can be turned in a direction of an arrow and housed within the second half 210 in a state in which the pad 221 has been removed.

Figure 37:
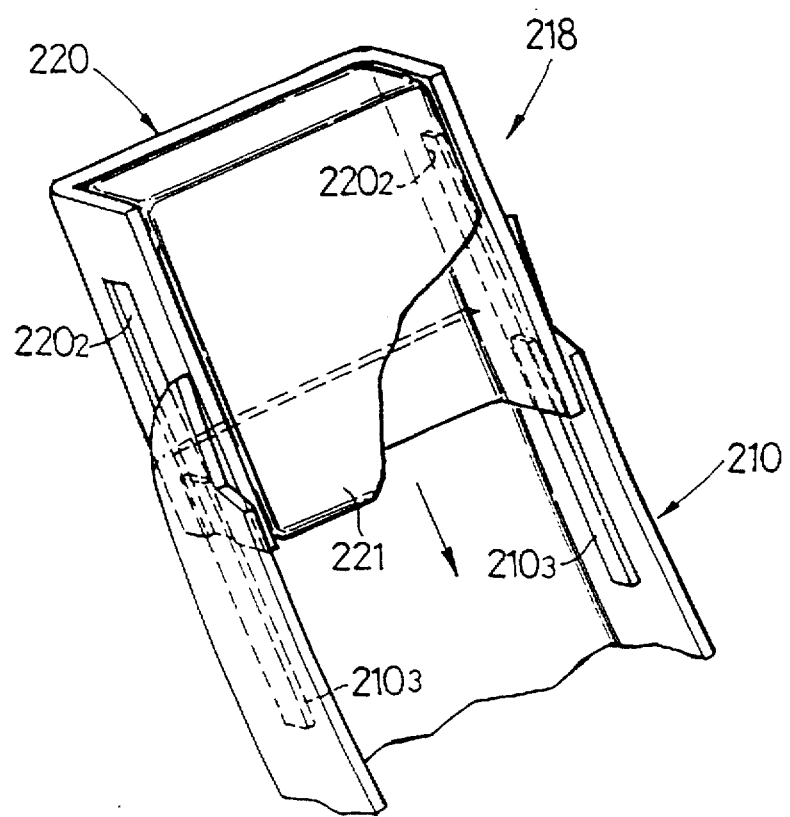
FIG. 37 is a view of another modification to the head rest.

FIG. 37 illustrates another modification to the head rest 218. The head rest 218 of this modification includes guide grooves $220_2$, $220_2$ defined in left and right opposite sides of a support frame 220 and slidably engaged with a pair of left and right guide rails $210_3$ and $210_3$ which are provided on an inner surface of a sidewall of a second half 210 to protrude therefrom. The support frame is slidable between a housed position in which it is superposed on the second half 210, and a service position in which it protrudes from the second half 210. When the baby basket is used, a detachable pad 221 is mounted on the support frame.

A fourth embodiment of the present invention will now be described with reference to FIGS. 39 and 40.

The fourth embodiment has a feature in the structure of a child seat belt device.

Figure 39:
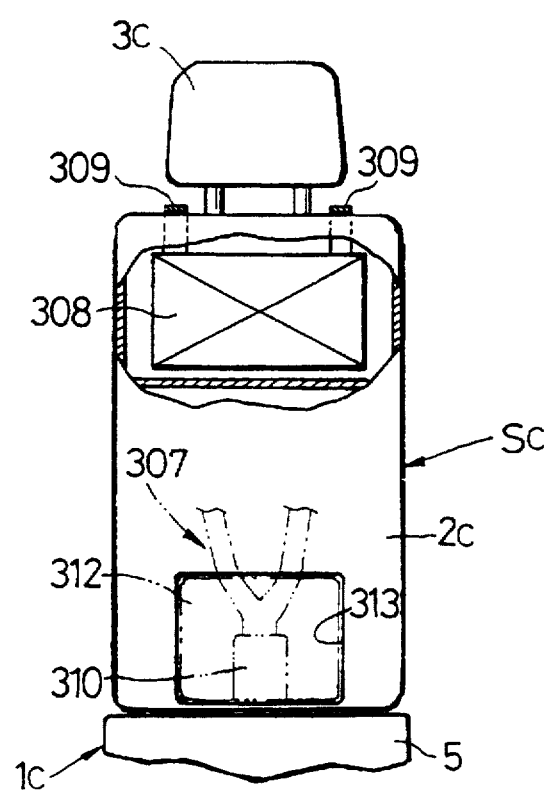
FIG. 39 is a front view of a seat back of a central seat in a multi-functional seat arrangement according to a fourth embodiment of the present invention.

As can be seen FIG. 39, a child seat belt device 307 mounted on the central seat $S_C$ includes a pair of left and right belts 309, 309 capable of being drawn out from a retractor 308 mounted in the seat back $2_C$ onto the upper surface of the seat back $2_C$, a buckle 310 connected to tip ends of the belts 309, 309, a tongue 311 which is rightably accommodated in a tongue accommodating recess $4_2$ defined in a central portion of the upper surface of the front seat cushion 4, and a protecting pad 312 made of a soft material and mounted to cover the vicinity of the tip ends of the pair of left and right belts 309, 309, i.e., an outer periphery of the buckle 310. A protecting-pad accommodating recess 313, into which the protecting pad 312 is capable of being fitted, is defined in a lower portion of the front surface of the seat back $2_C$.

To use the central seat $S_C$ as a child seat, the protecting pad 312 is taken out of the pad accommodating recess 313 in the seat back $2_C$ and then, the front seat cushion 4 of the seat cushion $1_C$ is locked at the lifted position shown in FIG. 40B. In this state, a child is allowed to seat on the front seat cushion 4; the two belts 309, 309 of the child seat belt device 307 are drawn along both the shoulders and the chest of the child, and the tongue 311 is coupled to the buckle 310. At this time, the protecting pad 312 prevents the buckle 310 from being brought into direct contact with the child's belly. When the central seat $S_C$ is used as the child seat, the intrinsic front seat cushion 4 and seat back $S_C$ are used as they are and hence, a seating comfort is insured which is equivalent to that provided when the central seat $S_C$ is used as the adult seat.

When the child seat belt device 337 is not used, the accommodating of the protecting pad 312 in the pad accommodating recess 313 in the seat back $2_C$ eliminates disadvantages that the protecting pad 312 is a hindrance and that the seat back $2_C$ is thickened. Moreover, the protecting pad 312 fitted into the pad accommodating recess 313 constitutes a portion of the seat back $2_C$ and hence, when an adult seats on the protecting pad 312, the pad accommodating recess 313 cannot injure the seating comfort. Additionally, when the front seat cushion 4 is lifted, the pad accommodating recess 313 in the seat back $2_C$ is covered with the front seat cushion 4 and hence, the back of the child seating on the front seat cushion 4 cannot touch the pad accommodating recess 313 to injure the seating comfort.

Figure 41:
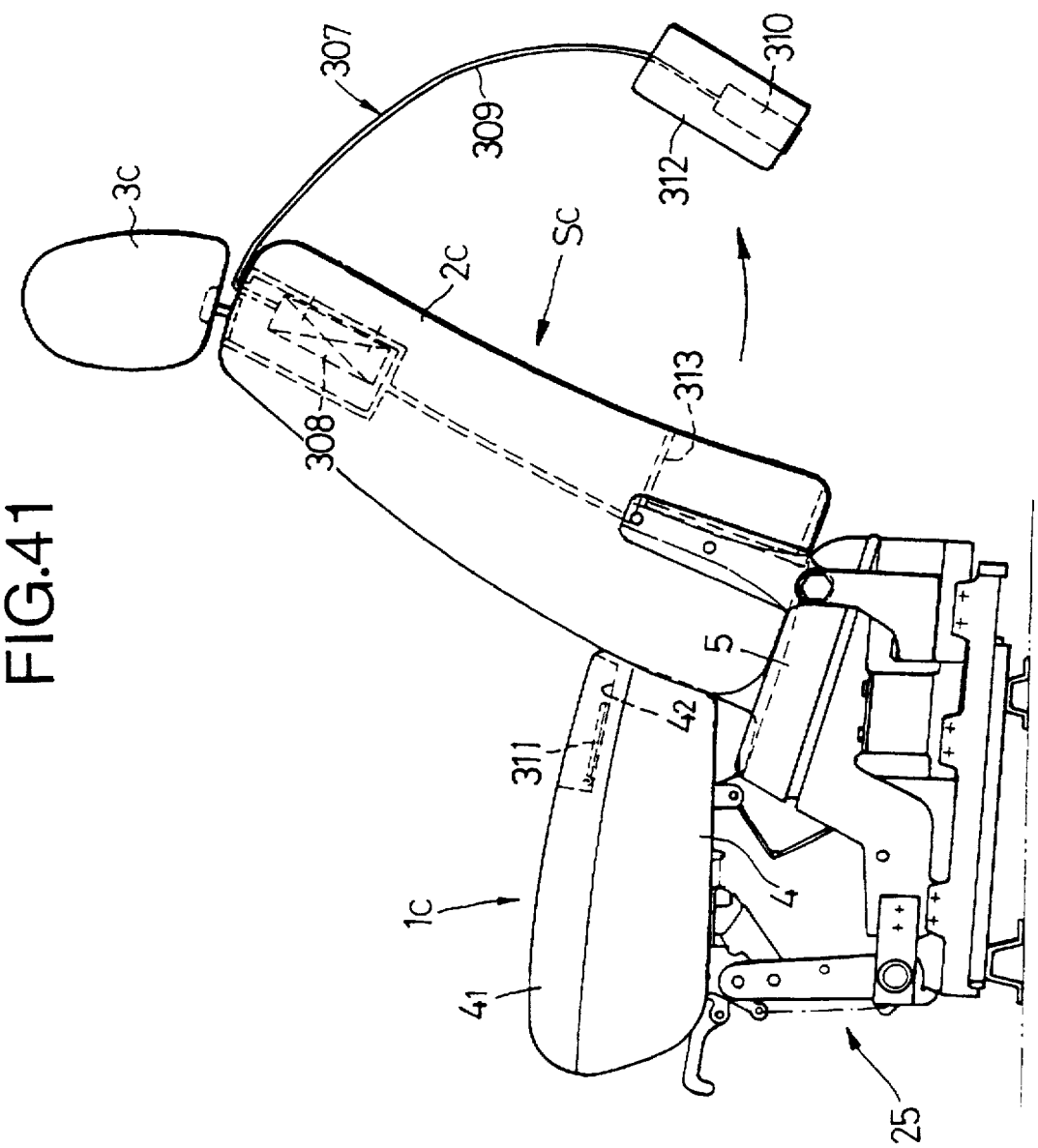
FIG. 41 is a side view of a central seat in a multi-functional seat arrangement according to a fifth embodiment of the present invention.

FIG. 41 illustrates a fifth embodiment of the present invention.

To the fifth embodiment, a protecting-pad accommodating recess 313 for accommodating a protecting pad 312 of a child seat belt device 307 is defined in a lower portion of the rear surface of the seat back $2_C$ of the central seat $S_C$. With such construction, it is unnecessary to define a protecting-pad accommodating recess 313 in the front surface of the seat back $2_C$ with which the back of an occupant contacts. Thus, it is possible to further enhance the seating comfort.

Figure 42:
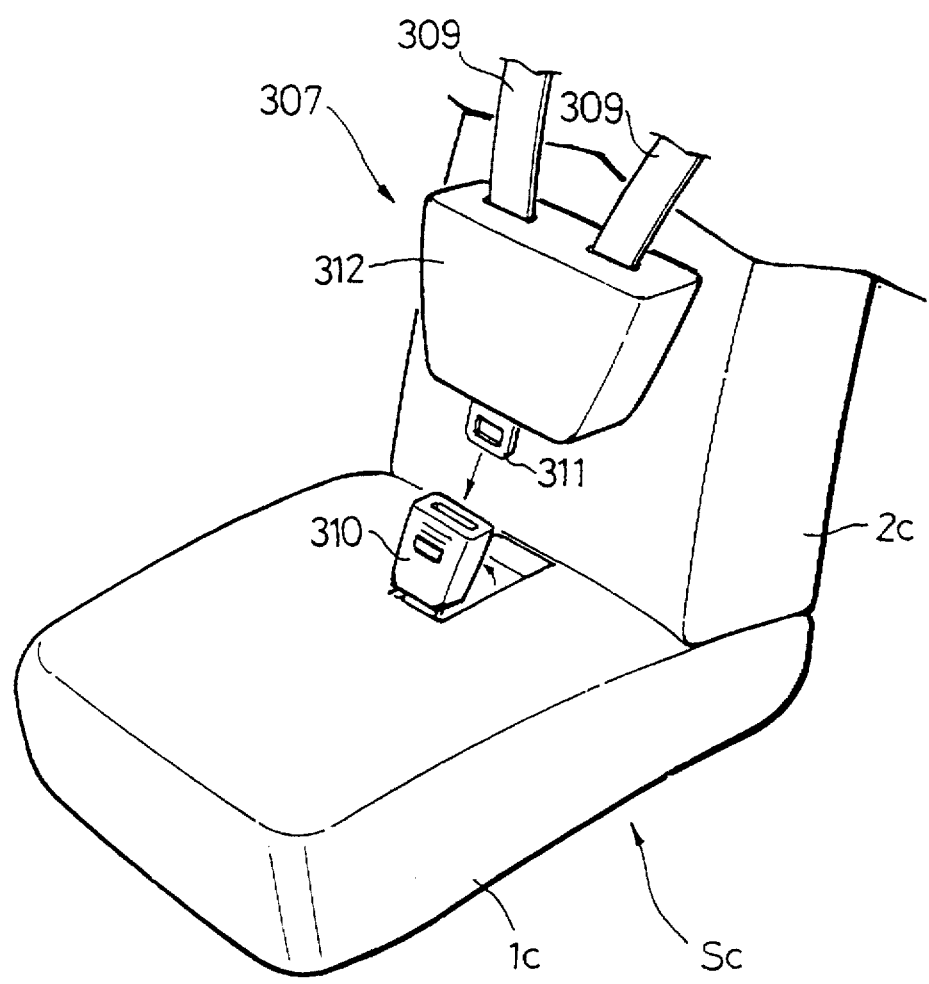
FIG. 42 is a view of a modification of a coupling means.

In each of the fourth and fifth embodiments, the tongue 311 may be provided on the protecting pad 347, and the buckle 310 may be provided on the seat cushion 310. In this case, the buckle 310 may be accommodated in a recess provided in the seat cushion $1_C$, as shown in FIG. 42, and when the buckle 310 is to be used, it may be righted. A thin pad may be affixed to the surface of the buckle 310, so that the buckle 310 accommodated in the recess is not an hindrance when an adult seats on the central seat $S_C$.

Figure 43:
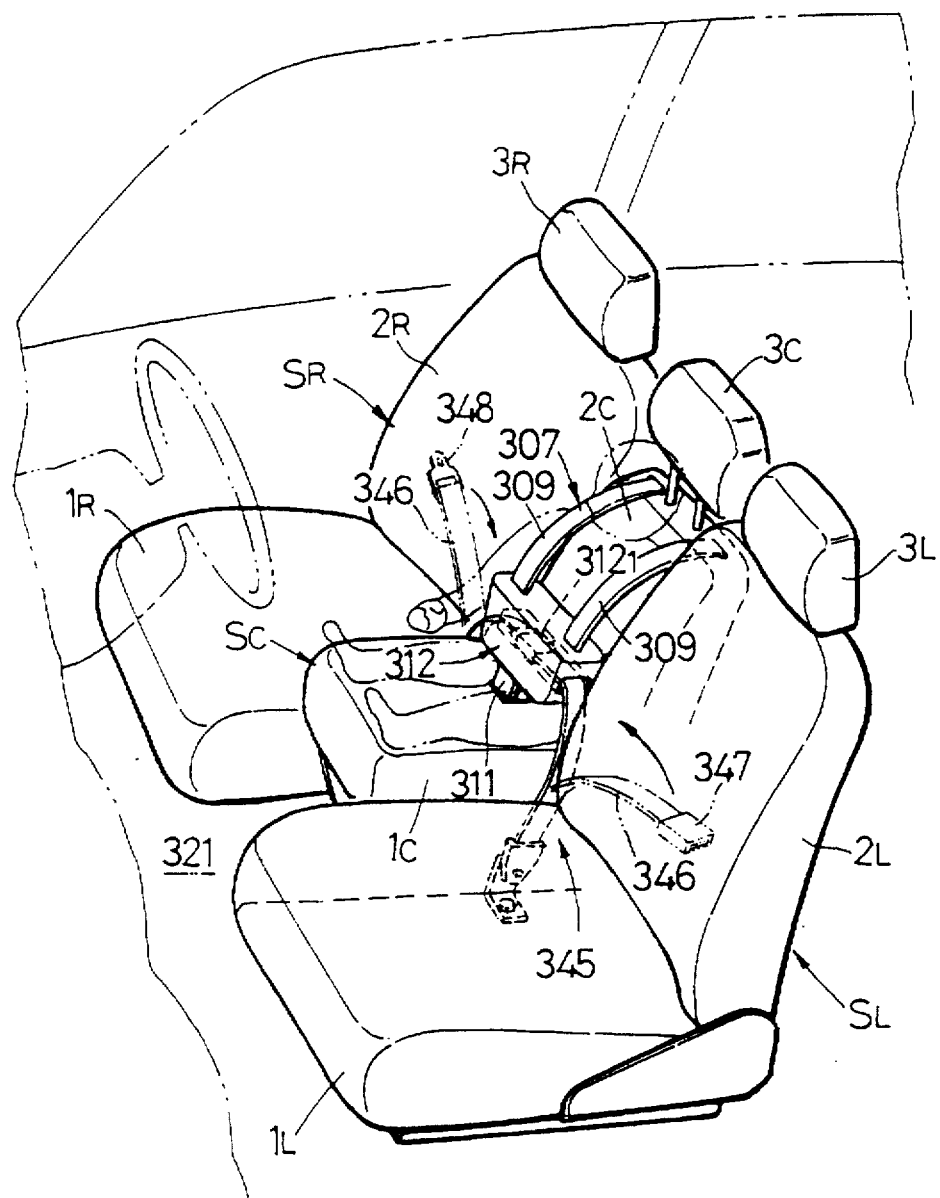
FIG. 43 is a perspective view of a front seat according to a sixth embodiment of the present invention.

FIG. 43 illustrates a sixth embodiment of the present invention.

The sixth embodiment is designed so that an adult seat belt device 345 mounted intrinsically for an adult on the central seat $S_C$ can be also utilized for a child. A buckle 347 and a tongue 348 are mounted respectively at tip ends of left and right belts 346, 346 fixed at one ends to a floor panel and coupled to each other in a through-hole $312_1$ laterally passed through the protecting pad 312.

Thus, a child seating on the central seat $S_C$ can be further reliably held back by both of the child seat belt device 307 and the adult seat belt device 345. In this case, the buckle 347 and the tongue 348 of the adult seat belt device 345 is covered with the protecting pad 312 and cannot be brought into direct contact with the child's belly.

Figure 44:
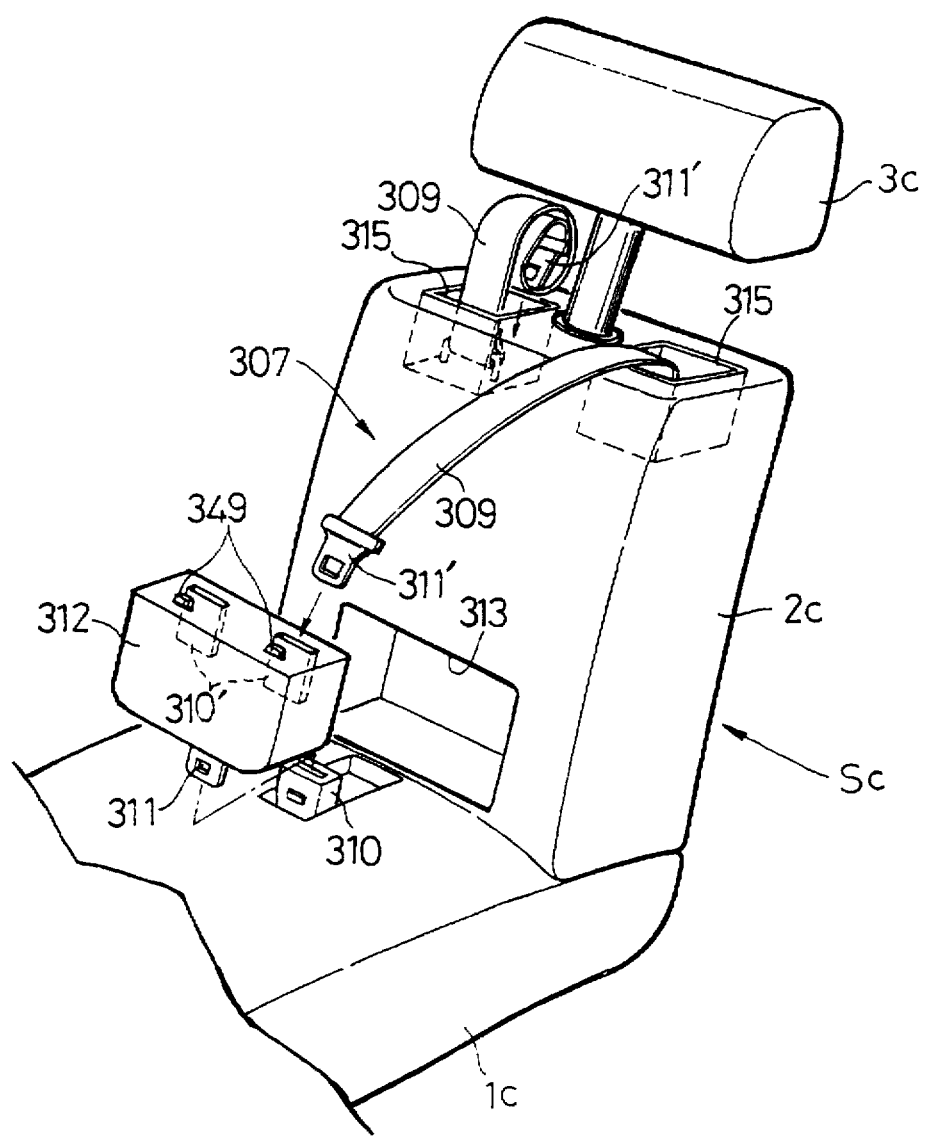
FIG. 44 is a perspective view of a central seat according to a seventh embodiment of the present invention.

FIG. 44 illustrates a seventh embodiment of the present invention.

In the seventh embodiment, a foldable tongue 311 provided on a lower surface of a protecting pad 312 is attachable and detachable to and from a buckle 310 mounted on the seat cushion $1_C$, and tongues 311', 311' provided on belts 309, 309 are attachable and detachable to and from buckles 310', 310' mounted on an upper surface of a protecting pad 312. The releasing of the coupling of the tongues 311', 311' to the buckles 310', 310' is performed by pushing coupling-releasing buttons 349, 349 mounted on the upper surface of the protecting pad 312. Thus, when the child seat belt device 307 is not used, the protecting pad 312 is removed from the seat cushion $1_C$, and the belts 309, 309 are removed from the protecting pad 312. In this state, the protecting pad 312 can be accommodated into the protecting-pad accommodating recess 313 provided in the seat back $2_C$, and the rolled belts 309, 309 and the tongues 311', 311' can be accommodated into a pair of left and right belt accommodating recesses 315, 315 provided in a top surface of the seat back $2_C$. The belt accommodating recesses 315, 315 are covered with the lower surface of the head rest $3_C$ and hence, the belts 309, 309 and the tongues 311', 311' are incapable of being viewed when they are not used, leading to a further enhanced outer appearance. The belt accommodating recesses 315, 315 mounted to the frame of the seat back $2_C$ and hence, the load applied to the belts 309, 309 can be firmly supported by the frame.

Figure 45:
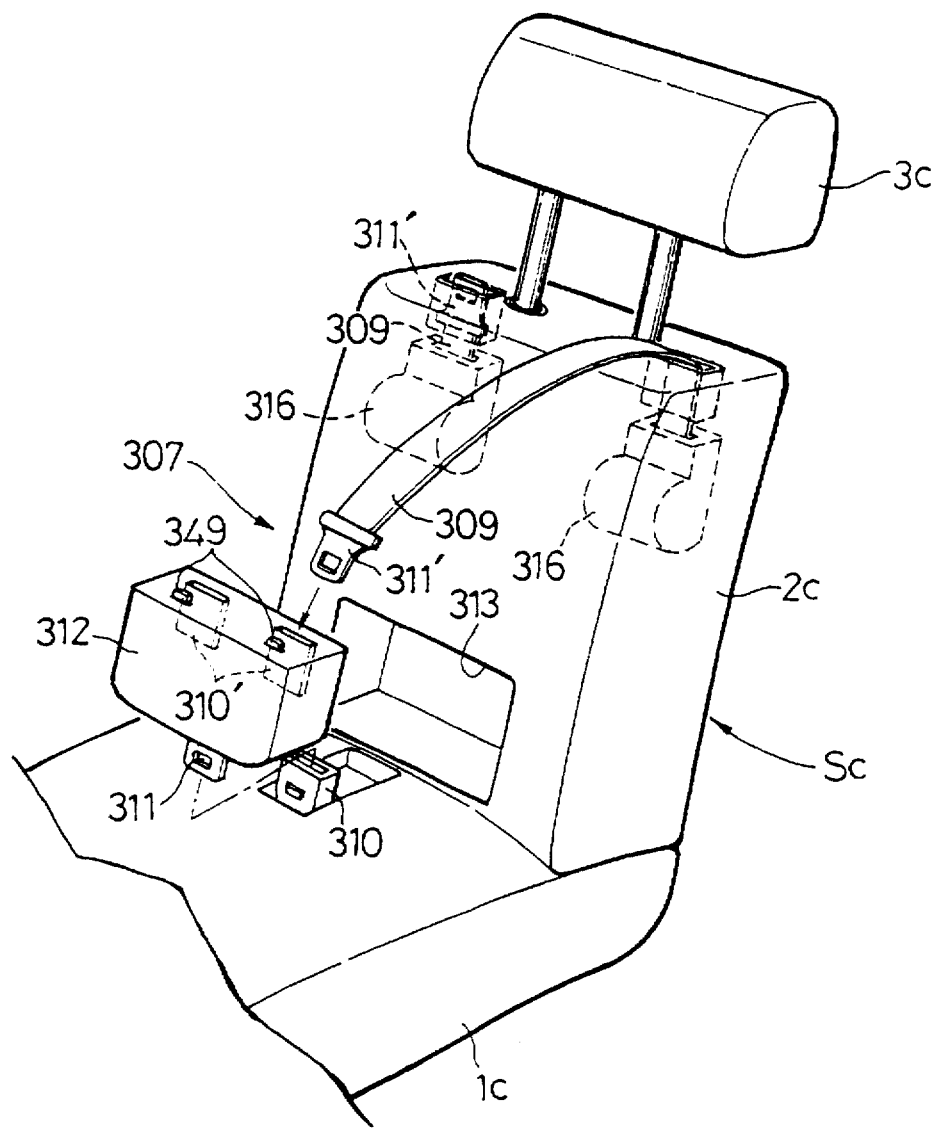
FIG. 45 is a perspective view of a central seat according to an eighth embodiment of the present invention.

FIG. 45 illustrates an eighth embodiment of the present invention.

In the eighth embodiment, retractors 316, 316 are mounted to the frame of the seat back $2_C$ in place on the belt accommodating recesses 315, 315 provided in the seventh embodiment, and the belts 309, 309 are automatically rolled onto the retractors 316, 316, respectively. Thus, the eighth embodiment exhibits a further enhanced convenience more than that in the seventh embodiment.

Figure 46:
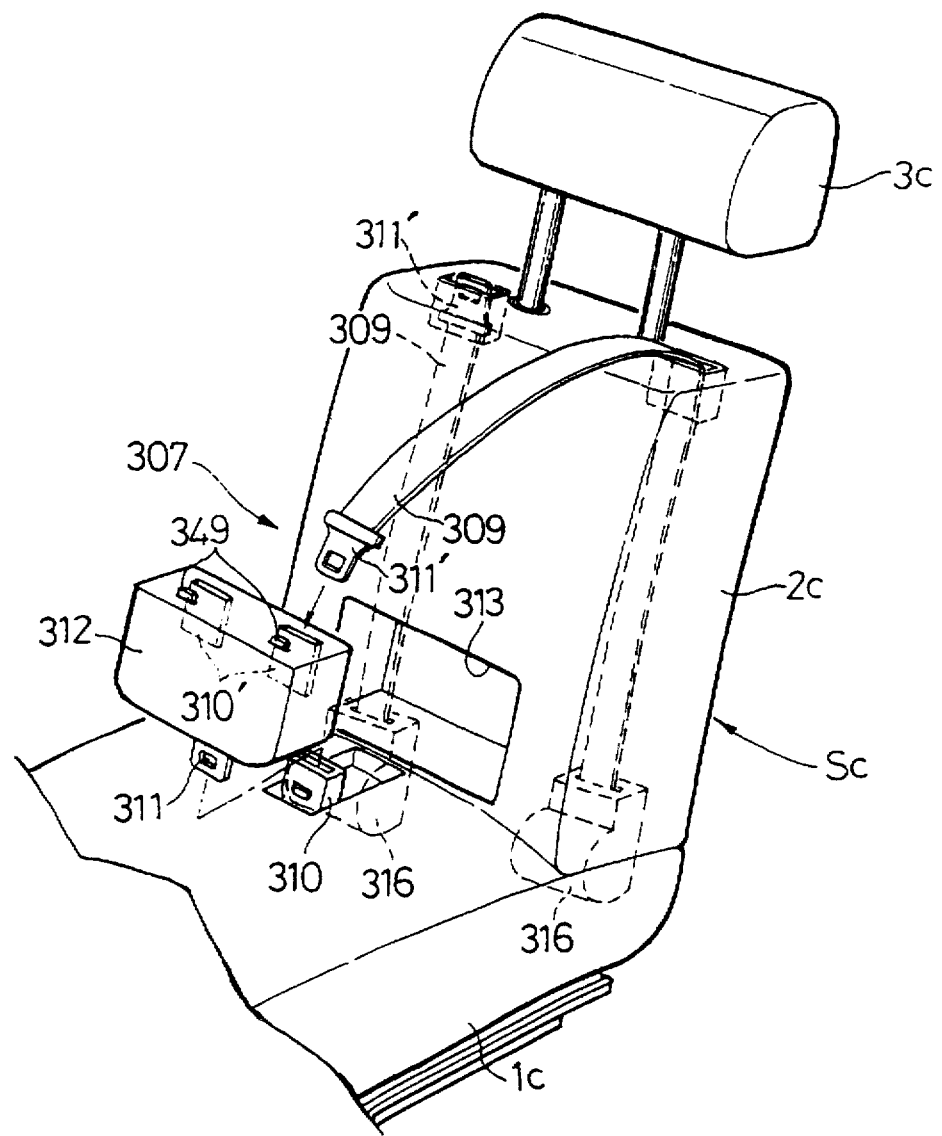
FIG. 46 is a perspective view of a central seat according to a ninth embodiment of the present invention.

FIG. 46 illustrates a ninth embodiment of the present invention.

In the ninth embodiment, the retractors 316, 316 used in the eighth embodiment are mounted to the frame of the seat cushion $1_C$, in place of being mounted to the frame of the seat back $2_C$.

When a child seat belt device 307 is mounted to a longitudinally slidable front seat, it is necessary to mount the belts 309, 309 to the frame of the seat back $2_C$ or to the frame of the seat cushion $1_C$.

Figure 47:
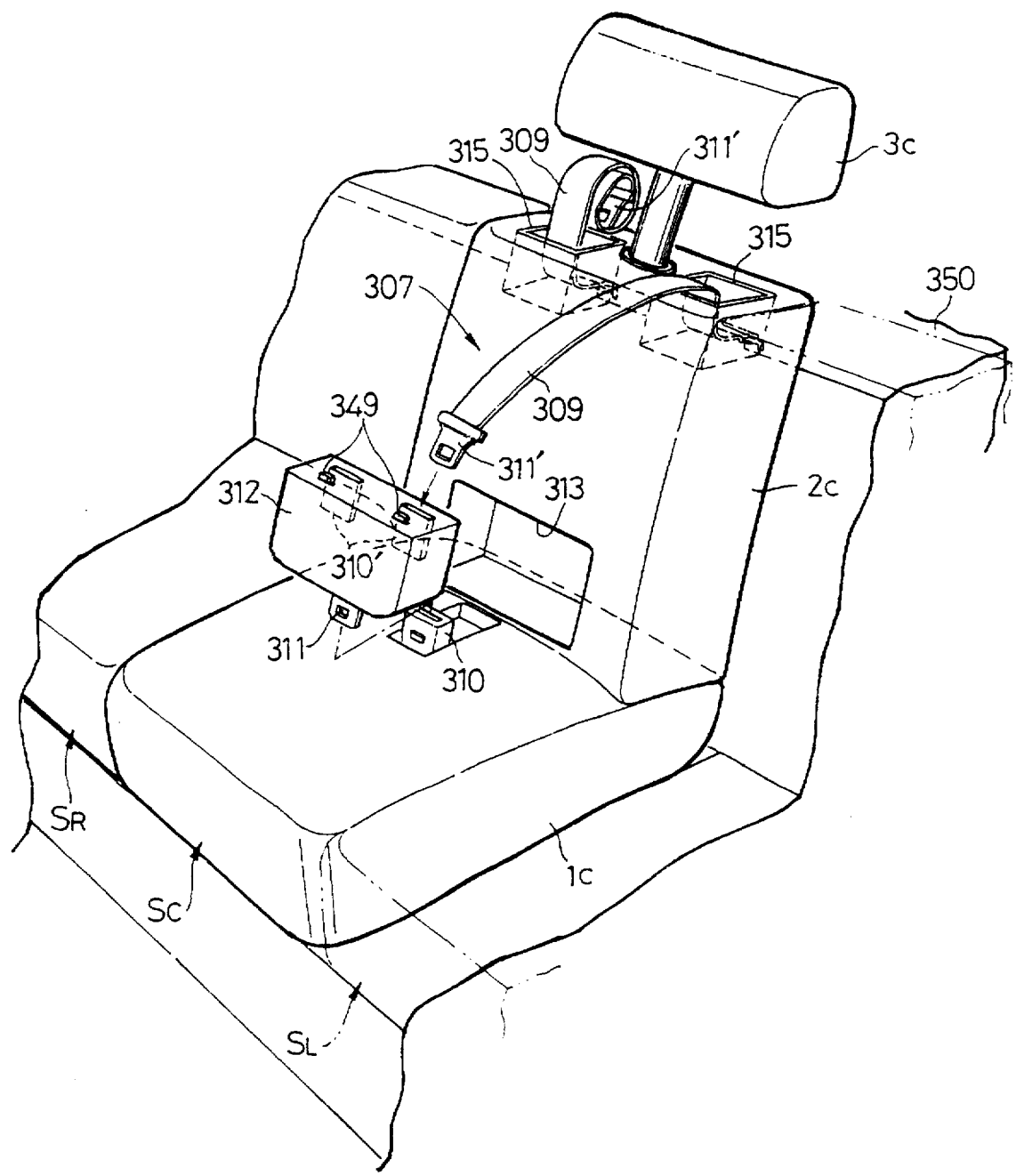
FIG. 47 is a perspective view of a central seat according to a tenth embodiment of the present invention.

FIG. 47 illustrates a tenth embodiment of the present invention.

In the tenth embodiment, a child seat belt device 307 is mounted to a rear seat which is not slidable back and forth.

In this case, belt accommodating recesses 315, 315 (or retractors 316, 316) are provided in a vehicle body panel 350 mounted in rear of the rear seat. Thus, a load applied to the belts 309, 309 can be received by the vehicle body panel 350.

Figure 48:
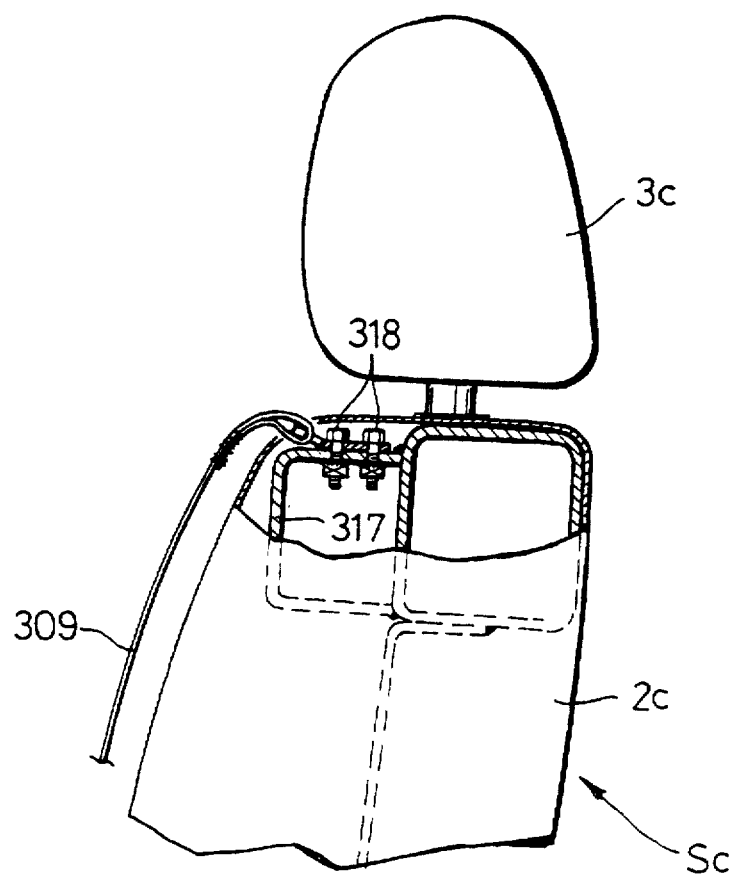
FIG. 48 is a view of a modification of a belt.

In place of the retractors 316, 316 for rolling the belts 309, 309 therearound are mounted on the top of the seat back $2_C$, the belts 309, 309 may be bolted to the seat frame 307, as shown in FIG. 48.

An eleventh embodiment of the present invention will now be described with reference to FIGS. 49 to 50. The eleventh embodiment corresponds to an embodiment in which the lifting mechanism 25 in the previously described first embodiment is replaced by another structure.

Figure 49:
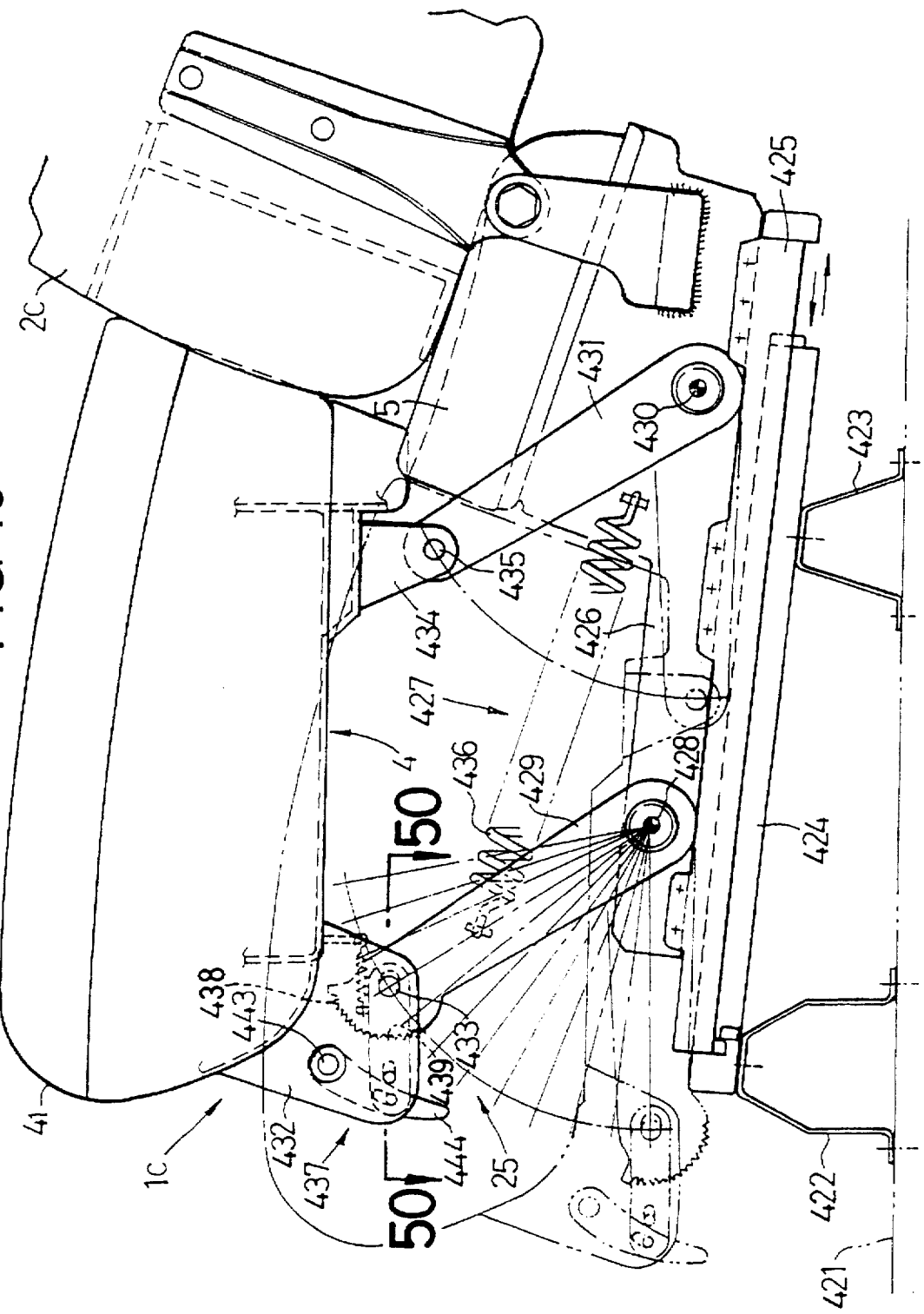
FIG. 49 is a side view of a lifting mechanism in a multi-functional seat arrangement according to an eleventh embodiment of the present invention.

As can be seen from FIG. 49, a pair of left and right movable rails 425, 425 are longitudinally slidably supported on a pair of left and right stationary rails 424, 424 which are fixed to a floor panel 421 of a vehicle through front and rear brackets 422, 422. A base frame 426 of a central seat $S_C$ is fixed on upper surfaces of the movable rails 425, 425. A front seat cushion 4 is liftably and lowerably supported at a front portion of the base frame 426 through a lifting mechanism 25, and a rear seat cushion 5 is fixed to a rear portion of the base frame 426.

A quadric link mechanism 427 connecting the front seat cushion 4 to the base frame 426 includes a pair of left and right front link arms 429, 429 pivotally supported at their lower ends on the base frame by pins 428, 428, and a pair of left and right rear link arms 431, 431 pivotally supported at their lower ends on the base frame 426 by pins 430, 430. The front link arms 429, 429 are pivotally supported at their upper ends by pins 433, 433 on brackets 432, 432 mounted on a lower surface of the front seat cushion 4, and the rear link arms 431, 431 are 427 is biased in a righting direction, i.e., the front seat cushion 4 is biased in a lifting direction by a resilient force of the coil spring as being contracted.

The lifted position of the front seat cushion 4 is adjustable at multiple stages by a locking mechanism 437.

Figure 50:
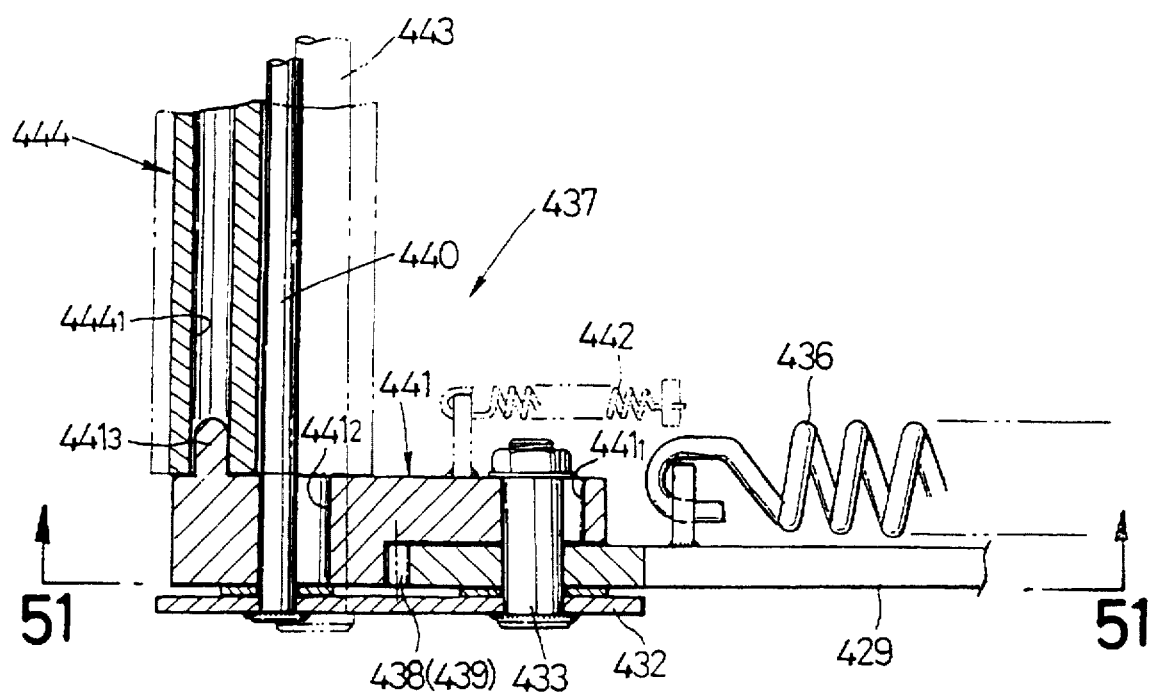
FIG. 50 is an enlarged sectional view taken along a line 50—50 in FIG. 49.
Figure 51:
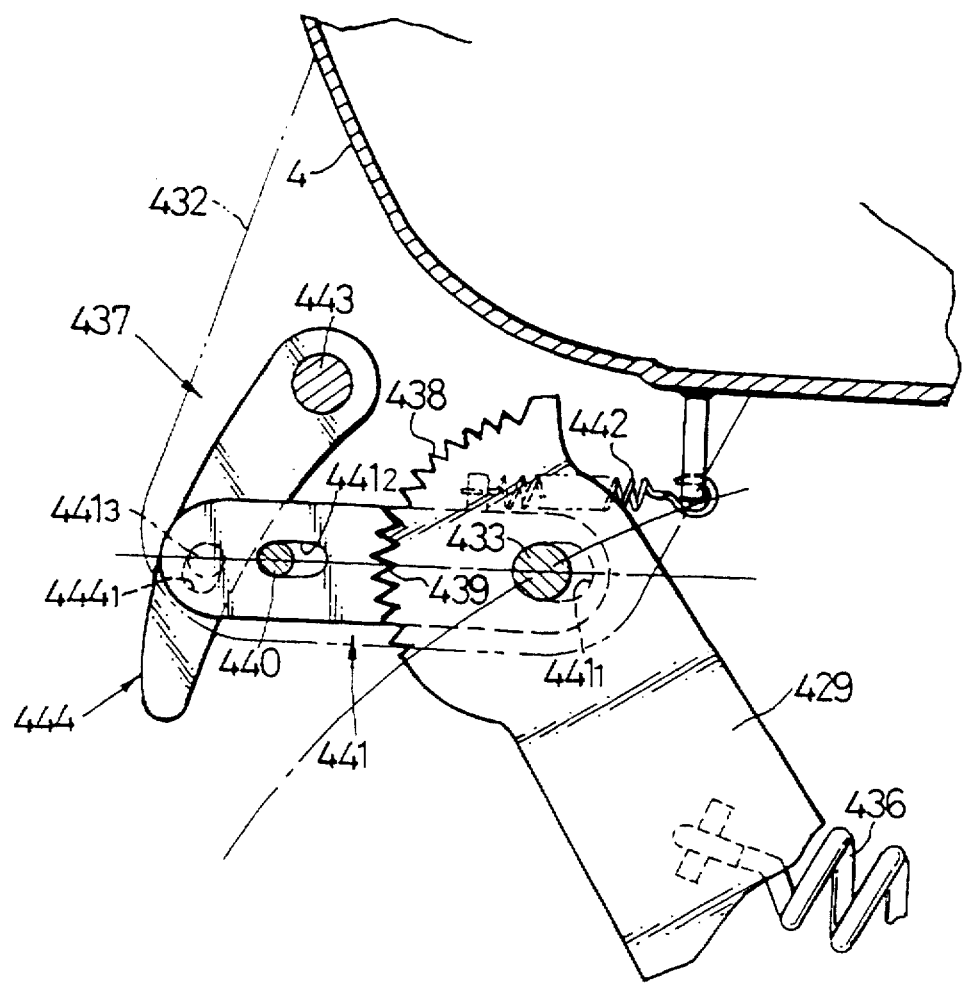
FIG. 51 is a view taken along a line 51—51 in FIG. 50.
Figure 52:
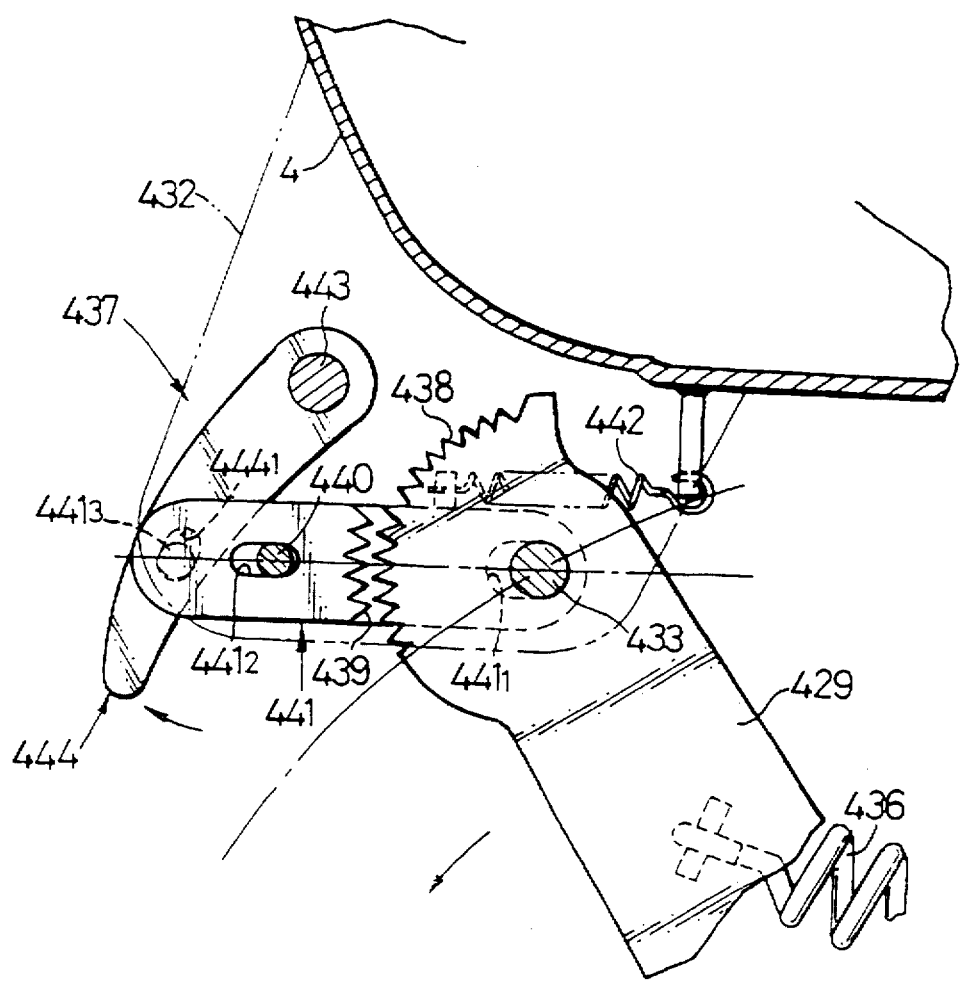
FIG. 52 is a view for explaining the operation of a locking mechanism.

As can be seen from FIGS. 50 and 51, the locking mechanism 437 includes a locked gear 438 comprising a sector gear formed on the upper end of the one front link arm 429 about the pin 435; a locking piece 441 which is longitudinally slidably supported on the pin 433 and a pin 440 supported on the brackets 432, 432 through elongated bores $441_1$ and $441_2$, and which has a locking gear 439 capable of being meshed with the locked gear 438; a coil spring 442 for biasing the locking piece 441 in a direction to permit the locking gear 439 to be meshed with the locked gear 438; and a lever 444 which is pivotally supported for longitudinal swinging movement on the brackets 432, 432 through a pin 443 and which has an elongated bore $444_1$ in which a pin $441_3$ projectingly provided at a front end of the locking piece 441 is engaged.

If a finger is applied on a lower end of the lever 444 to pull the lever 444 forwards, the locking piece 441 with the pin $441_3$ engaged in the elongated bore $444_1$ being pulled is slid forwards in a range of the elongated bores $441_1$ and $441_2$, thereby releasing the meshing of the locking gear 439 with the locked gear 438. If the finger is released from the lever 444, the locking piece 441 is slid rearwards by the resilient force of the coil spring 442, thereby causing the locking gear 439 to be meshed with the locked gear 438.

The operation of the embodiments of the present invention having the above-mentioned constructions will be described below.

When the front seat is used for a seating for four adults, the front seat cushion 4 of the seat cushion $1_C$ of the central seat $S_C$ is locked at the lowered position. This causes the seat cushion $1_L$ of the left seat $S_L$, the seat cushion $1_R$ of the right seat $S_R$ and the seat cushion $1_C$ of the central seat $S_C$ to be brought into the same level, so that the three adults can seat side by side.

When the central seat $S_C$ is used as the child seat, the front seat cushion 4 of the seat cushion $1_C$ is locked at the lifted position. In this state, a child is allowed to seat on the front seat cushion 4. In this way, the front seat cushion 4 is utilized intact as the child seat and hence, it is possible not only to insure a seating comfort equivalent to that when the central seat $S_C$ is used as the adult seat, but also to put the child's eyes at a raised level to provide a widen field of view.

Further, if the front seat cushion 4 of the seat cushion $1_C$ is locked at the lifted position, it can be used as the arm rest for the occupant seating on the left seat $S_L$ or the right seat $S_R$.

When the front seat cushion 4 is in the locked state, the locking gear 439 of the locking piece 441 is in a meshed relation to the locked gear 438 of the front link arm 429, thereby limiting the turning of the front link arm 429 to fix the front seat cushion 4 so that the latter cannot be lifted and lowered. When the lever 44 is operated to release the meshing of the locking gear 439 with the locked gear 438, the front link arm 429 is freely turnable and hence, the seat cushion 4 can be automatically lifted by the resilient force of the coil spring 436, or the front seat cushion 4 can be pushed down against the resilient force of the coil spring 436.

As described above, the locking mechanism 437 locks the front seat cushion 4 by the meshing of the locking gear 439 with the locked gear 438 and therefore, the multi-stage locking depending upon the number of teeth of the gears 438 and 439 can be achieved, and the level of the front seat cushion 4 can be finely regulated by the simple operation and the simple structure.

The front seat cushion 4 supported by the quadric link mechanism 427 is moved substantially vertically in the vicinity of its lowered position, but is moved mainly longitudinally in the vicinity of the lifted position in which the front link arms 429, 429 and the rear link arms 431, 431 are righted. Therefore, when the reclining angle of the seat back $2_C$ is regulated, if the longitudinal position of the front seat cushion 4 is regulated in accordance with the longitudinal movement of the seat back $2_C$, the seat back $2_C$ can be reclined to any position without interfering with the front seat cushion 4.

In the eleventh embodiment, the locked gear 438 is integrally formed on the front link 429, but the locked gear 438 and the front link arm 429 may be formed from different members and integrally coupled to each other.

A twelfth embodiment of the present invention will now be described with reference to FIGS. 53 and 54. The twelfth embodiment is different from the eleventh embodiment in respect of the structure of the lifting mechanism.

Figure 53:
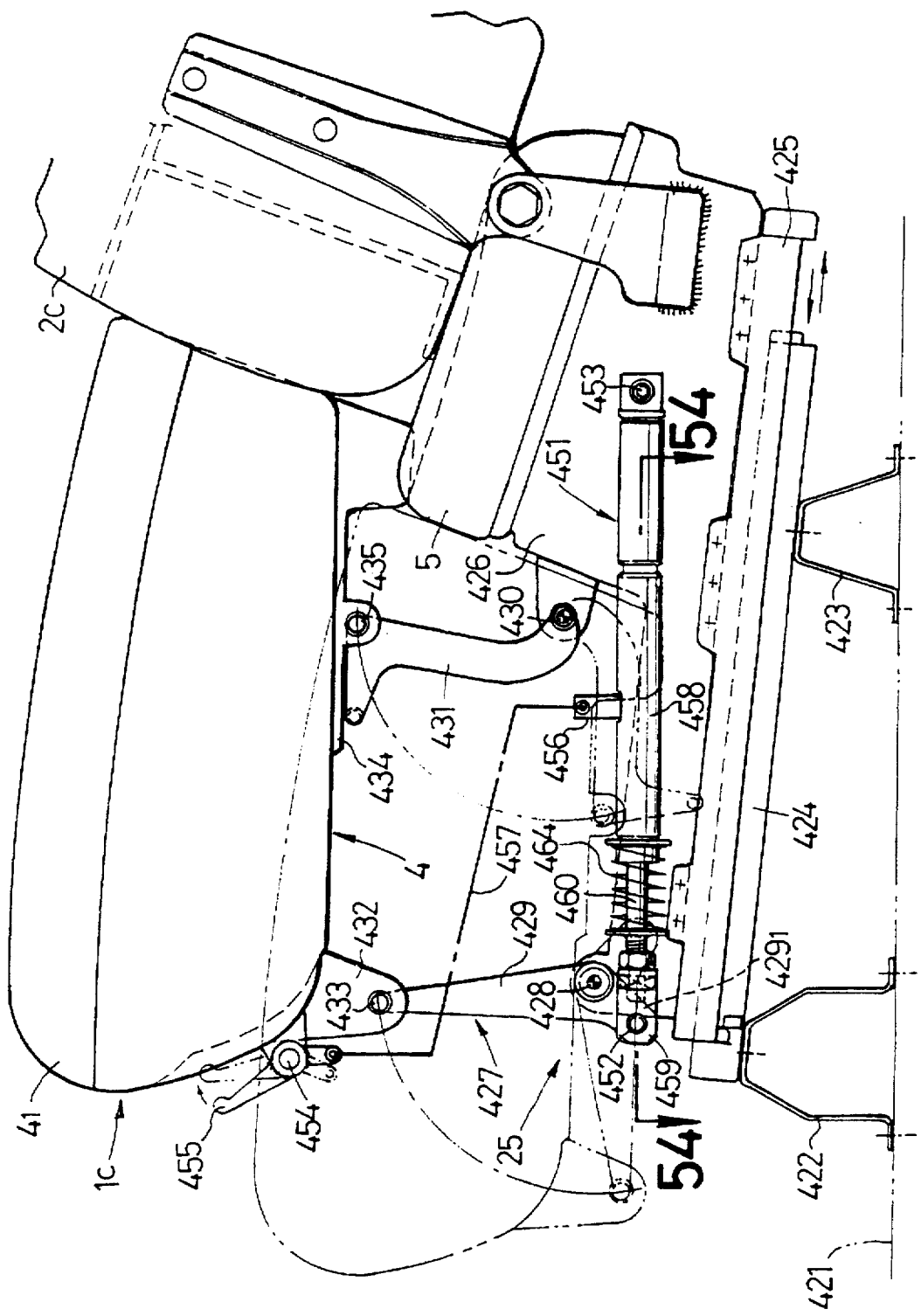
FIG. 53 is a side view of a lifting mechanism in a multi-functional seat arrangement according to a twelfth embodiment of the present invention.

As shown in FIG. 53, the front seat cushion 4 of the central seat $S_C$ is liftably and lowerably supported through a quadric link mechanism 427. A locking means 451 is pivotally supported at its front and rear opposite ends on a tip end of an arm portion $429_1$ formed on one of front link arms 429 of the quadric link mechanism 427 and a base frame 426 by pins 452 end 453, respectively. A lever 455 is pivotally supported on a front portion of the front seat cushion 4 by a pin 454, and a lock-releasing member 456 is mounted on a lengthwise central portion of the locking means 451. The lever 455 and the lock-releasing member 456 are interconnected through Bowden wire 457.

Figure 54:
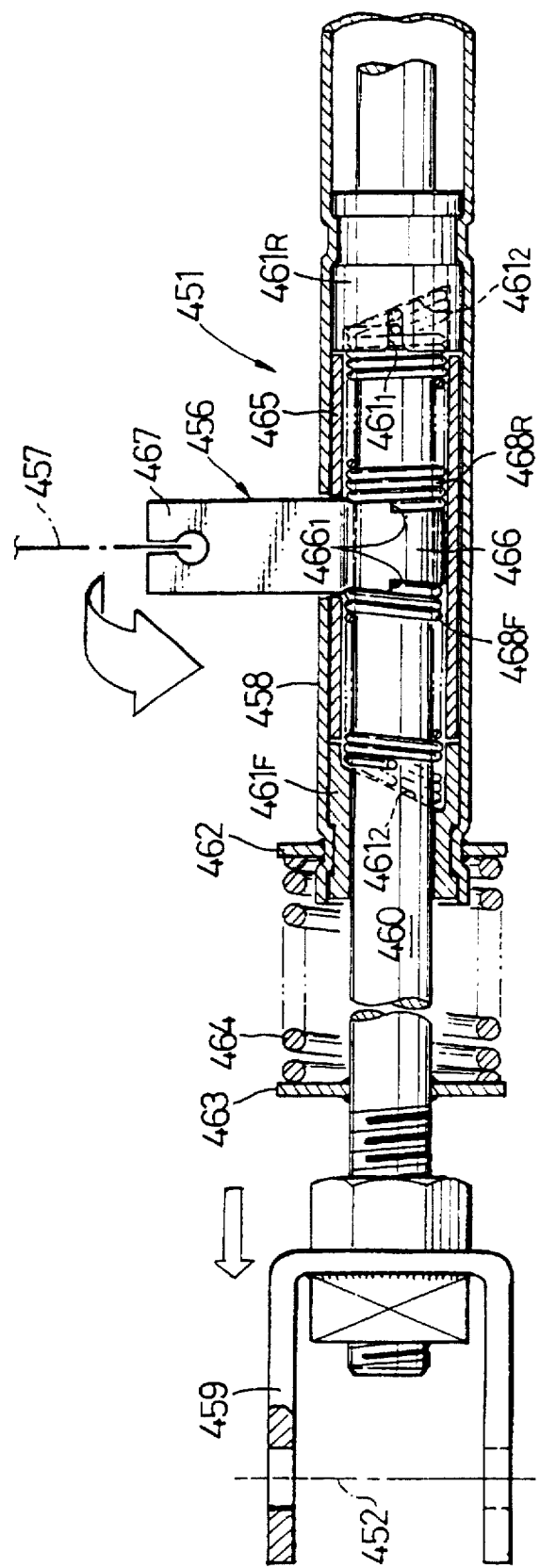
FIG. 54 is an enlarged sectional view taken along a line 54—54 in FIG. 53.

As can be seen from FIG. 54, the locking means 451 includes an outer cylinder 458 pivotally supported at its rear end on the base frame 426 by the pin 453, and an inner rod 460 having a bracket 459 mounted at its front end and pivotally supported on the arm portion $429_1$ by the pin 452. The inner rod 460 is slidably carried on a front bearing $461_F$ and a rear bearing $461_R$ which are fixedly mounted in the outer cylinder 458. A coil spring 464 is mounted under compression between a spring seat 462 welded to the outer cylinder 458 and a spring seat 462 welded to the inner rod 460, so that a biasing force is applied to the inner rod 460 by the resilient force of the coil spring 464 as being expanded, thereby causing the inner rod 460 in a direction to protrude from the outer cylinder 458. The biasing force is applied so as to turn the front link arm 428 about the pin 428 in a clockwise direction as viewed in FIG. 53, i.e., to right up the quadric link mechanism 427.

A cylindrical spring retainer 465 is disposed within the outer cylinder 458 so that it is sandwiched between the front and rear bearings $461_F$ and $461_R$. The lock-releasing member 456 includes a cylindrical portion 466 relatively rotatably fitted over an outer periphery of the inner rod 460, and an arm portion 467 which extends from the cylindrical portion 466 to the outside through an opening defined in the spring retainer 465 and an opening defined in the outer cylinder 458 and which is connected to the Bowden wire 457.

A front locking spring $468_F$ is disposed between the front bearing $461_F$ and the cylindrical portion 466 of the lock-releasing member 456, and a rear locking spring $468_R$ is disposed between the rear bearing $461_R$ and the cylindrical portion 466 of the lock-releasing member 456. One ends of the locking springs $468_F$ and $468_R$ are locked in notches $461_1$, $461_1$ defined in the bearings $461_F$ and $461_R$, and the other ends of the locking springs $468_F$ and $468_R$ abut against a pair of steps $466_1$, $466_1$ formed on the cylindrical portion 466 of the lock-releasing member 456, respectively.

Each of the locking springs $468_F$ and $468_R$ has a resilient force in a contracting direction and tightly engages the outer periphery of the inner rod 460 by the resilient force. Thus, the inner rod 460 is fixed to the outer cylinder 458 through the locking springs $468_F$ and $468_R$, so that the sliding movement thereof relative to the outer cylinder is limited.

When the inner rod 460 is strongly pulled leftwards as viewed in FIG. 54, a front end of the front locking spring $468_F$ is pushed against a slope $461_2$ formed on the front gearing $461_F$ and inclined into a state shown by a dashed line in FIG. 54 to strongly clamp the inner rod 460. When the inner rod 460 is strongly pushed rightwards as viewed in FIG. 54, a rear end of the rear locking spring $468_R$ is strongly pushed against a slope $461_2$ formed on the rear bearing $461_R$ and inclined into a state shown by a dashed line in FIG. 54 to strongly clamp the inner rod 460. Thus, even if a large load is applied to the inner rod 460, the sliding movement of the inner rod 460 is reliably limited.

When the arm portion 467 of the lock-releasing member 456 is pulled in a direction of an arrow in FIG. 54 through the Bowden wire 457 by operating the lever 455, the pair of steps $466_1$, $466_1$ of the cylindrical portion 466 urges the other ends of the locking springs $468_F$ and $468_R$ to forcibly expand the locking springs $468_F$ and $468_R$. As a result, a gap is created between the inner periphery of each of the locking springs $468_F$, and $468_R$ and the outer periphery of the inner rod 460, so that the inner rod 460 can be freely slid relative to the outer cylinder 458. Thus, the inner rod 460 is allowed to protrude from the outer cylinder 458 by the resilient force of the coil spring 464.

Therefore, if the lever 455 is operated to release the locking of the locking means 451, the front seat cushion 4 can be automatically lifted by the resilient force of the coil spring 464, or the front seat cushion 4 is pushed down against the resilient force of the coil spring 436. If the lever 455 is released to actuate the locking means 451, the front seat cushion 4 can be fixed at any position. According to this embodiment, the position of the front seat cushion 4 can be fixed in a steeples manner and hence, a further fine regulation can be achieved.

In addition, in the eleventh embodiment, the locking mechanism 451 may be mounted in a longitudinally revered manner. Further, although the locking mechanism 451 is connected to the front like arm 429 in the eleventh embodiment, the locking mechanism 451 may be connected directly to the front seat cushion 4. Namely, what is required is that the locking mechanism 451 is connected directly or indirectly to the front seat cushion 4.

Although the embodiments of the present invention have been described in detail, it will be understood that the present invention is not limited to the above-described embodiments, and various modifications may be made without departing from the subject matter and scope of the invention defined in claims.

For example, the present invention is not limited to the front seat and the rear seat, and is applicable to an intermediate-row seat in a vehicle including longitudinally three- or more-row seats.

What is claimed is:

1. A multi-functional seat arrangement for a vehicle said seat arrangement having a seat, said seat comprising a seat cushion bisected into a front seat cushion and a rear seat cushion, and a seat back pivotally supported at a rear end of said seat cushion for reclining movement about a fulcrum, said front cushion being liftably and lowerably supported by a lifting mechanism, wherein said lifting mechanism comprises a forward and rearward movement permitting means for forward end rearward movements of the front seat cushion which is in a lifted position, and a biasing means associated with the front seat cushion for biasing the rear end of the front seat cushion into abutment against a front surface of the seat back at its lower portion, wherein the biasing means allows the front seat cushion to be moveable forwards and rearwards so as to follow a variation in reclining angle of the seat back.

2. A multi-functional seat arrangement for a vehicle according to claim 1, wherein said lifting mechanism includes front and rear links which are movable from a standing up and tilting down position and which are pivotally supported at one end thereof on a fixing portion and at the other end on said front seat cushion, and said biasing means is a spring for biasing said front and rear links in their standing up direction.

3. A multi-functional seat arrangement for a vehicle according to claim 2, wherein said forward and rearward movement permitting means includes a locking bar which is pivotally supported at one end thereof on said front link and slidably movable at the other end thereof along said front seat cushion, and when said front seat cushion is in a lifted position, a triangle is formed by said front seat cushion, said front link and said locking bar, and the forward and rearward movement of said front seat cushion is permitted by a deformation of said triangle caused by the sliding movement of the other end of said locking bar.

4. A multi-functional seat arrangement for a vehicle according to claim 3, wherein a forward and rearward movable range of said front seat cushion is limited by limiting a slidable range of the other end of the locking bar to fix said triangle at opposite ends of said slidable range.

5. A multi-functional seat arrangement for a vehicle according to claim 3, wherein said rear link is bendable at a substantially central portion thereof.

6. A multi-functional seat arrangement for a vehicle, according to claim 1, wherein said seat back is divided into a front seat back and a rear seat back; said front seat cushion includes a body portion and a lid which is turnable about a fulcrum provided at a front end of said body portion, said front seat back being turnable about a fulcrum provided at a lower end thereof to a position in which said front seat back is superposed on an upper surface of said body portion of said front seat cushion which is in a lifted position, said rear seat back being turnable about said fulcrum, whereby a baby basket for supporting a baby in a sleeping attitude is formed by said lid turned forwards, said front seat back turned forwards and said rear seat back turned rearwards, and a child seat is formed by lifting said front seat cushion.

7. A multi-functional seat arrangement for a vehicle according to claim 6, wherein a main portion of said front seat back comprises a pad, and wherein a belly of a baby in said baby basket is supportable by said pad.

8. A multi-functional seat arrangement for a vehicle according to claim 6, wherein said seat back includes a head rest and a means for adjusting a height of said head rest, a level of an upper end of said head rest being set substantially equal to a level of an upper end of seat backs disposed on left and right opposite sides of said head rest.

9. A multi-functional seat arrangement for a vehicle according to claim 1, wherein the seat is adapted to be disposed substantially centrally in the vehicle includes a seat back frame which has an opening provided to extend from front to rear sides therethrough and constitutes a skeleton of the seat back, a front seat back forming a front surface of the seat back, a rear seat back forming a rear surface of the seat back, a pivotally supporting means for pivotally supporting a lower portion of said front seat back on the seat back frame for forward and rearward swinging movement and for pivotally supporting a lower portion of said rear seat back on the seat back frame for forward and rearward swinging movement, a first fixing means for fixing said front seat back in a predetermined swung position on said seat back frame, and a second fixing means for fixing said rear seat back in a predetermined swung position on said seat back frame.

10. A multi-functional seat arrangement for a vehicle according to claim 9, wherein a relative angle between the front and rear seat backs swung forwards and rearwards is limitable by a third fixing means.

11. A multi-functional seat arrangement for a vehicle according to claim 9, further including a detachable cushion which covers an upper surface of said front seat back which is in a forward swung position and an upper surface of said rear seat back which is in a rearward swung position.

12. A multi-functional seat arrangement for a vehicle according to claim 1, wherein said seat is adapted to be disposed substantially centrally in the vehicle and said seat back is constructed of a first front half and a second rear half pivotally supported at upper ends thereof such that said halves can be opened and closed relative to each other, and said seat back is pivotally supported at a rear end of the seat cushion for forward and rearward swinging movement at a lower end of said first front half, whereby said seat back is used as an arm rest by swinging said seat back forwards so that the seat back is superposed on an upper surface of the seat cushion; said second half of said forward swung seat back is used as a baby basket by opening said second half forwards relative to said first half; and the seat cushion is supported for lifting and lowering movements by said lifting mechanism, and the lifted seat cushion is used as an arm rest or for a child seat.

13. A multi-functional seat arrangement for a vehicle according to claim 12, wherein said seat cushion includes a vessel for accommodating an article, and a lid for opening and closing an opening in an upper surface of said vessel.

14. A multi-functional seat arrangement for a vehicle according to claim 1, further including a child seat belt device having a protecting pad which is capable of being coupled at its one side to the seat cushion by a coupling means and which is connected at its other side to one end of each of two belts, and the seat back is provided with a recess into which said protecting pad of said child seat belt device can be fitted.

15. A multi-functional seat arrangement for a vehicle according to claim 14, wherein said recess is disposed in a front surface of said seat back.

16. A multi-functional seat arrangement for a vehicle according to claim 15, wherein said recess is covered with the front seat cushion which is in its lifted position.

17. A multi-functional seat arrangement for a vehicle according to claim 16, wherein said protecting pad is formed detachably from the belts, and said seat back has a further recess disposed in an upper portion thereof for accommodating said belts.

18. A multi-functional seat arrangement for a vehicle according to claim 17, wherein said seat back includes a head rest and a means for adjusting a height of said head rest, and said further recess is disposed in the upper portion of said seat back and in a lower surface of said head rest.

19. A multi-functional seat arrangement for a vehicle according to claim 14, wherein said recess is disposed in a rear surface of said seat back.

20. A multi-functional seat arrangement for a vehicle according to claim 14, wherein the other end of each of said belts is fixed to a frame of the seat cushion, a frame of the seat back or a vehicle panel.

21. A multi-functional seat arrangement for a vehicle according to claim 20, wherein a retractor is provided at said other end of said belt.

22. A multi-functional seat arrangement for a vehicle, comprising a seat adapted to be disposed substantially centrally in the vehicle and used for multiple purposes, said seat including a seat cushion divided into a front seat cushion and a rear seat cushion, a seat back divided into a front seat back and a rear seat back, and a means for lifting and lowering said front seat cushion with respect to said rear seat cushion and said front seat cushion including a body portion and a lid which is turnable forwards about a fulcrum provided at a front end of said body portion, said front seat back being turnable about a fulcrum provided at a lower end of said body portion to a position in which the front seat back is superposed on an upper surface of said body portion of said front seat cushion which is in a lifted position, said rear seat back being turnable about said fulcrum, wherein a baby basket for supporting a baby in a sleeping attitude comprises the lid turned forwards, the front seat back turned forwards and the rear seat back turned rearwards, and a child seat being formed by lifting said front seat cushion.

23. A multi-functional seat arrangement for a vehicle according to claim 22, wherein a main portion of said front seat back is constituted of a pad, and wherein a belly of a baby on said baby basket is supportable by said pad.

24. A multi-functional seat arrangement for a vehicle according to claim 22, wherein said seat back includes a head rest and a means for adjusting a height of said heat rest, a level of an upper end of said head rest when accommodated being established substantially equal to a level of an upper end of seat backs disposed on left and right opposite sides of said head rest.

25. A multi-functional seat arrangement for a vehicle according to claim 22, wherein said front seat cushion is liftably and lowerably supported on a vehicle body through a link arm, and said seat arrangement further includes a locked gear which is fixedly mounted on said link arm wherein said link arm is pivotally supported on said front seat cushion through a pivot and wherein said link arm is coaxial with said pivot, and a locking gear movably mounted on said front seat cushion and capable of being meshed with said locked gear, respectively.

26. A multi-functional seat arrangement for a vehicle according to claim 22, wherein said front seat cushion is liftably and lowerably supported on a vehicle body through a link arm, and said seat arrangement further includes an outer cylinder and an inner rod slidably received in said outer cylinder wherein one end of, said outer cylinder and one end of said inner rod are connected to said seat cushion and a fixing portion respectively, wherein said seat arrangement further includes, a locking member mounted between said outer cylinder and said inner rod and capable of limiting the sliding movements of said outer cylinder and said inner rod relative to each other.

27. A multi-functional seat arrangement for a vehicle according to claim 22, wherein said seat back is pivotally supported in a reclinable manner through a fulcrum at a rear end of said seat cushion, and said seat arrangement further includes a lifting mechanism for supporting said front seat cushion for lifting and lowering movements, said lifting mechanism including a forward and rearward movement permitting means which includes a front link movable from a standing up and tilting down position, pivotally supported at one end thereof on a fixing position and at the other end of said front seat cushion, a rear link movable from a standing up and tilting down position wherein said rear link comprises a means for bending said rear link, such that rear link is bendable at a substantially central portion thereof and pivotally supported at one end thereof on a fixing portion and at another end on said front seat cushion, and a locking bar pivotally supported at one end thereof on said front link and having the other end slidable along a lower surface of said front seat cushion; and said forward and rearward movement permitting means further including a biasing means for abutting the rear end of said front seat cushion against a lower front surface of said seat back by a spring for biasing said rear link in a righting direction, wherein said biasing means allows said front seat cushion to be moveable forwards and rearwards so as to follow a variation in reclining angle of said seat back, and wherein when said front seat cushion is in a lifted position, a triangle is formed by said front seat cushion, said front link and said locking bar, and the forward and rearward movements of said front seat cushion is permitted by a deformation of said triangle caused by a sliding movement of the other end of said locking bar, and a forward and rearward position of said front seat cushion is limited by limiting a slidable range of the other end of said locking bar to fix said triangle at opposite ends of said slidable range.

28. A multi-functional seat arrangement for a vehicle according to claim 22, further including a child seat belt device having a protecting pad which is capable of being coupled at its one side to the seat cushion by a coupling means and which is connected at its other side to one end of each of two belts, said belts of said child seat belt device being formed so as to be attachable to and detachable from said protecting pad, and the seat back is provided with a recess into which said protecting pad can be fitted, and wherein a further recess for accommodating said belts is provided in an upper portion of said seat back and in a lower surface of said head rest, the other end of each said belts being fixed to one of a frame of said seat cushion, a frame of said seat back and a vehicle body panel.

\* \* \* \* \*